US012140696B2

(12) United States Patent
Chen et al.

(10) Patent No.: US 12,140,696 B2
(45) Date of Patent: Nov. 12, 2024

(54) HIGH END IMAGING RADAR

(71) Applicant: Intel Corporation, Santa Clara, CA (US)

(72) Inventors: Chulong Chen, San Jose, CA (US); Wenling Margaret Huang, Los Altos, CA (US); Saiveena Kesaraju, Mountain View, CA (US); Ivan Simões Gaspar, West Linn, OR (US); Pradyumna S. Singh, San Jose, CA (US); Biji George, Bangalore (IN); Dipan Kumar Mandal, Bangalore (IN); Om Ji Omer, Bangalore (IN); Sreenivas Subramoney, Bangalore (IN); Yuval Amizur, Kfar-Saba (IL); Leor Banin, Petach Tikva (IL); Hao Chen, Owing Mills, MD (US); Nir Dvorecki, Herzeliya (IL); Shengbo Xu, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 17/375,017

(22) Filed: Jul. 14, 2021

(65) Prior Publication Data

US 2022/0196798 A1 Jun. 23, 2022

Related U.S. Application Data

(63) Continuation of application No. PCT/US2020/066300, filed on Dec. 21, 2020.

(51) Int. Cl.
*G01S 7/41* (2006.01)
*G01S 7/40* (2006.01)
(Continued)

(52) U.S. Cl.
CPC ................ *G01S 7/417* (2013.01); *G01S 7/40* (2013.01); *G01S 13/584* (2013.01); *G01S 13/89* (2013.01); *H01Q 21/06* (2013.01); *H01Q 15/02* (2013.01)

(58) Field of Classification Search
CPC .......... G01S 7/417; G01S 7/40; G01S 13/584; G01S 13/89; G01S 7/354; G01S 13/931; H01Q 21/06; H01Q 15/02
See application file for complete search history.

(56) References Cited

U.S. PATENT DOCUMENTS

2015/0212197 A1* 7/2015 Morita .................... G01S 13/10 342/92
2017/0293816 A1 10/2017 Micks et al.
(Continued)

FOREIGN PATENT DOCUMENTS

DE 102020116318 A1 12/2020
JP 2007155728 A * 6/2007
WO 2020185209 A1 9/2020

OTHER PUBLICATIONS

17375017_2024-02-26_JP_2007155728_A_M.pdf, machine translation of JP-2007155728-A (Year: 2017).*
(Continued)

*Primary Examiner* — Timothy A Brainard
*Assistant Examiner* — Kenneth W Good
(74) *Attorney, Agent, or Firm* — VIERING, JENTSCHURA & PARTNER MBB

(57) ABSTRACT

According to various embodiments, a radar device is described comprising a processor configured to generate a scene comprising an object based on a plurality of receive wireless signals, generate a ground truth object parameter of the object and generate a dataset representative of the scene and a radar detector configured to determine an object parameter of the object using a machine learning algorithm
(Continued)

106
107
105
100
102
101
103
Radar frontend
104
Radar processor
108
Vehicle controller and the dataset, determine an error value of the machine learning algorithm using a cost function, the object parameter, and the ground truth object parameter and adjust the machine learning algorithm values to reduce the error value.

20 Claims, 52 Drawing Sheets

(51) Int. Cl.

| | |
|---|---|
| *G01S 13/58* | (2006.01) |
| *G01S 13/89* | (2006.01) |
| *H01Q 15/02* | (2006.01) |
| *H01Q 21/06* | (2006.01) |

(56) References Cited

U.S. PATENT DOCUMENTS

| | | | | |
|---|---|---|---|---|
| 2018/0231636 | A1* | 8/2018 | Maher | G01S 13/06 |
| 2019/0041492 | A1* | 2/2019 | Paradie | G01S 7/023 |
| 2019/0087672 | A1 | 3/2019 | Wang et al. | |
| 2019/0331768 | A1* | 10/2019 | Harrison | G06N 3/04 |
| 2020/0057138 | A1 | 2/2020 | Bouchayer et al. | |
| 2020/0072941 | A1* | 3/2020 | Jansen | G01S 13/343 |
| 2020/0143656 | A1* | 5/2020 | Li | G08B 21/043 |
| 2020/0233076 | A1 | 7/2020 | Chen et al. | |
| 2020/0249315 | A1 | 8/2020 | Eshet et al. | |
| 2020/0333453 | A1 | 10/2020 | Mende et al. | |
| 2021/0149041 | A1* | 5/2021 | Cho | G06T 3/4046 |
| 2021/0208247 | A1* | 7/2021 | John Wilson | G01S 7/417 |
| 2021/0255304 | A1* | 8/2021 | Fontijne | G06V 10/82 |
| 2022/0003850 | A1* | 1/2022 | Liu | G01S 7/497 |
| 2022/0026557 | A1* | 1/2022 | Arbabian | G01S 13/726 |
| 2022/0137181 | A1* | 5/2022 | Santra | G01S 7/352 342/450 |
| 2023/0140093 | A1* | 5/2023 | Cheng | G06N 3/09 340/573.1 |
| 2024/0013521 | A1* | 1/2024 | Ren | G06N 3/08 |
| 2024/0053464 | A1* | 2/2024 | Dahnoun | G01S 13/886 |

OTHER PUBLICATIONS

Sevgi Zubeyde Gurbuz et al., "Radar-based human-motion recognition with deep learning", IEEE Signal Processing Magazine, Jul. 2019, pp. 16-28, vol. 36, Issue 4, IEEE.

Zhenyuan Zhang et al., "Latern: Dynamic continuous hand gesture recognition using FMCW radar sensor," IEEE Sensors Journal, Apr. 15, 2018, pp. 3278-3289, vol. 18, No. 8, IEEE.

Saiwen Wang et al., "Interacting with Soli: Exploring Fine-Grained Dynamic Gesture Recognition in the Radio-Frequency Spectrum", Proceedings of the 29th Annual Symposium on User Interface Software and Technology, Oct. 2016, pp. 851-860.

Xiaodong Cai et al., "Efficient Convolutional Neural Network for FMCW Radar Based Hand Gesture Recognition", Adjunct Proceedings of the 2019 ACM International Joint Conference on Pervasive and Ubiquitous Computing and Proceedings of the 2019 ACM International Symposium on Wearable Computers, Sep. 9-13, 2019, 4 pages, London, United Kingdom.

Mingyang Wang et al., "Human body and limb motion recognition via stacked gated recurrent units network", IET Radar, Sonar & Navigation, 2018, pp. 1046-1051, vol. 12, Issue 9, The Institution of Engineering and Technology.

Dhrubojyoti Roy et al., "One Size Does Not Fit All: Multi-Scale, Cascaded RNNs For Radar Classification", ACM Transactions on Sensor Networks, Jan. 2021, 27 pages, vol. 17, No. 2, Article 12.

A. Bartsch et al., "Pedestrian recognition using automotive radar sensors", Advances in Radio Science 10, 2012, pp. 45-55, Copernicus Publications.

Steffen Heuel et al., "Pedestrian Recognition in Automotive Radar Sensors", 14th International Radar Symposium (IRS), Jun. 19-21, 2013, 8 pages, IEEE, Dresden, Germany.

Robert Prophet et al., "Pedestrian Classification for 79 GHz Automotive Radar Systems", 2018 IEEE Intelligent Vehicles Symposium (IV), Jun. 26-30, 2018, pp. 1265-1270, IEEE, Changshu, Suzhou, China.

Kim Woosuk et al., "YOLO-Based Simultaneous Target Detection and Classification in Automotive FMCW Radar Systems", Sensors 2020, May 20, 2020, pp. 1-15, MDPI.

Tokihiko Akita et al., "Object Tracking and Classification Using Millimeter-Wave Radar Based on LSTM", 2019 IEEE Intelligent Transportation Systems Conference (ITSC), Oct. 27-30, 2019, pp. 1110-1115, IEEE, Auckland, New Zealand.

M. Richards, "Fundamentals of radar signal processing", Chapter 4.1 to 4.3, 2014, 9 pages, Access Engineering, McGraw-Hill Education LLC.

Ralph O. Schmidt; "Multiple Emitter Location and Signal Parameter Estimation", IEEE Transactions on Antennas and Propagation; Mar. 1986; pp. 276-280, vol. AP-34, No. 3.

Richard Roy et al., "ESPRIT—Estimation of Signal Parameters Via Rotational Invariance Techniques", IEEE Transactions on Acoustics, Speech, and Signal Processing, Jul. 1989, pp. 984-995, vol. 37. No. 7, IEEE.

George-Othon Glentis et al.; "Efficient implementation of iterative adaptive approach spectral estimation techniques," IEEE Transactions on Signal Processing, 2011, pp. 4154-4167, vol. 59, No. 9.

Weize Sun et al., "Approximate Subspace-Based Iterative Adaptive Approach for Fast Two-Dimensional Spectral Estimation", IEEE Transactions On Signal Processing, Jun. 15, 2014, pp. 3220-3231, vol. 62, No. 12, IEEE.

S. J. A. Melvin William L., "4.4 MIMO Radar Signal Processing; 2015.", in Principles of Modern Radar, Institution of Engineering and Technology, 2015, vol. 2—Advanced Techniques.

Olaf Ronneberger et al., "U-Net: Convolutional Networks for Biomedical Image Segmentation", Medical Image Computing and Computer-Assisted Intervention (MICCAI), May 18, 2015, pp. 234-241, vol. 9351.

Özgün Çiçek et al.; "3D U-Net: Learning Dense Volumetric Segmentation from Sparse Annotation", International Conference on Medical Image Computing and Computer-Assisted Intervention, Jun. 2016, 8 pages.

Daniel Brodeski et al.; "Deep Radar Detector"; https://arxiv.org/abs/1906.12187; Jun. 26, 2019; Cornell University.

Netanel Frank et al., "Comparing Vision-based to Sonar-basd 3D Reconstruction", International Conference on Computational Photography (ICCP), Apr. 24-26, 2020, 12 pages, St. Louis, Missouri, USA, IEEE.

Andras Palffy et al., "CNN Based Road User Detection Using the 3D Radar Cube", IEEE Robotics And Automation Letters, Apr. 2020, pp. 1263-1270, vol. 5, No. 2, IEEE.

Ole Schumann et al., "Semantic segmentation on radar point clouds", 2018 21st International Conference on Information Fusion (Fusion), 2018, pp. 2179-2186.

Hannah Strohm et al., "Deep learning-based reconstruction of ultrasound images from raw channel data", International Journal of Computer Assisted Radiology and Surgery, Jun. 3, 2020, pp. 1487-1490, vol. 15.

Seungjun Lee; "Deep Learning on Radar Centric 3D Object Detection"; https://arxiv.org/abs/2003.00851; Feb. 27, 2020; 4 pages; Cornell University.

Guoqiang Zhang et al., "Object Detection and 3D Estimation via an FMCW Radar Using a Fully Convolutional Network", 2020 IEEE International Conference on Acoustics, Speech and Signal Processing (ICASSP), 2020, 5 pages.

Rodrigo Pérez et al., "Deep Learning Radar Object Detection and Classification for Urban Automotive Scenarios", Kleinheubach Conference, Sep. 23-25, 2019, IEEE, Miltenberg, Germany.

Benjamin Graham, "Spatially-sparse convolutional neural networks", Sep. 23, 2014, 13 pages.

Ashish Vaswani et al., "Attention Is All You Need", 31st Conference on Neural Information Processing Systems (NIPS 2017), Dec. 4-9, 2017; 15 pages, Long Beach, CA, US.

Jie Zhou et al., "Graph neural networks: A review of methods and applications", AI Open, 2020, pp. 57-81.

(56) References Cited

OTHER PUBLICATIONS

Saiveena Kesaraju et al., "(Radar Premium Filing) Methods for object recognition and activity classification using neural networks and high-resolution radar sensors", Nov. 3, 2020, 8 pages.
Joseph Redmon et al., "YOLOv3: An Incremental Improvement", Apr. 8, 2018, 6 pages.
Kaiming He et al., "Deep Residual Learning for Image Recognition", Dec. 10, 2015, 12 pages.
Olaf Ronneberger et al., "U-Net: Convolutional Networks for Biomedical Image Segmentation", May 18, 2015, 8 pages.
Benjamin Graham et al., "Submanifold Sparse Convolutional Networks", Jun. 6, 2017, 10 pages.
International Search Report issued for the corresponding international application No. PCT/US2020/066300, dated Sep. 16, 2021, 12 pages (only for infomational purposes).
Shanthamallu Uday Shankar et al., "A brief survey of machine learning methods and their sensor and IoT applications", 2017 8th International Conference on Information, Intelligence, Systems & Applications (IISA), IEEE, Aug. 2017, retrieved from https://ieeexplore.ieee.org/abstract/document/8316459 on Apr. 17, 2023, 8 pages.
Search Report issued for the corresponding NL Application No. 2029854, dated Feb. 27, 2023, 1 page (for informational purposes only).

* cited by examiner

2300

3500

3501

Determine, using a neural network, from a first angle of arrival map, a second angle of arrival map, wherein the second angle of arrival map has a higher resolution than the first angle of arrival map

Figure 36:
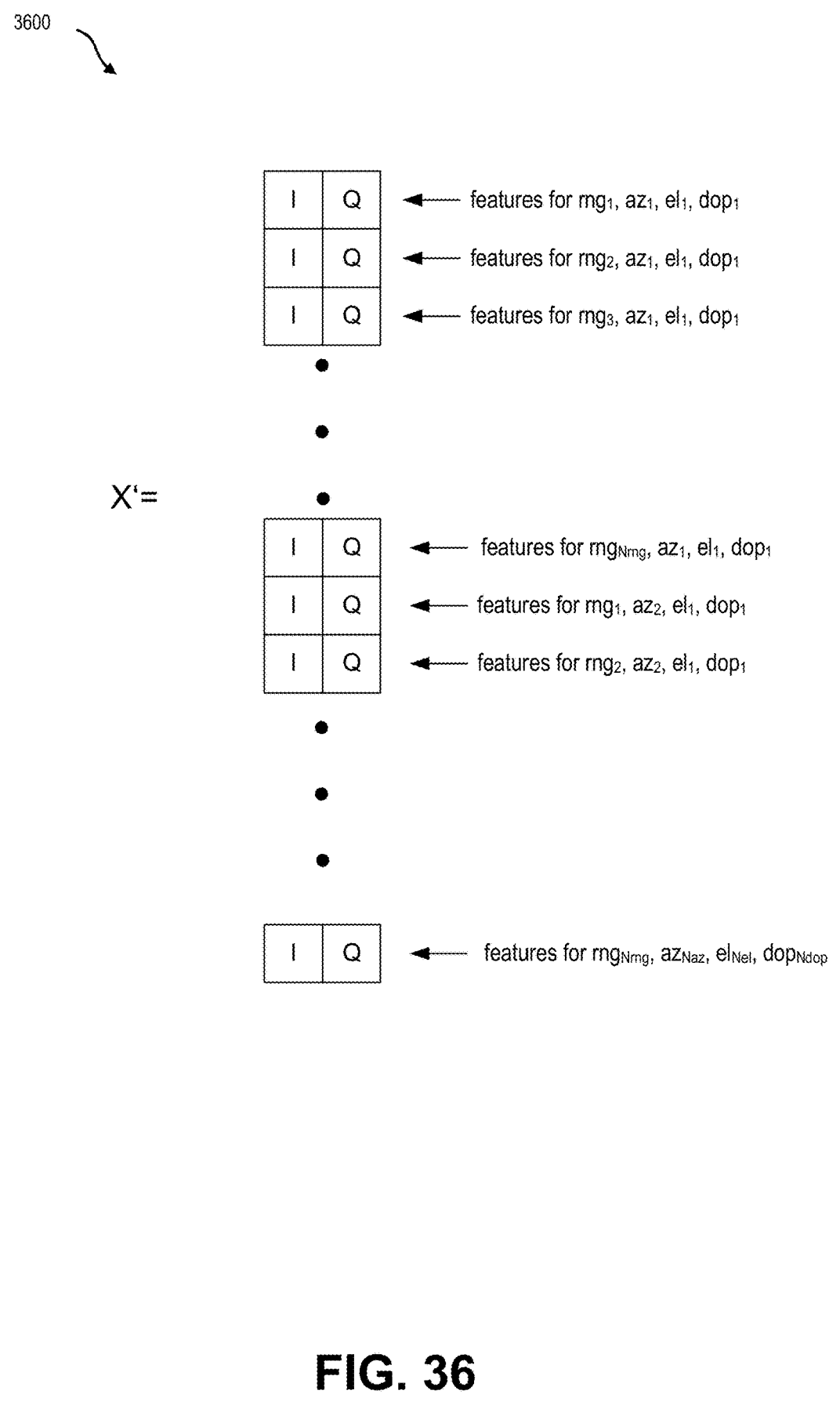

| I | Q |  |
|---|---|---|
| I | Q | features for $rng_1$, $az_1$, $el_1$, $dop_1$ |
| I | Q | features for $rng_2$, $az_1$, $el_1$, $dop_1$ |
| I | Q | features for $rng_3$, $az_1$, $el_1$, $dop_1$ |
| • | | |
| • | | |
| • | | |
| I | Q | features for $rng_{Nrng}$, $az_1$, $el_1$, $dop_1$ |
| I | Q | features for $rng_1$, $az_2$, $el_1$, $dop_1$ |
| I | Q | features for $rng_2$, $az_2$, $el_1$, $dop_1$ |
| • | | |
| • | | |
| • | | |
| I | Q | features for $rng_{Nrng}$, $az_{Naz}$, $el_{Nel}$, $dop_{Ndop}$ |

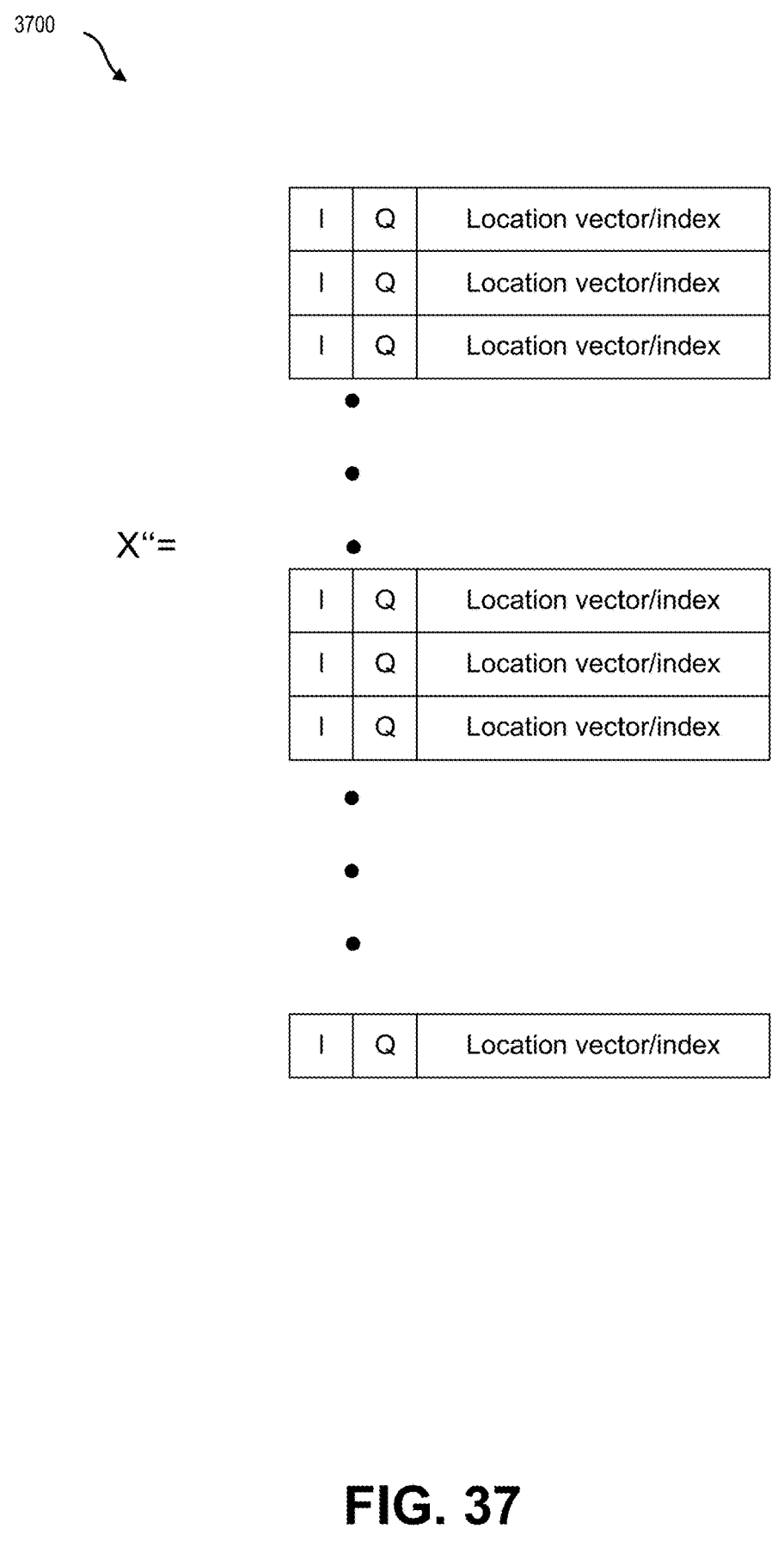

| I | Q | Location vector/index |
|---|---|---|
| I | Q | Location vector/index |
| I | Q | Location vector/index |
| • | | |
| • | | |
| • | | |
| I | Q | Location vector/index |
| I | Q | Location vector/index |
| I | Q | Location vector/index |
| • | | |
| • | | |
| • | | |
| I | Q | Location vector/index |

FIG. 37

| 4D Space Dimensionality | | | | | |
|---|---|---|---|---|---|
| | Dim1 | Dim2 | Dim3 | Dim4 | $N_{dim1..4}$ |
| # bins | 512 | 256 | 128 | 32 | 536,870,912 |
| # bits per index | 9 | 8 | 7 | 5 | 29 |

| Comparison of Direct Listing vs Pruned sedectree indexing | | | | |
|---|---|---|---|---|
| | Scenario 1 | Scenario 2 | Scenario 3 | Scenario 4 |
| % active bins | 10 | 10 | 40 | 40 |
| Clustering assumption | Full cluster | No Clustering | Full cluster | No Clustering |
| # active bins | 52,726,784 | 52,726,784 | 210,907,136 | 210,907,136 |
| # 2x2x2x2 Clusters | 3,295,424 | 52,726,784 | 3,295,424 | 210,907,136 |
| Total Gb - Direct listing | 1.58 | 1.58 | 6.33 | 6.33 |
| Total GB - Pruned Sedectree (worst case) | 0.07 | 0.60 | 0.07 | 1.04 |
| Saving % | 96 | 62 | 99 | 84 |

FIG. 40

| Memory of representations | | Saving over dense array | Numerology | |
|---|---|---|---|---|
| Memory: dense array (Gbits) | 12.65 | 0 | Bitwidth per complex bin | 24 |
| Memory: Features (Gb) | 1.27 | n/a | Total # Bins | 527,267,840 |
| Memory: Feature + index list (Gb) | 2.85 | 78 | # active bins | 52,726,784 |
| Memory: Feature + sedectree (Gb) | 1.87 | 85 | FPS | 10 |

FIG. 42

HIGH END IMAGING RADAR

CROSS-REFERENCE TO RELATED APPLICATIONS

This application claims priority to Patent Cooperation Treaty Application PCT/US2020/066300, filed on Dec. 21, 2020, the entirety of which is hereby incorporated herein by reference.

TECHNICAL FIELD

Various aspects of this disclosure generally relate to radar, antenna array configuration in radar, processing of radar signals by one or more artificial neural networks, and implementation of same, such as in robotic devices.

BACKGROUND

Autonomous devices (e.g., autonomous vehicles and robots) perceive and navigate through their environment using sensor data of one or more sensor types. Conventionally, autonomous perception relies heavily on light-based sensors, such as image sensors (e.g. cameras) and/or Light Detection and Ranging (LIDAR) sensors. Such light-based sensors may perform poorly under certain conditions, such as conditions of poor visibility or in certain inclement weather conditions (e.g. rain, snow, hail, or other forms of precipitation and sandstorms), thereby limiting their usefulness or reliability. Radio detection and ranging (Radar) systems, however, may be comparatively undisturbed by inclement weather and/or reduced visibility.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 35 shows a flow diagram illustrating a method for processing radar reception data according to another embodiment.

FIG. 36 illustrates a vectorized input data voxel 3600.

FIG. 37 illustrates a vectorized input data voxel 3700 with location information in the form of a location vector or a location index for each feature tuple.

FIG. 40 shows a comparison of memory requirements for indexing schemes with exemplary 4D array dimensionality.

FIG. 42 shows an example for memory required to store the sparse representation of digital radar reception data.

DESCRIPTION

Figure 1:
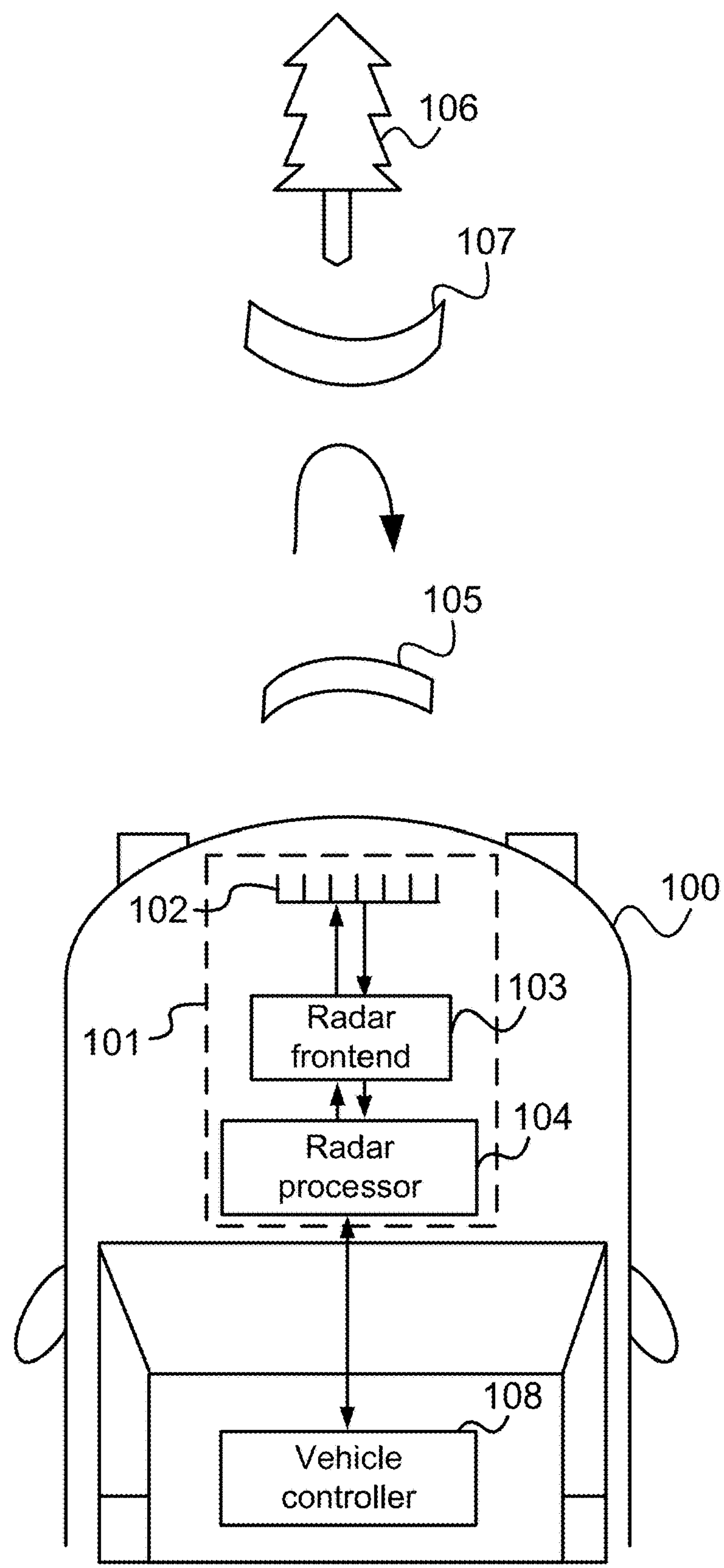
FIG. 1 shows an exemplary autonomous device such as a vehicle.

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time-varying features or data).

Various aspects of the disclosure herein may utilize one or more machine learning models to perform or control functions of the vehicle (or other functions described herein). The term "model" may, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms will be used as synonyms: driving parameter set, driving model parameter set, safety layer parameter set, driver assistance, automated driving model parameter set, and/or the like (e.g., driving safety parameter set).

Furthermore, throughout the present disclosure, the following terms will be used as synonyms: driving parameter, driving model parameter, safety layer parameter, driver assistance and/or automated driving model parameter, and/or the like (e.g., driving safety parameter).

FIG. 1 shows an exemplary autonomous device such as a vehicle 100.

The vehicle 100 includes a radar device (or radar system) 101 that includes an antenna arrangement 102, a radar frontend 103 and a radar processor 104.

The antenna arrangement 102, the radar frontend 103 (and optionally components (e.g. circuitry) which are part of the radar processor 104) form a radar sensor.

The radar frontend 103 for example includes one or more (radar) transmitters and a one or more (radar) receivers. The antenna arrangement 102 may include multiple transmit antennas in the form of a transmit antenna array and multiple receive antennas in the form of a receive antenna array or one or more antennas used both as transmit and receive antennas. In the latter case, the radar frontend 103 for example includes a duplexer (i.e. a circuit to separate transmitted signals from received signals)

For the detection of an object 106, the radar processor 104 transmits, using the radar frontend 103 and the antenna arrangement 102, a radio transmit signal 105.

The radio transmit signal 105 is reflected by the object 106 resulting in an echo 107.

The radar device 101 receives the echo 107 and the radar processor 104 calculates information of position, speed and direction of the object 106 with respect to the vehicle 100. The radar processor 104 may then for example supply this calculated information to a vehicle controller 108 of the vehicle 100, e.g. for autonomous driving of the vehicle 100, to facilitate operation of the vehicle 100.

For example, the radar device 101 may be installed in a vehicle for detection of nearby objects, in particular for autonomous driving. In the following, a further application example of radar is illustrated in FIG. 2.

Figure 2:
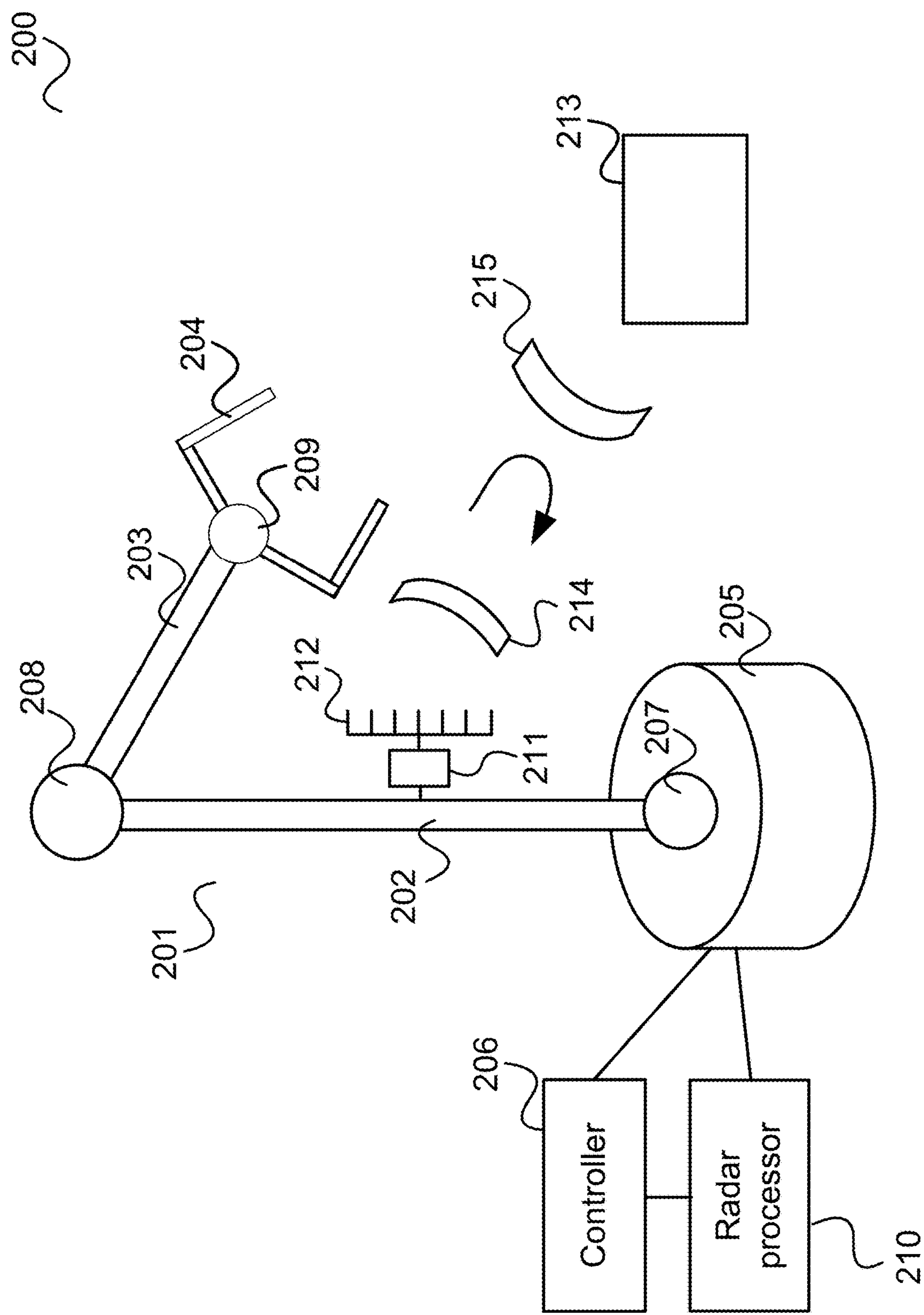
FIG. 2 shows an exemplary autonomous device such as a robot.

FIG. 2 shows an exemplary autonomous device such as a robot 200.

The robot 200 includes a robot arm 201. The robot 200 may for example be in a factory for handling an object 213, which is for example a part that should be affixed to a product that is being manufactured. The robot arm 201 includes movable members 202, 203, 204 and a support 205. Moving the movable members 202, 203, 204 of the robot arm 201 (by actuation of associated motors) allows physical interaction with the environment to carry out a task, e.g. handling the object 213.

For moving the members, the robot arm 201 may include joint elements 207, 208, 209 connecting the members 202, 203, 204 with each other and with the support 205. A joint element 207, 208, 209 may have one or more joints, each of which may provide rotatable motion (i.e. rotational motion) and/or translatory motion (i.e. displacement) to associated manipulators relative to each other. The movement of the manipulators 202, 203, 204 may be initiated by means of actuators.

The last member 204 (furthest from the support 205) of the members 202, 203, 204 is also referred to as the end-effector 204 and may include one or more tools such as a claw for gripping an object, a welding tool or the like. The other members 202, 203 (closer to the support 205) allow changing the position of the end-effector 204 in three-dimensional space. Thus, the robot arm 201 can function similarly to a human arm (possibly with a tool at its end).

For controlling the robot arm 201 according to the task to be performed, the robot 200 includes a (robot) controller 206 configured to implement the interaction with the environment (by controlling the robot arm's actuators) according to a control program.

An actuator may be understood as a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 206 is in communication with a radar processor 210 of the robot 200.

Further, a radar fronted 211 and a radar antenna arrangement 212 are provided, in this example at the robot arm 201, which are coupled to the radar processor 210. The radar frontend 211, the radar antenna arrangement 212 and the radar processor 210 form a radar device.

Similar to the example of FIG. 1, the radar frontend 211 for example includes one or more (radar) transmitters, a duplexer (i.e. a circuit to separate transmitted signals from received signals) and a one or more (radar) receivers. The antenna arrangement 212 may include multiple transmit antennas in form of a transmit antenna array and multiple receive antennas in form of a receive antenna array or one or more antennas used both as transmit and receive antennas.

For the detection of the object 213, the radar processor 210 transmits, using the radar frontend 211 and the antenna arrangement 212, a radio transmit signal 214. The radio transmit signal 214 is reflected by the object 213 resulting in an echo 215.

The antenna arrangement 212 receives the echo 215 and the radar processor 210 calculates information of position, speed and direction of the object 213 with respect to the robot arm 201. The radar processor 210 may then for example supply this calculated information to the robot controller 206 which may control the robot arm 201 accordingly, e.g. to grab the object 213.

Figure 3:
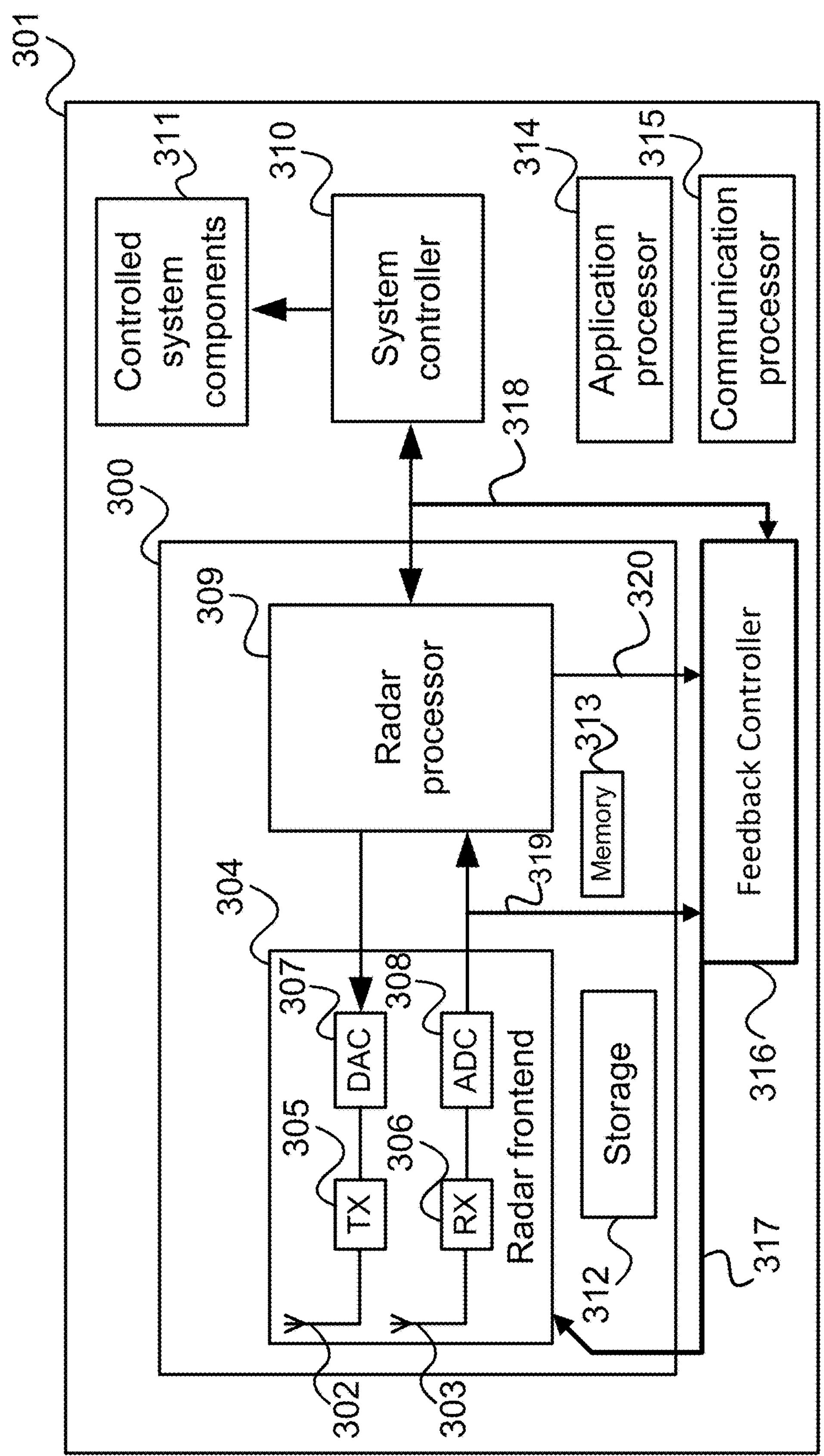
FIG. 3 shows an exemplary radar device.

While FIGS. 1 and 2 illustrate specific application examples of a radar device, a radar device in a more general context is illustrated in FIG. 3.

FIG. 3 shows a radar device 300.

The radar device 300 is part of a system 301, which, as in the examples above, may for example be an autonomous device such as a vehicle or a robot. The radar device 300 includes an antenna arrangement, which in this example includes one or more transmit antennas 302 and one or more receive antennas 303. The radar device 300 further includes a radar frontend 304 and a radar processor 309.

The one or more transmit antennas 302 are coupled with a transmitter (or transmitter arrangement) 305 of the radar frontend 304. The one or more receive antennas 303 are coupled with a receiver (or receiver arrangement) 306 of the radar frontend 304. The transmitter 305 may for example include an oscillator and a power amplifier to generate radio transmit signals. The receiver 306 for example includes one or more mixers and one or more filters for down-converting radio signals received via the one or more receive antennas.

The radar processor 309 supplies digital radar transmit data values to the radar frontend 304. The radar frontend 304 includes a digital-to-analog converter (DAC) 307 which converts the digital radar transmit data values to an analog transmit signal. The transmitter 305 converts the analog transmit signal to a radio transmit signal which it transmits via the one or more transmit antennas 302.

The receiver 306 converts a radio receive signal received via the one or more receive antennas 303 to an analog receive signal. The radar frontend 304 includes an analog-to-digital (ADC) converter 308 which generates digital radar reception data values from the analog receive signal which it supplies to the radar processor 309. The digital (radar) reception data (including the digital (radar) reception data values) as output by the ADC 308 (or more than one ADC, i.e. in case of IQ output) is also referred to as radar measurement data or raw (radar) reception data (including raw (radar) reception data values also referred to as radar reception samples).

The radar processor detects one or more objects using the digital radar reception data values. This detection may include the determination of information including one or more of range, speed and direction of the one or more objects with respect to the system 301.

The radar processor 309 for example supplies the determined information to a system controller 310 (e.g. a vehicle controller or robot controller) which controls controlled system components 311 of the system 301 (e.g. a motor, a brake, steering etc.), e.g. by means of corresponding actuators.

The radar device 300 may include a storage 312 or a memory 313, e.g. storing digital radar reception data values being processed by the radar processor 309.

The system 301 may for example include an application processor 314 and a communication processor 315 or both which may for example at least partially implement the system controller 310 and perform communication between the system controller 310, the radar device 300 and the controlled system components 311.

In the above examples, the radio transmit signal 105, 214 may include a plurality of pulses. Pulse transmission includes the transmission of short high-power bursts in combination with times during which the radar device listens for echoes 107, 215. This is typically not optimal for a highly dynamic situation like in an automotive scenario. Therefore, a continuous wave (CW) may instead be used as radio transmit signal. However, a continuous wave (with constant frequency) only allows radial velocity determination, but does not allow range determination (due to the lack of a time mark that could allow distance calculation). To also allow speed as well as range determination, approaches like frequency-modulated continuous wave (FMCW) radar, phase-modulated continuous wave (PMCW) radar or orthogonal frequency division multiplexing (OFDM) radar may be used. In the following, FMCW is explained in more detail as an example.

According to an aspect of the disclosure, the system 301 may include a feedback controller 316, which may be configured to determine a plurality of reconfigurable radio parameters 317, for example, based on output 318 of the radar processor 309. The reconfigurable radio parameters 317 may include a waveform, a modulation, a center frequency, a bandwidth, a polarization, a beamforming directivity, phase and/or amplitude values, e.g., control signals to the radar frontend, for example a radiofrequency lens, antennas, transmitters and receivers, and/or any other additional or alternative parameters. The feedback controller 316 may be configured to determine the reconfigurable radio parameters, for example, based on one or more sensing indicators, such as maximum unambiguous ranger (Rmax), maximum radial velocity (Vmax), angular FOV (HFOV, VFOV), range resolution (Rres), radial velocity resolution (Vres), or Angular resolution (at boresight) (Hres, Vertical-Res).

According to various aspects of the disclosure, the feedback controller 316 may be configured to feedback the reconfigurable radio parameters 317 to the radar frontend 304.

According to some aspects of the disclosure, the feedback controller 316 may be configured to determine the plurality of reconfigurable radio parameters 317, for example, based on digital radar samples 319.

According to some aspect of the disclosure, the feedback controller 316 may be configured to determine the plurality of reconfigurable radio parameters 317 based on any other additional or alternative input from one or more additional or alternative elements of the vehicle 100 or robot 200.

According to other aspects of the disclosure, the feedback controller 316 may include an artificial intelligence engine, which may be trainable, for example, according to the radar perception data 318, the digital radar samples 319, and/or intermediate radar processing data 320 from the radar processor 309.

According to some aspects of the disclosure, the radar processor 309 and/or the feedback controller 316 may include, or may be implemented, partially or entirely, by circuitry and/or logic, e.g., one or more processors including circuitry and/or logic, memory circuitry and/or logic. Additionally or alternatively, one or more functionalities of radar processor 309 and/or feedback controller 316 may be implemented by logic, which may be executed by a machine and/or one or more processors, e.g., as described herein.

According to an aspect of the disclosure, the radar processor 309 and/or feedback controller 316 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

According to other aspects of the disclosure, radar processor 309 and/or feedback controller 316 may be implemented by one or more additional or alternative elements of vehicle 100 or robot 200.

According to some aspects of the disclosure, at least part of the functionality of radar processor 309 and/or feedback controller 316 may be implemented as part of system controller 310.

In other embodiments, the functionality of radar processor 309 and/or feedback controller 316 may be implemented as part of any other element of radar 300 vehicle 100, and/or robot 200.

According to some aspects of the disclosure, the feedback controller 316 may be configured to determine the plurality of reconfigurable radio parameters 317, for example, based on a reliability indicator from radar processor 309.

According to some aspects of the disclosure, feedback controller 316 may be configured to determine the plurality of reconfigurable radio parameters 317, for example, based on the digital radar samples 319.

According to some aspects of the disclosure, feedback controller 316 may be configured to adaptively determine the plurality of reconfigurable radio parameters 317 in real time, for example, based on previous radar perception data corresponding to previously processed digital radar samples. For example, feedback controller 316 may be configured to temporarily store the previously processed digital radar samples, and to retrieve the previously processed digital radar samples for processing together with current radar perception data received from radar processor 309, such as in real time.

According to some aspects of the disclosure, the radar 300 may be configured to support a combination of radar processor 309 and feedback controller 316, for example, to provide a reinforcement learning based feedback control engine, which may be, for example, optimized to generate radar perception data 318 with low latency.

According to some aspects of the controller, the reinforcement learning based feedback control engine may include two AI engines, for example, forward and feedback AI engines, e.g., the radar perception processor 309 and feedback controller 316, which may provide learning and cognitive functionalities of radar 300. These functionalities may mitigate interference, may improve signal to interference plus noise ratio, and/or may increase (e.g., optimize) a perception accuracy of radar 300.

Figure 4:
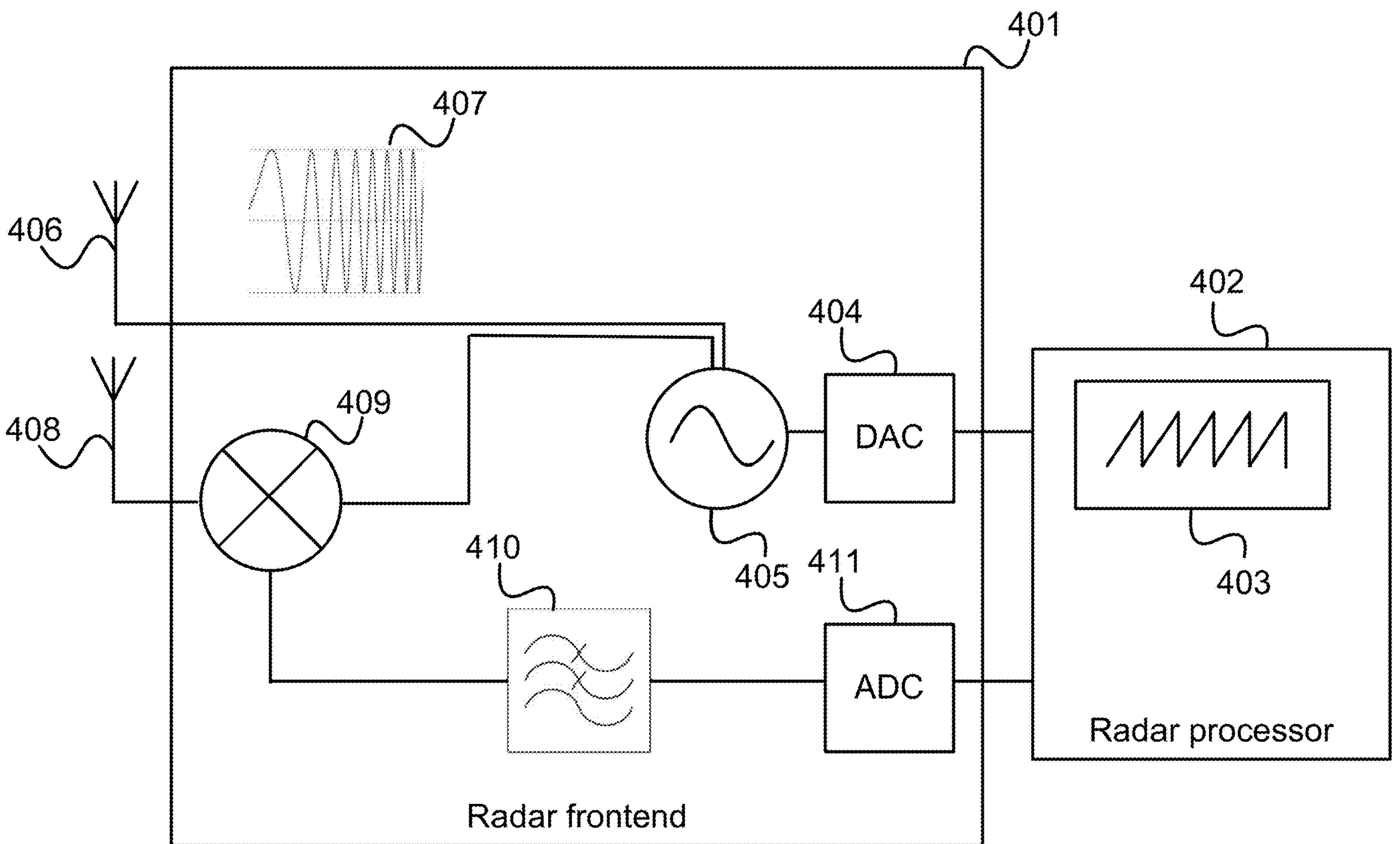
FIG. 4 shows an FMCW (frequency-modulated continuous wave) radar device.

According to some aspects of the disclosure, the feedback controller 316 may adaptively change the reconfigurable radio parameters According to some aspects of the disclosure, the feedback controller 316 may adaptively change the reconfigurable radio parameters 317, for example, based on one or more principles and/or conceptions, e.g., as described herein. The feedback controller 316 may be configured to adaptively determine the plurality of reconfigurable radio parameters in real time based on previous radar perception data corresponding to previously processed digital radar samples. For example, and according to some aspects of the disclosure, the feedback controller 316 may be configured to temporarily store the previously processed digital radar samples, and to retrieve the previously processed digital data received from radar processor 309 in real time. According to other aspects of the disclosure, the feedback controller 316 may be configured to adaptively change the reconfigurable radio parameters 317 to affect a transmitted waveform, antenna parameters and/or the like. FIG. 4 shows an FMCW radar device 400.

The FMCW radar device 400 includes a radar frontend 401, e.g. corresponding to radar frontend 304, and a radar processor 402, e.g. corresponding to radar processor 309.

According to FMCW radar, rather than sending a radio transmit signal with a constant frequency, the frequency of the transmit signal is periodically ramped up and reset according to a saw tooth (or alternatively a triangle) waveform 403 which, in this example, the radar processor 402 supplies in digital form (i.e. as a sequence of digital values) to the radar frontend 401.

A DAC 404 of the radar frontend 401 converts the saw tooth waveform 403 to analog form and supplies it to a voltage-controlled oscillator 405 such that an output signal of the oscillator 405 is frequency-modulated in accordance with the sawtooth waveform 403.

The output signal of the oscillator 405 is a radio transmit signal which is fed to and sent out by one or more transmit antenna 406.

According to its generation, the radio transmit signal has the form of a sequence of chirps 407, which are result of the modulation of a sinusoid with the saw tooth waveform 403. One single chirp 407 corresponds to the sinusoid of the oscillator signal frequency-modulated by one "tooth" of the saw tooth waveform 403 from the minimum frequency to the maximum frequency.

Regarding reception, one or more receive antennas 408 receive the echo of the radio transmit signal (in addition to noise etc.) as radio receive signal. A mixer 409 of the radar frontend 401 mixes the radio transmit signal with the radio receive signal. The result of the mixing is filtered by a low pass filter 410, converted to digital (radar) reception data values by an ADC 411 and supplied to the radar processor 402. It should be noted that the filter 410 may also be a digital filter and the ADC 411 may for this be arranged between the mixer 409 and the filter 410.

The radar processor may determine range, speed (radial velocity) and direction information of one or more objects from the digital reception data values.

For this, the radar processor 402 performs two FFTs (Fast Fourier Transforms) to extract range information (by a first FFT, also denoted as range FFT) as well as radial velocity information (by a second FFT, also denoted as Doppler FFT) from the digital reception data values.

Figure 5:
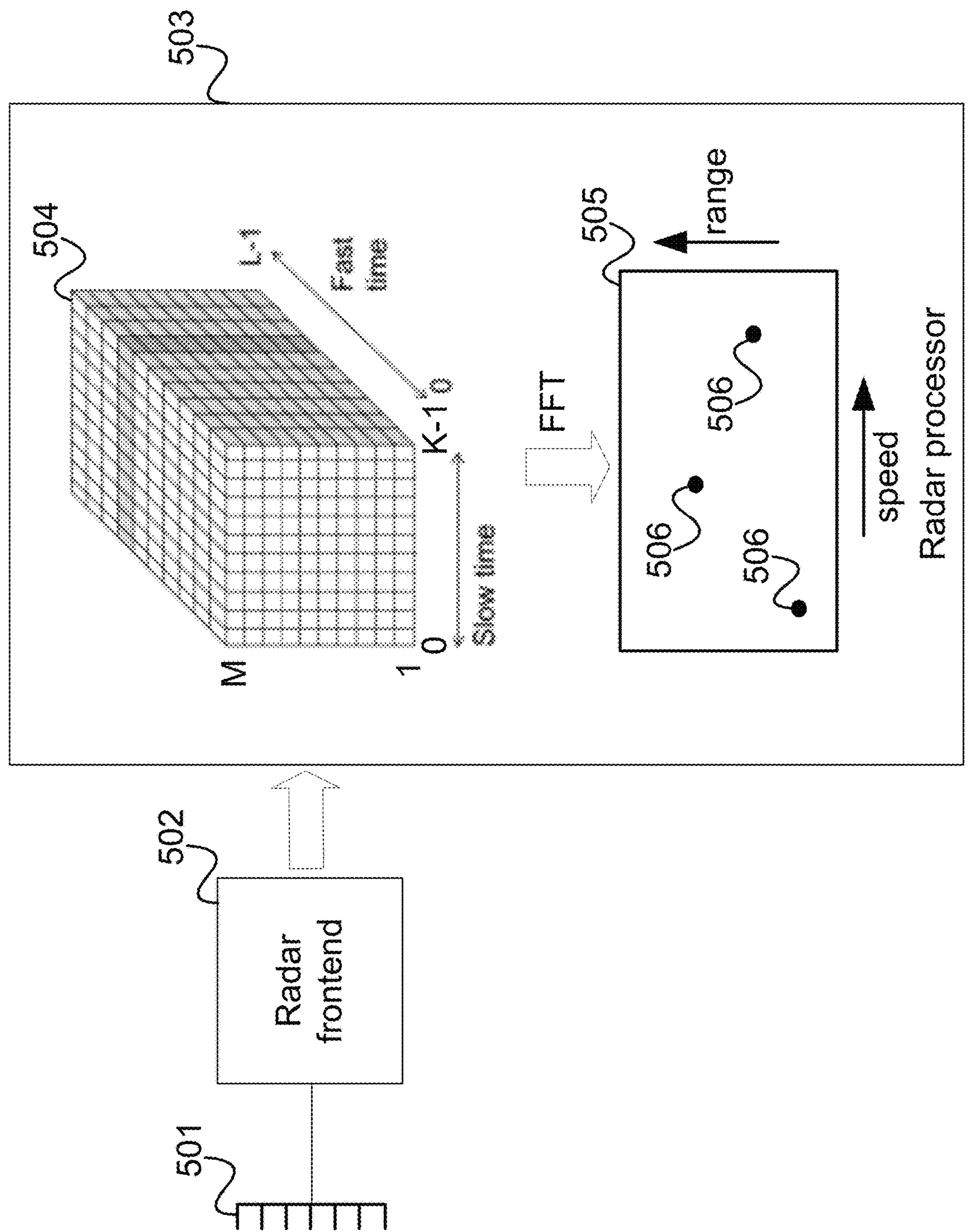
FIG. 5 illustrates the extraction of range and speed estimations from digital reception data values.

FIG. 5 illustrates the extraction of range and speed estimations from digital reception data values.

A receive antenna array 501 receives a radio receive signal (including echoes of a radio transmit signal). The radio receive signal is processed by a radio radar frontend 502 to generate digital reception data values as explained above with reference to FIG. 4. The radio radar frontend 502 supplies the digital reception data values to a radar processor 503. The digital reception data values may be represented in the form of a data cube 504.

The data cube 504 includes digitized samples of the radio receive signal from M antennas (or virtual antennas or in general antenna channels), wherein each (horizontal) layer of the data cube 504 includes the samples of a respective antenna. For each chirp, the data cube 504 includes L samples (e.g. L=512), which are arranged in the so-called "fast time"-direction. The data cube 504 includes samples for K chirps, which are arranged in the so-called "slow time"-direction.

The radar processor 503 processes the L samples collected for each chirp and for each antenna by a first FFT. The first FFT is performed for each chirp and each antenna, so that the result of the processing of the data cube 504 by the first FFT has again three dimensions and may have the size of the data cube 504 but longer has values for L sampling times but instead values for L range bins.

The radar processor 503 then processes the result of the processing of the data cube 504 by the first FFT by a second FFT along the chirps (for each antenna and for each range bin).

This means that the direction of the first FFT is "fast time", whereas the direction of the second FFT is "slow time".

The result of the second FFT gives, when aggregated over the antennas, a range-Doppler (R/D) map 505 which has FFT peaks 506 (i.e. peaks of FFT output values (in terms of absolute values) for certain range/speed combinations (i.e. for range-Doppler bins, wherein each range-Doppler bin corresponds to a range bin and a Doppler bin). The radar processor 503 may consider each peak as corresponding to an object (of the range and speed of the peak's range bin and speed bin).

It should be noted that while the above example was given for FMCW radar, the radar processor 503 may also determine a range-Doppler map 505 from digital reception data values of PMCW radar or OFDM radar or other radar technologies.

Using, as a receive antenna arrangement 303, an a receive antenna array having a plurality of receive antennas allows the radar processor 309 further to determine the angle of arrival of echoes 105, 215 and thus to determine the direction of a detected object with respect to the system 301.

Figure 6:
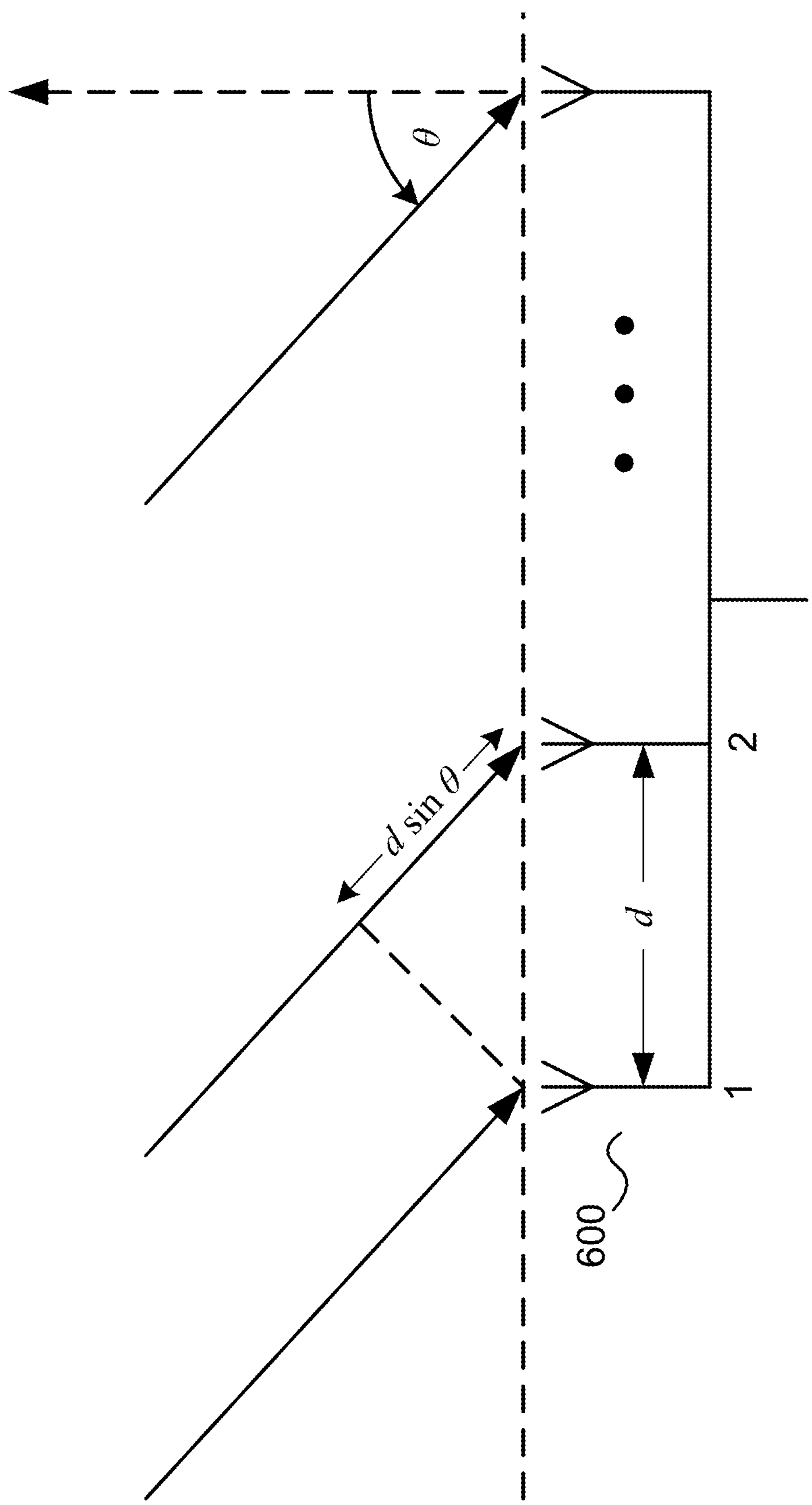
FIG. 6 illustrates the determination of an angle of arrival of an incoming radio signal received by a receive antenna array.

FIG. 6 illustrates the determination of an angle of arrival of an incoming radio signal received by a receive antenna array 600.

The receive antenna array 601 includes M antennas (numbered, from left to right, 1 to M).

In the example of FIG. 6, it is assumed that an echo is coming from an object located at the top left direction. Accordingly, the direction of the echo (i.e. the incoming radio signal) is towards the bottom right. Thus, the further to the left a receive antenna is located, the earlier it will receive a certain phase of the incoming radio signal. More specifically, the phase difference between two antennas of the receive antenna array 601 is $$\Delta\varphi = \frac{2\pi}{\lambda} d \cdot \sin\theta$$

where λ is the wavelength of the incoming radio signal, d is the distance between the two antennas and θ is the angle of arrival of the incoming radio signal (with respect to the radio array's normal direction).

This relation between phase and angle of the incoming radio signal allows the radar processor 309 to determine the angle of arrival of echoes, for example by performing a third FFT (angular FFT) over the antennas.

To increase the spatial resolution (i.e. to have high-resolution radar), multiple transmit antennas, i.e. an antenna array having multiple antennas, may be used, resulting in a MIMO (multiple input multiple output) radar device.

Figure 7:
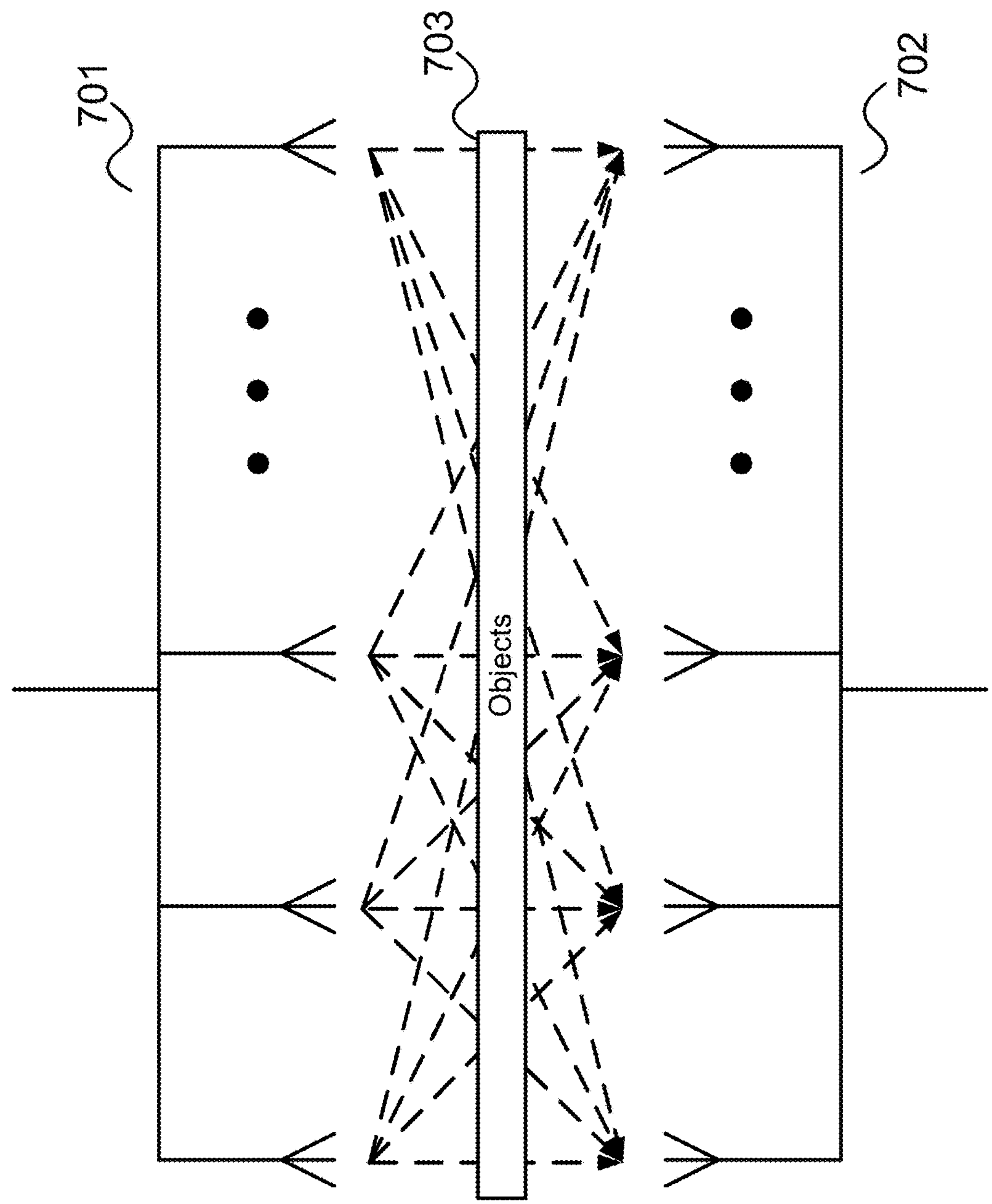
FIG. 7 illustrates a radar MIMO (multiple-input multiple-output) arrangement including a transmit antenna array and a receive antenna array.

FIG. 7 illustrates a radar MIMO arrangement including a transmit antenna array 701 and a receive antenna array 702. The transmit antenna array 701 for example corresponds to the one or more transmit antennas 302 and the receive antenna array 702 for example corresponds to the one or more receive antennas 303.

Having antenna arrays including multiple antennas both for transmitting the radio transmit signals and receiving echoes results in a plurality of virtual channels as illustrated by the dashed lines, one from each transmit antenna to each receive antenna via objects 703.

This is achieved by having each transmit antenna send out an individual radio transmit signal (e.g. having a phase associated with the respective transmit antenna). In case of N transmit antennas and M receive antennas the result is a virtual array of size N×M.

Figure 8:
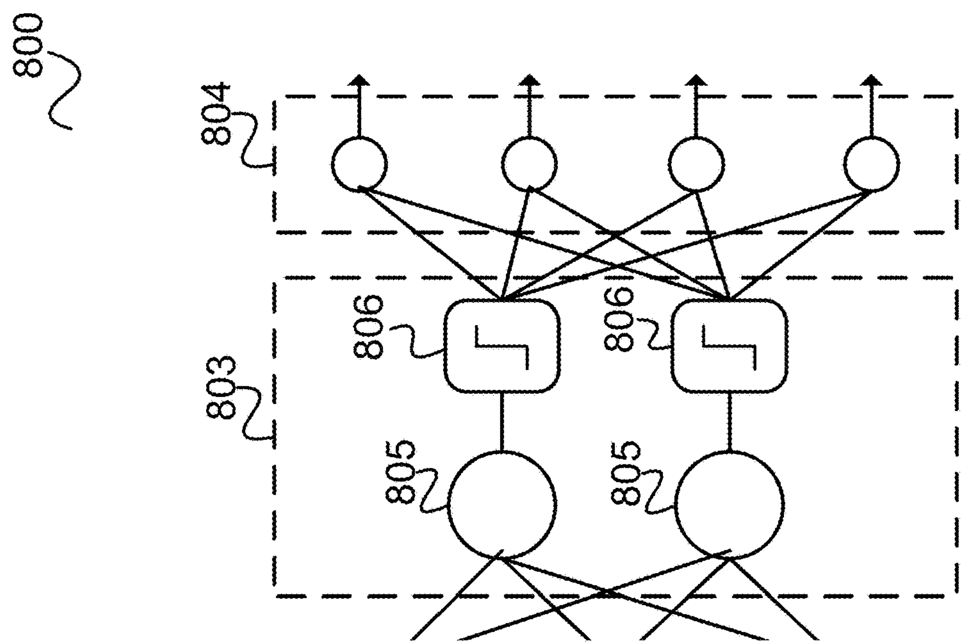
FIG. 8 shows an example of a neural network.
Figure 8:
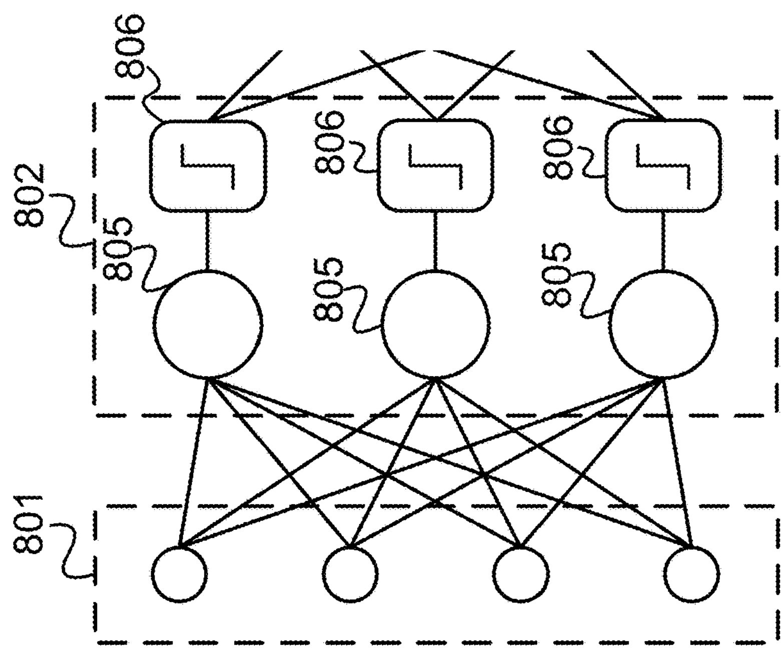

FIG. 8 shows an example of a neural network 800.

The neural network 800 contains an input layer 801, a sequence of hidden layers 802, 803 and an output layer 804.

The neural network 800 is configured to map input data to output data. The input data may for example be digital reception data values provided by a radar frontend, and the output data may include information of objects such as range, speed and direction with respect to a system (e.g. a vehicle or robot) containing the radar frontend.

The input data is supplied to the neural network 800 by the input layer 801 and the neural network 800 provides the output data by the output layer 804.

The input data is for example in the form of a multidimensional array of values, for example a data cube. The input layer 801 supplies the input data to the neurons (perceptron) 805 of the first layer 802 of the sequence of hidden layers.

In the illustrated example, the layers 802, 803 are fully connected (FC) layers. Each perceptron 805 of a layer multiplies each input value of the data input to the layer by a weight and sums the calculated values. Additionally, a perceptron 805 may add a bias to the sum. Each perceptron 805 is followed by a nonlinear activation function 806, e.g., a ReLU unit (f(x)=max(0,x)) or a sigmoid function (f(x)=1/(1+exp(−x))). The resulting value is then output to the next layer (i.e. is an input value of the data input to the subsequent layer of the sequence of layers).

The neural network 800 may also have other types of layers, in particular convolutional layers and pooling layers which are typical for a convolutional neural network (CNN).

Figure 9:
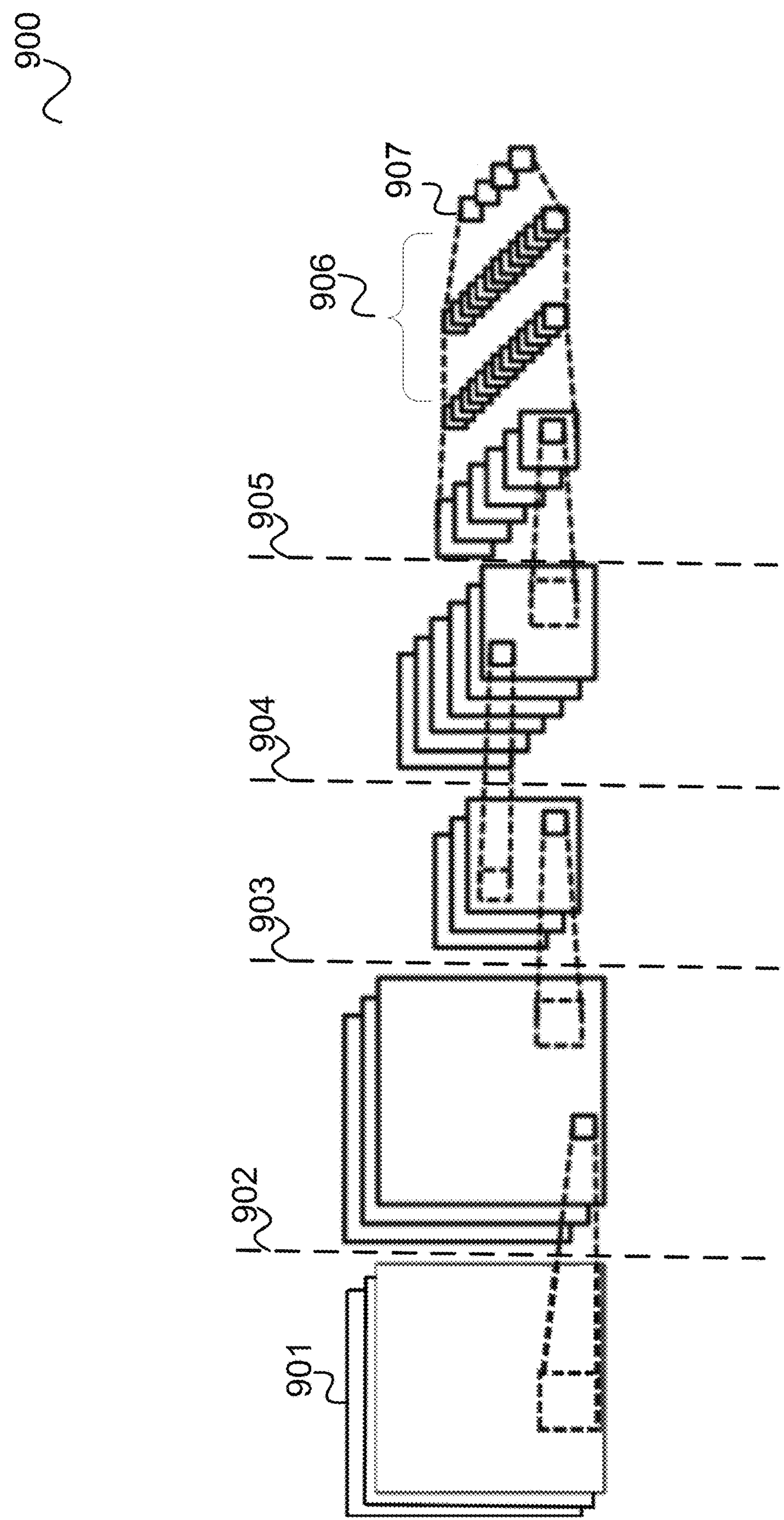
FIG. 9 shows an example of a convolutional neural network.

FIG. 9 shows an example of a convolutional neural network 900.

In the illustration of FIG. 9 only the input data and output data of the various layers of the neural network 900 are indicated as rectangles while the layers are indicated by dashed lines.

In the example of FIG. 9, the input data are three matrices which can also be seen as a three-dimensional array, e.g. forming a data cube.

The input data is processed by a first convolutional layer 902. In a convolutional layer (or convolutional layer) the input data is modified by one or more convolution filters.

Each convolution filter takes a subset of the input data and applies a convolution to it. They can be interpreted to represent possible features in the input data, such as a certain shape. The output of each convolution filter (after being applied to multiple subsets of the input data) can be seen as a feature map.

Typically, a convolution filter is moved over the entire input data (e.g. "pixel-by-pixel" if the input data is viewed as an image). This may be done for each matrix (i.e. 2-dimensional array) of the input data or the convolution filters may be used that is three dimensional to process multiple data cube layers (i.e. multiple 2-dimensional layers of the input data of the respective convolutional array) together.

Figure 10:
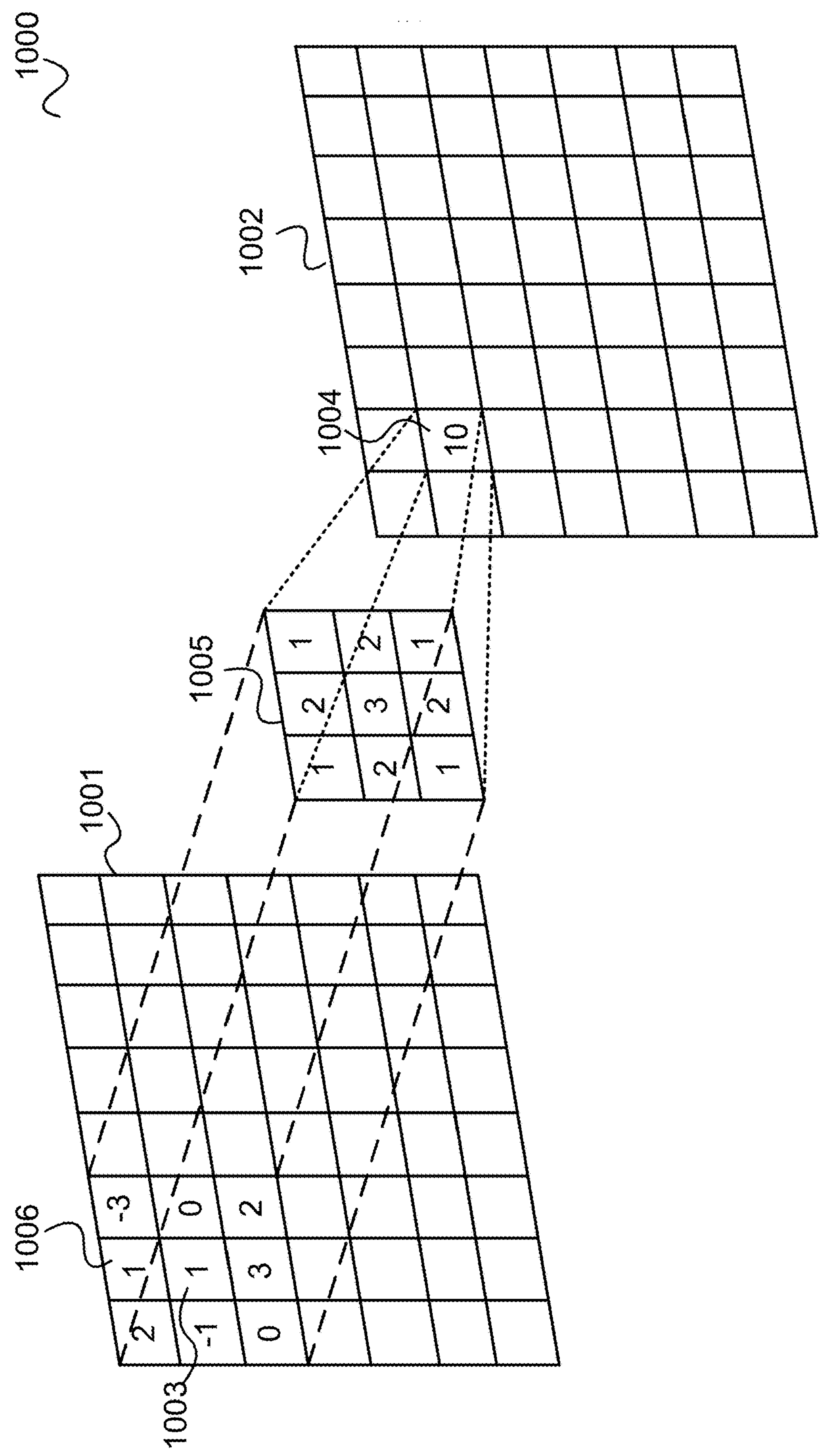
FIG. 10 illustrates the application of a convolution filter to two-dimensional input data.

FIG. 10 illustrates the application of a convolution filter to two-dimensional input data 1001.

The input data 1001 of the filter is shown as a two-dimensional matrix. Similarly, the output data 1002 of the filter is shown as a two-dimensional matrix. In the case of multiple layers, several such matrices can be "superimposed" (and form a tensor), but for simplicity only one layer is considered.

The output value 1004 for an input value 1003 is obtained by applying a filter matrix 1005 to the input value 1003 and its surrounding values 1006 (represented in FIG. 10 by the components of the matrix except the input value 1003, for which exemplary entries are shown). The size of the surrounding area from which the surrounding values 1006 are taken is given by the filter matrix 1005. The surrounding values 1006 together with the input value 1003 form a submatrix of the input data, which has the same size as the filter matrix 1005. The filter matrix 1005 is applied to the input value 1005 and its surrounding values 1006 by forming the inner product of the filter matrix 1005 with the submatrix (both matrices are regarded as vectors). The result of the inner product is the output value 1004. For the exemplary values shown in FIG. 10, the following is obtained $$1*2+2*1+1*(-3)$$

$$+2*(-1)+3*1+2*0$$

$$+1*0+2*3+1*2=10$$

For a matrix as input data, each entry of the filter matrix can thus be understood as a weighting value for a component value in the sub-matrix of the input data.

In the example of FIG. 10, the filter matrix 1005 is a 3×3 matrix, but it can also have a different size. The total output values of the output data of the convolutional filter are generated by shifting the filter matrix over the input data 1001 so that the output data 1002 in the end corresponds to the convolution of the input data 1001 with the convolutional filter's filter matrix 1005.

It should be noted that when the filter matrix 1005 is moved to an edge of the input data (i.e. the current the input value 1003 is at the edge of the input data matrix), there are not values in the input data for all values of the filter matrix 1005. One way of handling the edges is to move the filter matrix only as long as the input data has a value for the whole filter matrix (i.e. do not move it completely to the edge of the input data matrix). However, this can reduce the output dimension (i.e. the matrix dimension of the output data 1002) compared to the matrix dimension of the input data 1001.

In order to avoid reducing the output dimension with respect to the input dimension, a padding of the input data may be performed. For example, the edges of the input data 1001 are padded with zeros (zero padding). For example, an input data matrix 1001 is padded with zeros on all four sides so that the output of a 3×3 filter (which is moved over the padded matrix) has the same dimension as the original input matrix. It can also be padded so that the dimension of the output is larger than the dimension of the input.

In a convolutional layer 902, the convolution filters are typically followed by a nonlinear activation function, e.g. a ReLU.

Following processing by the nonlinear activation function, the data is then passed to a pooling layer 903. In the pooling layer 903, a filter is also moved over the input data, and this filter usually outputs the maximum or average of several input values. In the representation of FIG. 10, the values of the submatrix (with the input value 1003 in the middle) are averaged, or their maximum is taken in order to generate the output value 1004. Typically, a pooling filter has a step size greater than one, for example, a step size of two or three. For example, a 2×2 filter with a step size of two is moved over an input data matrix, which returns the maximum of four input values each. In other words, the pooling layer combines several input values, that is, aggregates them, which is why it is also called aggregation layer. The operation of the pooling layer can also be seen as sub-sampling, which is why it can also be called sub-sampling layer.

In other words, a pooling layer can be seen as a form of nonlinear down-sampling in which the amount of data is reduced by combining the outputs of multiple nodes into a single node in the next layer, for example, by including the maximum value of the outputs.

In the pooling layer 903, there is typically no activation function, so pooling can also be considered a part of the preceding convolutional layer (or any other layer) (typically, each layer of a neural network has an activation function).

In the example of FIG. 9, the pooling layer 903 is followed by a second convolutional layer 904, which in turn is followed by a second pooling layer 905. It should be noted that a convolutional layer can also be directly followed by another convolutional layer (without pooling), and that many more convolution and/or pooling layers can be part of a convolutional neural network. In the present example, the second pooling layer 905 is followed by two fully connected layers 906, wherein the output tensor of the second pooling layer 905 is flattened to a (one-dimensional) vector before feeding it to the first one of the fully connected layers 906.

An output layer receives the data from the second fully connected layer 906 and outputs output data 907.

A radar device such as radar device in FIG. 3 may transmit wireless signals according to transmit waveforms and then receive reflections of the transmit wireless signals The radar device may determine locations of objects (e.g., perform object detection) within an environment based on the received wireless signals. The radar device may determine (e.g., estimate) object parameters of the objects, such as locations, relative speeds and even classify the type of objects (vehicle, pedestrian etc.). Noise sources, outliers, interferers and multipath may cause interference within the radar device. In addition, parameters of the environment may change periodically.

The radar device may adjust the transmit waveform to improve radar performance. Some radar devices may wait for input received from an external source (e.g., human input) to adjust different transmit waveforms. In addition, the radar devices may adjust operative parameters of a radar detector of the radar device. However, the radar devices may also wait for input receiver from an external source to adjust the radar detector. Waiting for input from the external source may be time consuming and reduce performance of the radar device.

Some aspects described in the present disclosure may include a radar device that includes a radar detector or a receiver that is capable of updating the transmit waveform, the operative parameters of the radar detector, or some combination thereof.

An example radar device may include a radar processor and a radar detector. The radar processor may transmit wireless signals within an environment. The radar processor may also receive wireless signals including reflections of the transmit wireless signals. The radar processor may generate a scene that includes or more objects based on the receive wireless signals The radar processor may also generate one or more ground truth object parameters and a dataset representative of the scene.

The radar detector may include a neural network that operates at a high frequency to quickly determine an error value. The error value may indicate an accuracy of object detection by the radar detector. The radar detector may determine one or more object parameters of the one or more objects. The radar detector may use a machine learning algorithm and the dataset to determine the object parameters. The machine learning algorithm may include weighted values that each correspond to different object parameters. The radar detector may determine an error value of the machine learning algorithm. The radar detector may determine the error value using a cost function, the one or more object parameters, and the one or more ground truth object parameters.

In some aspects, the cost function may permit multi-object detection and tracking. The machine learning algorithm may output a probability function and a scalar (e.g., the machine layer may include a probability density head and a regression head). The radar detector may adjust one or more weighted values based on the error value to reduce the error value.

A radar device may adjust the weighted values and the transmit waveform using the machine learning algorithm. The radar processor may generate a first dataset representative of the scene. The receiver may generate one or more ground truth object parameters. In addition, the receiver may generate a second dataset representative of the scene based on the first dataset.

The receiver may determine one or more object parameters of the one or more objects of the scene. The receiver may determine the object parameters using the machine learning algorithm and the second dataset. The machine learning algorithm may include the vector of weighted values.

The receiver may determine an error value of the machine learning algorithm using the cost function, the one or more object parameters, and the one or more ground truth object parameters. In addition, the receiver may adjust one or more of the weighted values based on the error value to reduce the error value. Further, the receiver may adjust the transmit waveform based on the error value to further reduce the determined error value.

Accordingly, at least one aspect described in the present disclosure may improve accuracy of object detection by the radar device. In addition, at least one aspect described in the present disclosure may permit performance of the radar device to be improved by adjusting the transmit waveform and adjusting the receiver.

Figure 11:
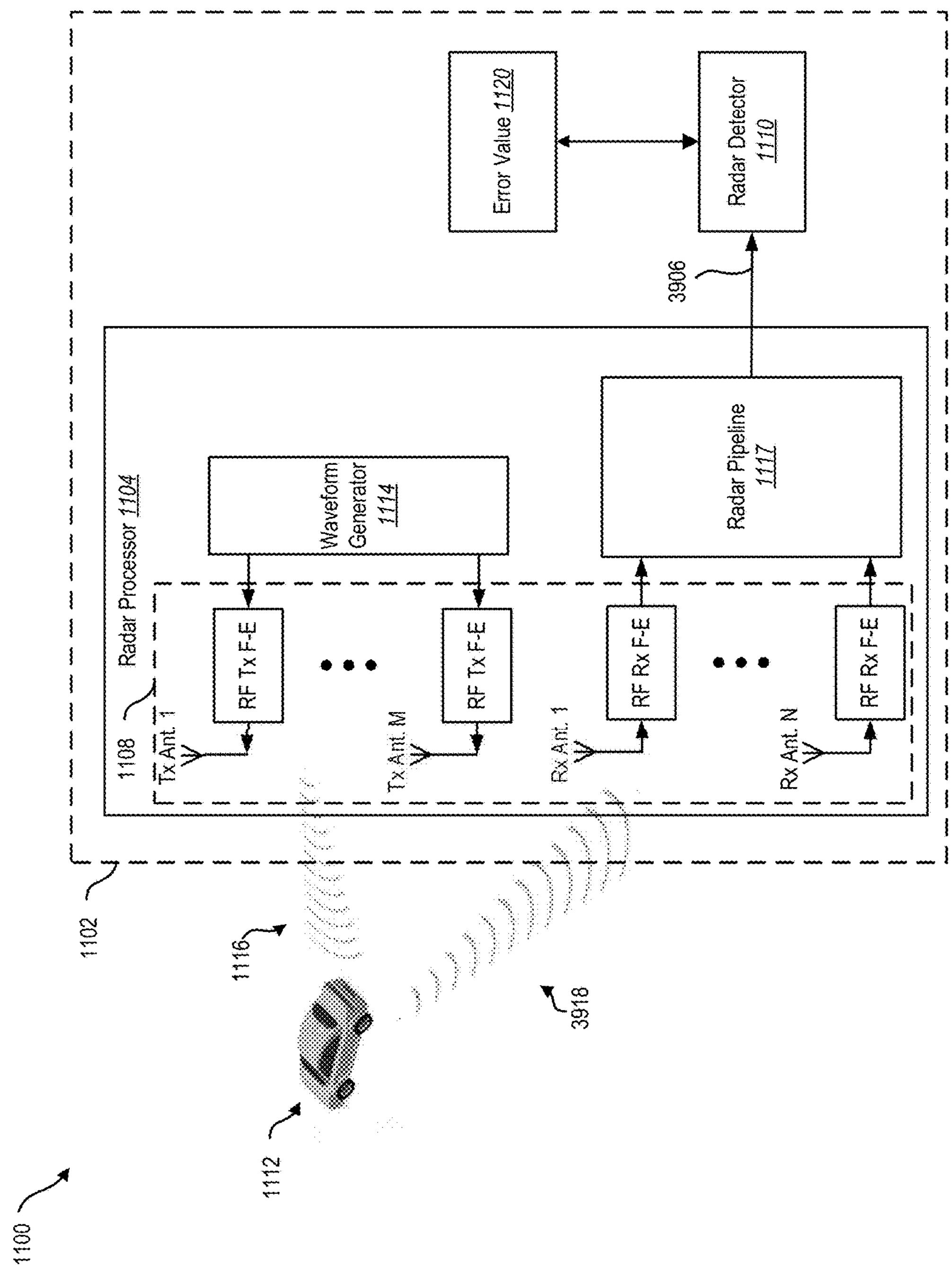
FIG. 11 illustrates a block diagram of an example operational environment in which a radar device may operate.

FIG. 11 illustrates a block diagram of an example operational environment 1100 in which a radar device 1102 may operate, in accordance with at least one aspect described in the present disclosure. The radar device 1102 may correspond to the radar devices 101, 300, 400 discussed in relation to FIGS. 1-4. The environment 1100 may include an object 1112 and the radar device 1102. The object 1112 is illustrated as a car in FIG. 11 for illustrative purposes. The radar device 1102 may include a radar processor 1104 and a radar detector 1110 that may generate an error value 1120. The radar processor 1104 may include RF components 1108 (e.g., antennas and RF front end components), a waveform generator 1114, and a radar pipeline 1117.

In some aspects, the radar detector 1110 may include a neural network machine learning algorithm to perform object detection. In other aspects, the radar detector 1110 may include a parameterized deep fully convolutional neural network machine learning algorithm to perform object detection. The radar detector 1110 may implement the neural network machine learning algorithms in contrast to other detection techniques.

The RF components 1108 (e.g., transmit front end components) may receive a beamformed waveform from the waveform generator 1114. In addition, the RF components 1108 (e.g., transmit antennas) may transmit wireless signals 1116 within the environment 1100. As discussed in more detail elsewhere in the present disclosure, the transmit wireless signals 1116 may reflect off of the object 1112 as receive wireless signals 1118. The RF components 1108 (e.g., receive antennas and receive front end components) may receive the receive wireless signals 1118.

The radar pipeline 1117 may perform cross correlation, doppler estimation, beamforming, or any other technique to process the receive wireless signals 1118. The radar pipeline 1117 may generate a scene representative of the environment 1100. The radar pipeline 1117 may generate the scene based on the receive wireless signals 1118. The scene may include an object representative of the object 1112 in the environment 1100. In addition, the radar pipeline 1117 may generate one or ground truth parameters. Further, the radar pipeline 1117 may generate a dataset 1106 representative of the scene, the one or more ground truth parameters, or some combination thereof. In some aspects, the dataset 1106 may include a FFT four dimensional (4D) complex values image.

The radar detector 1110 may determine object parameters of the object in the scene. The radar detector 1110 may determine the object parameters using a machine learning algorithm and the dataset. The radar detector 1110 may detect the object in the scene based on the determined object parameters. In some aspects, the machine learning algorithm may include a vector of weighted values. Each of the weighted values may correspond to a different object parameter. In some aspects, the object parameters may include a location, a relative speed, a classification, or some combination thereof of each object detected in the scene.

The machine learning algorithm may include a probability density portion that determines a probability distribution of the object detected in the scene. In addition, the machine learning algorithm may include a regression portion that determines a total number of objects detected in the scene. In some aspects, the one or more object parameters may include the determined probability distribution and the determined total number of objects detected in the scene.

The radar detector 1110 may determine the error value 1120. The radar detector 1110 may determine the error value 1120 such that the error value 1120 indicates an accuracy of the determination of the object parameters of the object. The radar detector 1110 may determine the error value 1120 associated with the machine learning algorithm. The radar detector 1110 may use a cost function, the object parameters, and the ground truth object parameters to determine the error value 1120. In some aspects, the error value 1120 may include a 4D output of a non-negative values probability hypothesis density (PHD).

In some aspects, the cost function may include a Kullback-Leibler (KL) divergence function that outputs a PHD. The output PHD may be generated such that an integral of the output PHD over a volume of a state space of the object is equal to the number of objects detected in the scene. The KL divergence function may be defined according to Equation 1:

$$L=N\cdot KL(p_{em}\|\widehat{p_\theta})+\hat{N}-N\log(\hat{N}) \quad \text{Equation 1}$$

in which N may represent an actual number of objects in the scene, $\hat{N}$ may represent the detected number of objects in the scene, $p_{em}$ may represent an empirical distribution of objects in the state-space of the objects, and $\widehat{p_\theta}$ may represent a detected distribution of the objects in the scene. $p_{em}$ may be defined according to Equation 2:

$$p_{em}=\frac{1}{N}\sum\delta_{x_i} \quad \text{Equation 2}$$

in which N may represent the actual number of objects in the scene and δ may represent a Kronecker delta function.

The radar detector 1110 may use the error value 1120 to adjust one or more of the weighted values of the machine learning algorithm. In some aspects, the radar detector 1110 may adjust the one or more weighted values based on the error value 1120 to reduce the error value 1120.

In some aspects, the radar detector 1110 may iteratively perform the operations discussed above to reduce the error value 1120. In these and other aspects, the error value 1120 may include a first error value and a second error value. The radar detector 1110 may determine another set of object parameters of the object in the scene. The radar detector 1110 may use the machine learning algorithm including the adjusted weighted values and the dataset to determine the another set of object parameters.

The radar detector 1110 may determine the error value 1120 to include the second error value 1120. The radar detector 1110 may determine the second error value 1120 to be associated with the machine learning algorithm including the adjusted weighted values when determining the another set of object parameters. The radar detector 1110 may use the cost function, the another set of object parameters, and the ground truth object parameters to determine the second error value 1120.

The radar detector 1110 may determine whether the second error value 1120 is greater than, less than, or equal to the first error value 1120. The radar detector 1110, responsive to the second error value 1120 being less than the first error value 1120, may determine that the accuracy of the determination of the object parameters is improved. For example, the radar detector 1110 may determine that the adjusted weighted values caused the radar detector 1110 to more accurately determine the object parameters compared to the machine learning algorithm including the non-adjusted weighted values. Alternatively, the radar detector 1110, responsive to the second error value 1120 being greater than or equal to the first error value 1120, may determine that the accuracy of the determination of the object parameters is not improved. The radar detector 1110 may adjust one or more of the adjusted weighted values based on a difference between the second error value 1120 and the first error value 1120 to reduce the error value 1120.

Figure 12:
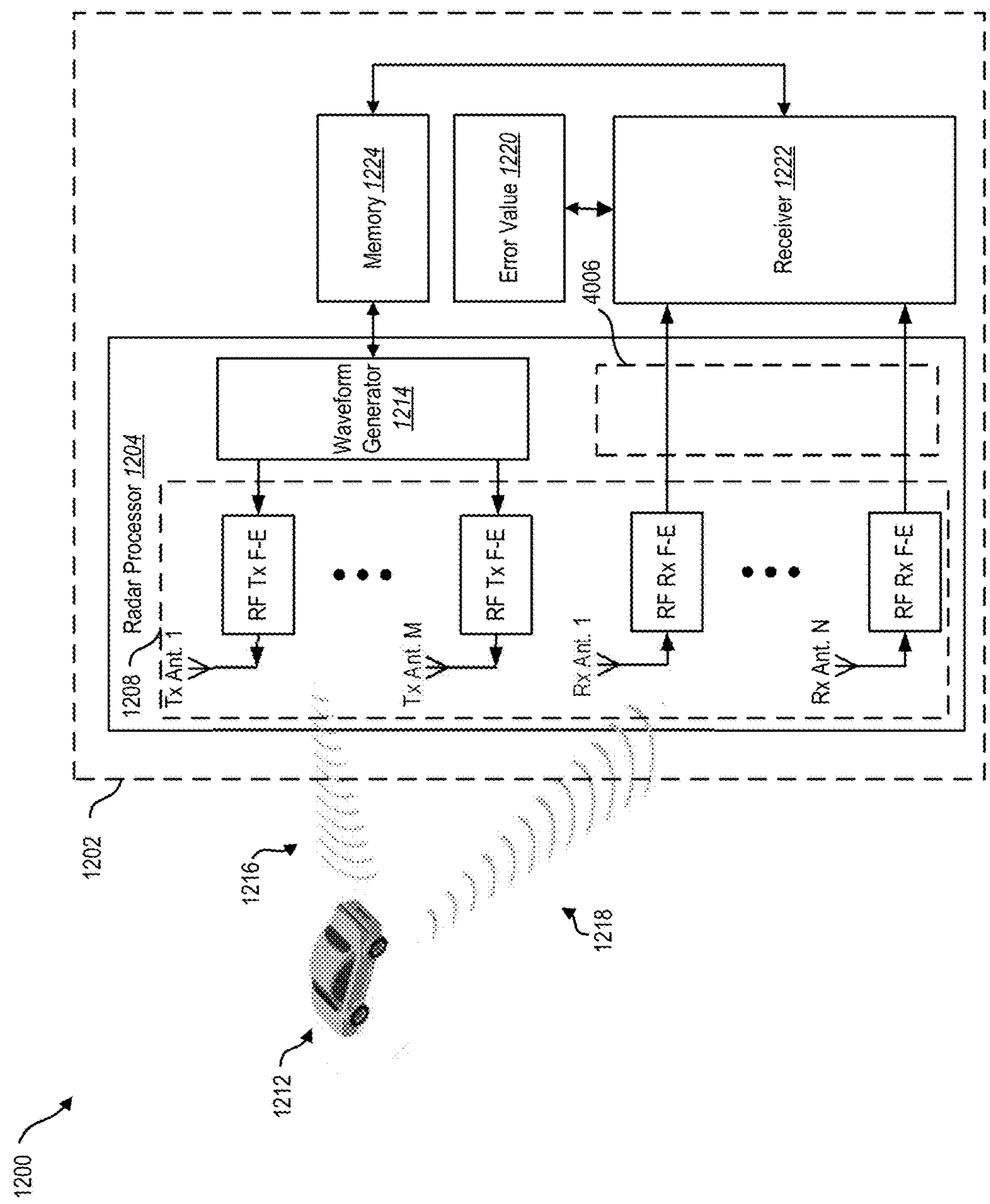
FIG. 12 illustrates a block diagram of an example operational environment in which a radar device may operate.

FIG. 12 illustrates a block diagram of an example operational environment 1200 in which a radar device 1202 may operate, in accordance with at least one aspect described in the present disclosure. The radar device 1202 may correspond to the radar devices 101, 300, 400 discussed in relation to FIGS. 1-4. The environment 1200 may include an object 1212 and the radar device 1202. The object 1212 is illustrated as a car in FIG. 12 for illustrative purposes. The radar device 1202 may include a radar processor 1204, a memory 1224, and a receiver 1222 that may generate an error value 1220. The radar processor 1204 may include RF components 1208 (e.g., antennas) and a waveform generator 1214.

In some aspects, the receiver 1222 may perform the same or similar operations as the radar pipeline 1117 discussed above. However, the receiver 1222 may include a neural network machine learning algorithm to perform these operations and to perform object detection. The radar device 1202 may be configured to adjust aspects within the receiver 1222 and to adjust a transmit waveform.

In some aspects, the receiver 1222 may include a neural network machine learning algorithm to perform object detection. In other aspects, the receiver 1222 may include a parameterized deep fully convolutional neural network machine learning algorithm to perform object detection. The receiver 1222 may implement the neural network machine learning algorithms in contrast to other detection techniques.

The RF components 1208 (e.g., transmit front end components) may receive the transmit waveform from the waveform generator 1214. In addition, the RF components 1208 (e.g., transmit antennas) may transmit wireless signals 1216 within the environment 1200 representative of the transmit waveform. As discussed in more detail elsewhere in the present disclosure, the transmit wireless signals 1216 may reflect off of the object 1212 as receive wireless signals 1218. The RF components 1208 (e.g., receive antennas and receive front end components) may receive the receive wireless signals 1218. The radar processor 1204 may generate a first dataset 1206 representative of the environment 1200 (e.g., a scene representative of the environment 1200). The scene may include an object representative of the object 1212 in the environment 1200. In some aspects, the first dataset 1206 may include IQ samples from the RF components 1208.

The receiver 1222 may receive the first dataset 1206 (e.g., the IQ samples from each receive antenna). In addition, the receiver 1222 may generate ground truth object parameters. Further, the receiver 1222 may generate a second dataset representative of the scene based on the first dataset. In some aspects, the second dataset may include information representative of the transmit waveform, a channel model of a current transmit channel, object scattering parameters, a channel model of a current receive channel, or some combination thereof.

The receiver 1222 may determine object parameters of the object in the scene. The receiver 1222 may determine the object parameters using a machine learning algorithm and the second dataset. The receiver 1222 may detect the object in the scene based on the determined object parameters. In some aspects, the machine learning algorithm may include a vector of weighted values. Each of the weighted values may correspond to a different object parameter. In some aspects, the object parameters may include a location, a relative speed, a classification, or some combination thereof of each object detected in the scene.

The machine learning algorithm may include a probability density portion that determines a probability distribution of the object detected in the scene. In addition, the machine learning algorithm may include a regression portion that determines a total number of objects detected in the scene. In some aspects, the one or more object parameters may include the determined probability distribution and the determined total number of objects detected in the scene.

The receiver 1222 may determine the error value 1220. The receiver 1222 may determine the error value 1220 such that the error value 1220 indicates an accuracy of the determination of the object parameters of the object. The receiver 1222 may determine the error value 1220 associated with the machine learning algorithm. The receiver 1222 may use a cost function, the object parameters, and the ground truth object parameters to determine the error value 1220. In some aspects, the error value 1220 may include a 4D output of a non-negative values PHD.

In some aspects, the cost function may include a KL divergence function that outputs a PHD. The KL divergence function may be defined according to Equation 1 discussed above.

The receiver 1222 may use the error value 1220 to adjust one or more of the weighted values of the machine learning algorithm. In some aspects, the receiver 1222 may adjust the one or more weighted values based on the error value 1220 to reduce the error value 1220. The receiver 1222 may also use the error value 1220 to adjust the transmit waveform to further reduce the error value 1220.

In some aspects, to adjust the transmit waveform, the receiver 1222 may parameterize the transmit waveform. In these and other aspects, the receiver 1222 may convert the transmit waveform into a vector of samples in either a frequency domain or a time domain Alternatively, the receiver 1222 may convert the transmit waveform into a vector of samples based on a probability distribution. The receiver 1222 may adjust one or more samples of the parameterized transmit waveform.

In some aspects, the receiver 1222 may include a transmit neural network. The transmit neural network may receive the current transmit waveform, a noise vector, or some combination thereof. The noise vector may include variables representative of the transmit waveform. In addition, the transmit neural network may determine an adjustment of the noise vector to cause the transmit waveform to be adjusted based on the current transmit waveform. In some aspects, the receiver 1222 may adjust the transmit waveform based on the determined adjustment of the noise vector.

The memory 1224 may receive and store updated transmit waveform from the receiver 1222. In addition, the memory 1224 may provide the updated transmit waveform to the RF components 1208 such that the RF components 1208 generate the transmit wireless signals 1216 representative of the updated transmit waveform.

In some aspects, the receiver 1222 may adjust the weighted values each time the weighted values are adjusted.

In some aspects, the receiver 1222 may iteratively perform the operations discussed above to reduce the error value 1220. In these and other aspects, the error value 1120 may include a first error value and a second error value. The receiver 1222 may determine another set of object parameters of the object in the scene. The receiver 1222 may use the machine learning algorithm including the adjusted weighted values, the second dataset, and the updated transmit waveform to determine the another set of object parameters.

The receiver 1222 may determine the error value 1220 to include the second error value 1220. The receiver 1222 may determine the second error value 1220 to be associated with the machine learning algorithm including the adjusted weighted values when determining the another set of object parameters. The receiver 1222 may use the cost function, the another set of object parameters, and the ground truth object parameters to determine the second error value 1220.

The receiver 1222 may determine whether the second error value 1220 is greater than, less than, or equal to the first error value 1220. The receiver 1222, responsive to the second error value 1220 being less than the first error value 1220, may determine that the accuracy of the determination of the object parameters is improved. For example, the receiver 1222 may determine that the adjusted weighted values caused the receiver 1222 to more accurately determine the object parameters compared to the machine learning algorithm including the non-adjusted weighted values. Alternatively, the receiver 1222, responsive to the second error value 1220 being greater than or equal to the first error value 1220, may determine that the accuracy of the determination of the object parameters is not improved. The receiver 1222 may adjust one or more of the adjusted weighted values, the adjusted transmit waveform, or some combination thereof based on a difference between the second error value 1220 and the first error value 1220 to reduce the error value 1220.

Figure 13:
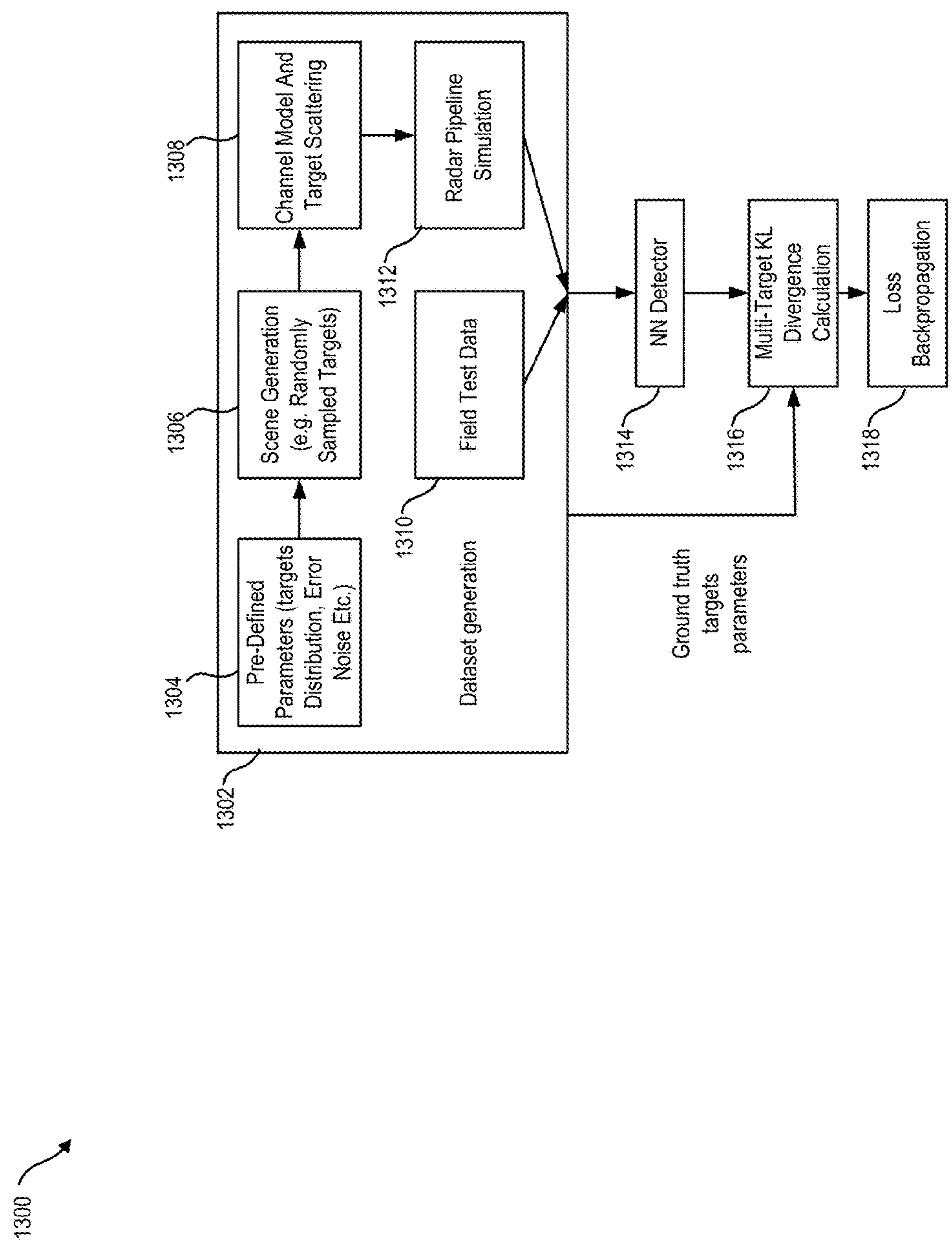
FIG. 13 illustrates a flowchart of an example method to perform object detection by the radar detector.

FIG. 13 illustrates a flowchart of an example method 1300 to perform object detection by the radar detector 1110, in accordance with at least one aspect described in the present disclosure. The method 1300 may be performed by the radar processor 1104, the radar detector 1110, or some combination thereof. The method 1300 may include one or more blocks 1302, 1304, 1306, 1308, 1310, 1312, 1314, 1316, or 1318. Although illustrated with discrete blocks, the steps and operations associated with one or more of the blocks of the method 1300 may be divided into additional blocks, combined into fewer blocks, or eliminated, depending on the particular implementation.

The method 1300, at block 1302, may include generating a dataset. The radar processor 1104 may generate the dataset based on a scene, pre-defined parameters, channel modelling, ground truth parameters (e.g., ground truth target/object parameters), radar pipeline output, field test data, or some combination thereof. Block 1302 may include blocks 1304, 1306, 1308, 1310, and 1312.

The method 1300, at block 1304, may include determining pre-defined parameters. In some aspects, the radar processor 1104 may determine the pre-defined parameters to include targets (e.g., objects) distribution, error noise, etc. In other aspects, the radar processor 1104 may determine the pre-defined parameters to include at least one of noise source parameters, outlier parameters, interference parameters, multipath parameters, and object distribution parameters. In these and other aspects, the radar processor 1104 may determine the pre-defined parameters to include settings of the RF components 1108.

The method 1300, at block 1306, may include generating a scene. In some aspects, the radar processor 1104 may generate the scene to include randomly sample targets (e.g., objects). In these and other aspects, the radar processor 1104 may generate the scene to include one or more objects as randomly sampled objects. The radar processor 1104 may generate the scene based on the pre-defined parameters.

The method 1300, at block 1308, may include modelling a channel and scattering targets (e.g., objects). In some aspects, the radar processor 1104 may model a channel of communication that the radar processor 1104 receives the receive wireless signals 1118 on. In some aspects, the radar processor 1104 may model the channel as a mathematical representation of the channel through which the receive wireless signals 1118 propagate. In addition, the radar processor 1104 may determine one or more object scattering parameters using the scene.

The method 1300, at block 1310, may include generating field test data. In some aspects, the radar processor 1104 may generate the field test data representative of real world data representative of the environment 1200. In addition, the radar processor 1104 may generate the field test data representative of the environment and one or more objects within the environment. The radar processor 1104 may generate the field test data based on the receive wireless signals 1118.

The method 1300, at block 1312, may include simulating a radar pipeline. In some aspects, the radar processor 1104 may simulate the radar pipeline using the modelled channel and the object scattering parameters. In these and other aspects, the radar processor 1104 may simulate cross correlation, doppler estimation, beamforming, etc. as part of simulating the radar pipeline.

The method 1300, at block 1314, may include performing object detection using a neural network (e.g., NN). In some aspects, the radar detector 1110 may determine the object parameters of the objects in the scene. The radar detector 1110 may determine the object parameters using the machine learning algorithm and the dataset. The radar detector 1110 may detect the objects in the scene based on the determined object parameters. In some aspects, the machine learning algorithm may include the vector of weighted values that each correspond to different object parameters.

The method 1300, at block 1316, may include calculating a multi-target KL divergence (e.g., the error value 1120). In some aspects, the radar detector 1110 may determine the error value 1120 such that the error value 1120 indicates an accuracy of the determination of the object parameters of the objects. The radar detector 1110 may calculate the KL cost function according to Equation 1, the object parameters, and the ground truth object parameters to determine the error value 1120.

The method 1300, at block 1318, may include performing loss backpropagation. In some aspects, the radar detector 1110 may backpropagate (e.g., use) the error value 1120 to adjust one or more of the weighted values of the machine learning algorithm. In some aspects, the radar detector 1110 may adjust the one or more weighted values based on the error value 1120 to reduce the error value 1120. In addition, the error value 1120 may be fed back to the radar detector 1110 to improve the object detection of the radar detector 1110. The method 1300 may be performed iteratively to continue to reduce the error value 1120.

Modifications, additions, or omissions may be made to the method 1300 without departing from the scope of the present disclosure. For example, the operations of method 1300 may be implemented in a differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 14:
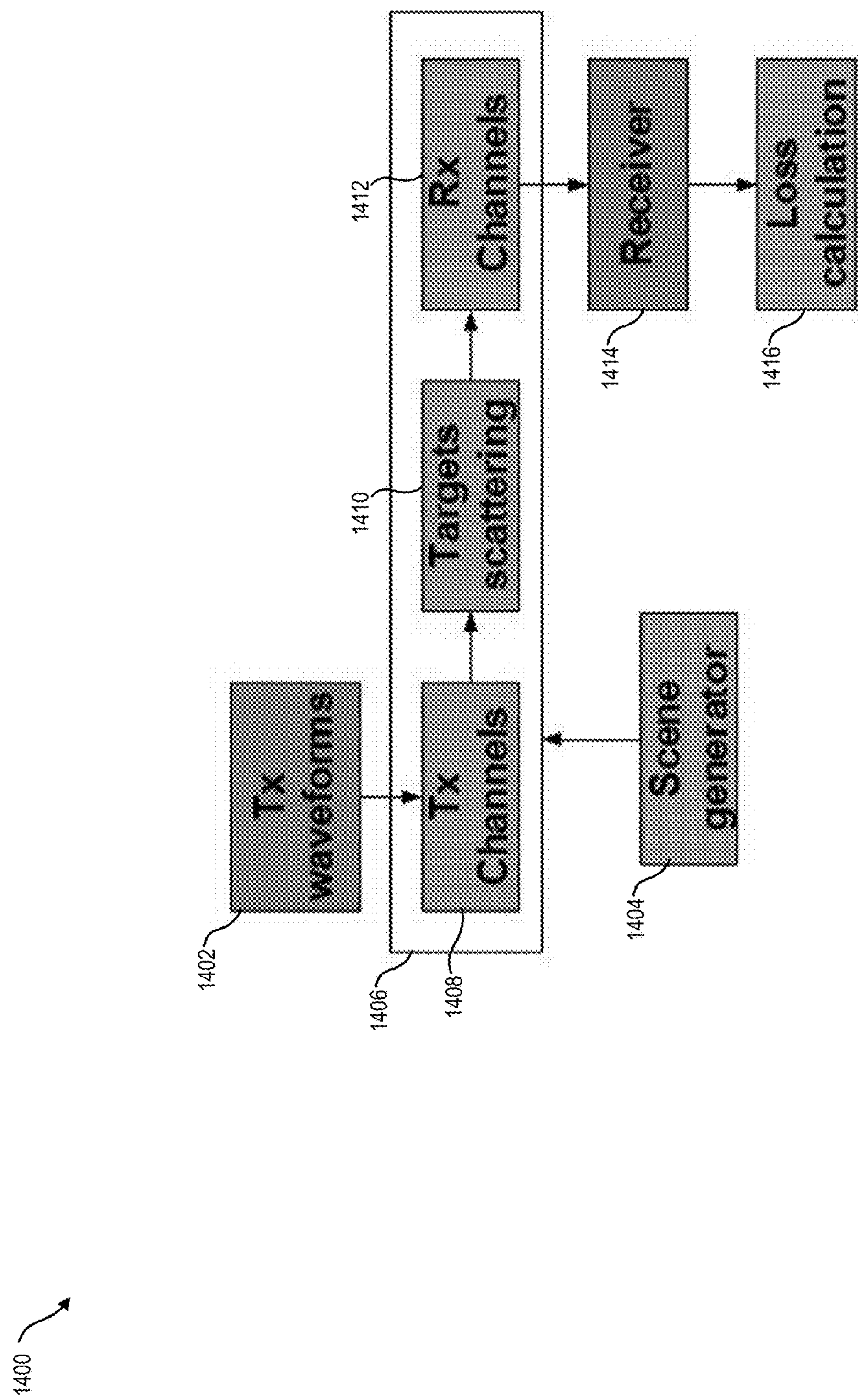
FIG. 14 illustrates a flowchart of an example method to perform object detection by the receiver.

FIG. 14 illustrates a flowchart of an example method 1400 to perform object detection by the receiver 1222, in accordance with at least one aspect described in the present disclosure. The method 1400 may be performed by the receiver 1222. The method 1400 may include one or more blocks 1402, 1404, 1406, 1408, 1410, 1412, 1414, and 1416. Although illustrated with discrete blocks, the steps and operations associated with one or more of the blocks of the method 1400 may be divided into additional blocks, combined into fewer blocks, or eliminated, depending on the particular implementation.

The method 1400, at block 1402, may include determining transmit (Tx) waveforms. In some aspects, the receiver 1222 may determine a current transmit waveform that the RF components 1208 are generating the transmit wireless signals 1216 representative of. Alternatively, the receiver 1222 may receive the current transmit waveform from the memory 1224.

The method 1400, at block 1404, may include generating a scene. In some aspects, the receiver 1222 may generate the scene to include randomly sample targets (e.g., objects). In these and other aspects, the receiver 1222 may generate the scene to include one or more objects as randomly sampled objects. The receiver 1222 may generate the scene based on pre-defined parameters. In some aspects, the pre-defined parameters may include at least one of noise source parameters, outlier parameters, interference parameters, multipath parameters, object distribution parameters, and settings of the RF components 1208.

The method 1400, at block 1406, may include generating a dataset. The receiver 1222 may generate the dataset based on the scene, the pre-defined parameters, channel modelling, ground truth parameters, the transmit waveform, radar pipeline output, or some combination thereof. Block 1406 may include blocks 1408, 1410, and 1412.

The method 1400, at block 1408, may include modelling transmit (Tx) channels. In some aspects, the receiver 1222 may model a channel of communication that the radar processor 1204 transmits the transmit wireless signals 1216 on. In some aspects, the receiver 1222 may model the channel as a mathematical representation of the channel through which the transmit wireless signals 1216 propagate using the current transmit waveform.

The method 1400, at block 1410, may include scattering targets (e.g., objects). In some aspects, the receiver 1222 may determine one or more object scattering parameters using the scene, the current transmit waveform, or some combination thereof.

The method 1400, at block 1412, may include modelling receive (e.g., RX) channels In some aspects, the receiver 1222 may model a channel of communication that the radar processor 1204 receives the receive wireless signals 1218 on. In some aspects, the receiver 1222 may model the channel as a mathematical representation of the channel through which the receive wireless signals 1218 propagate.

The method 1400, at block 1414, may include performing object detection using the machine learning algorithm. In some aspects, the receiver 1222 may determine the object parameters of the objects in the scene. The receiver 1222 may determine the object parameters using the machine learning algorithm, the dataset, and the current transmit waveform. The receiver 1222 may detect the objects in the scene based on the determined object parameters and the current transmit waveform. In some aspects, the machine learning algorithm may include the vector of weighted values that each correspond to different object parameters.

The method 1400, at block 1416, may include calculating a loss (e.g., the error value 1220). In some aspects, the receiver 1222 may determine the error value 1220 such that the error value 1220 indicates an accuracy of the determination of the object parameters of the objects. The receiver 1222 may calculate the KL cost function according to Equation 1, the object parameters, the current transmit waveform, and the ground truth object parameters to determine the error value 1220.

In some aspects, the receiver 1222 may backpropagate (e.g., use) the error value 1220 to adjust one or more of the weighted values of the machine learning algorithm, adjust the current transmit waveform, or some combination thereof. In some aspects, the receiver 1222 may adjust the one or more weighted values based on the error value 1220 to reduce the error value 1220. In these and other aspects, the receiver 1222 may adjust the current transmit waveform to further reduce the error value 1220. In addition, the error value 1220 may be fed back to the receiver 1222 to improve the object detection of the receiver 1222. The method 1400 may be performed iteratively to continue to reduce the error value 1220.

Modifications, additions, or omissions may be made to the method 1400 without departing from the scope of the present disclosure. For example, the operations of method 1400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described aspects.

Figure 15:
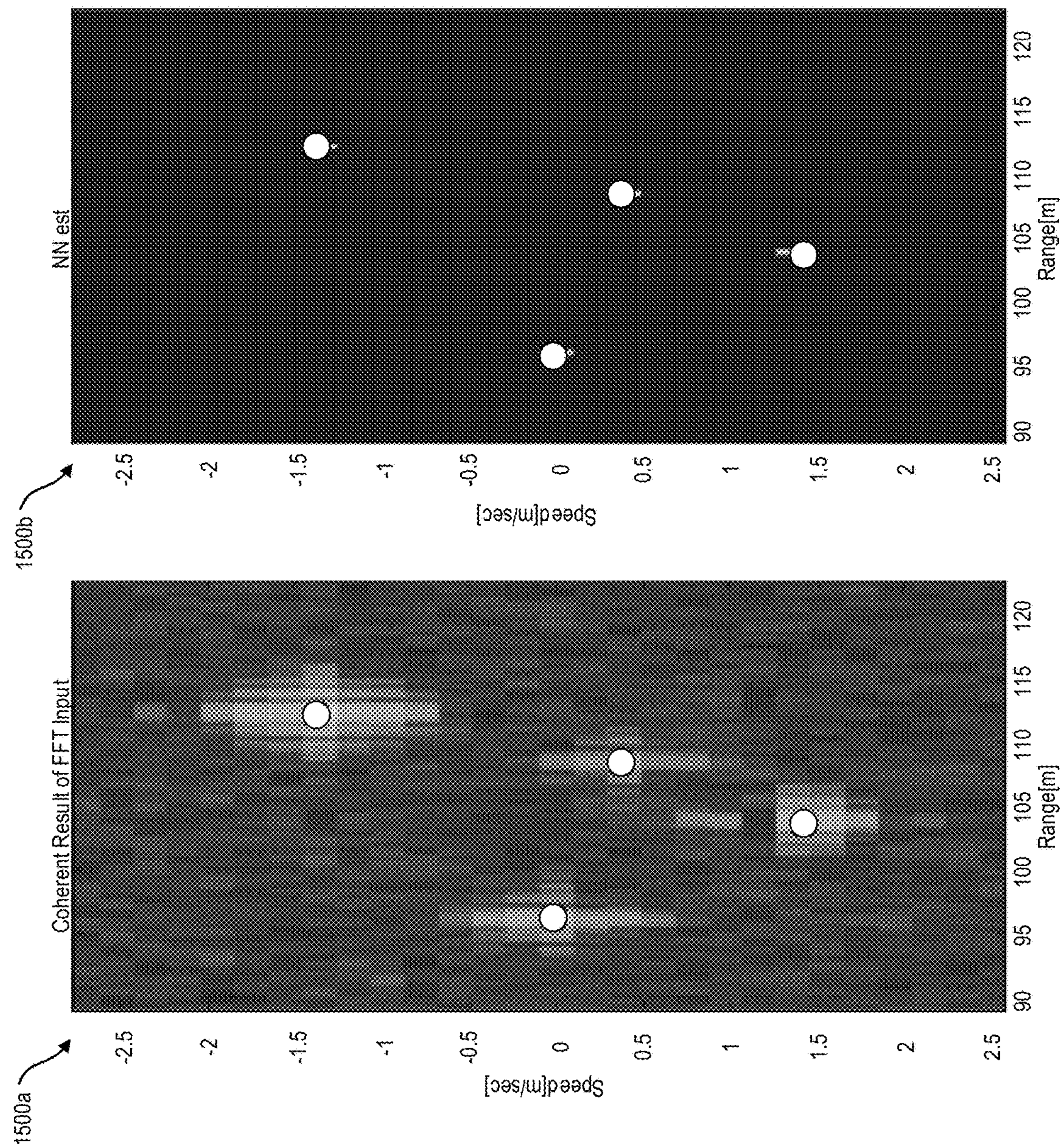
FIG. 15 illustrates graphical representations of a simulation of object detection in an environment.

FIG. 15 illustrates graphical representations 1500*a-b* of a simulation of object detection in an environment, in accordance with at least one aspect described in the present disclosure. The simulation of FIG. 15 was performed using a full PHY simulation (e.g., not differentiable and implemented a chirp transmit signal). In FIG. 15, objects are illustrated as circles within the graphical representations 1500*a-b*.

The graphical representation 1500*a* includes an energy map of the environment that includes range, speed, azimuth, and elevation parameters according to a FFT process.

The graphical representation 1500*b* was obtained using operations described above in relation to FIGS. 11-42. The graphical representation 1500*b* includes a 4D map that includes estimations of the object parameters using the neural network machine learning algorithm. The graphical representation 1500*b* includes a binned map, the size of the FFT map, and each bin is normalized to a value of one. Bins in the graphical representation 1500*b* that include high values are considered to correspond to objects in the environment.

Figure 16:
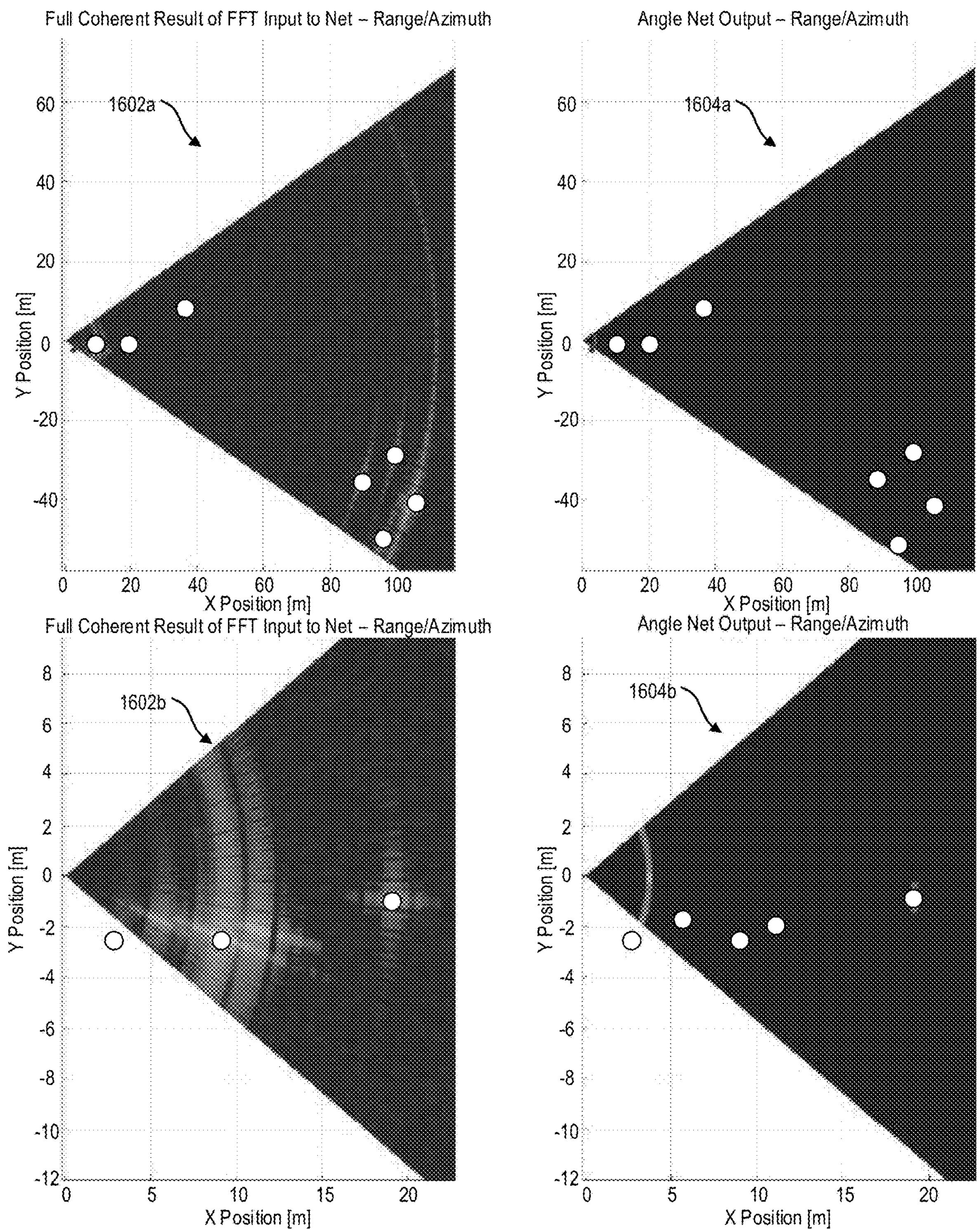
FIG. 16 illustrates graphical representations of simulations of object detection in environments.

FIG. 16 illustrates graphical representations 1602*a-b* and 1604*a-b* of simulations of object detection in environments, in accordance with at least one aspect described in the present disclosure. In FIG. 16, objects are illustrated as circles within the graphical representations 1602*a-b* and 1604*a-b*.

The graphical representations 1602*a-b* illustrate energy maps of the environment that include range, speed, azimuth, and elevation parameters according to a FFT process. The graphical representation 1604*a-b* were obtained using operations described above in relation to FIGS. 11-42. The graphical representations 1604*a-b* illustrate 4D maps that include estimations of the object parameters using the neural network machine learning algorithm.

Figure 17:
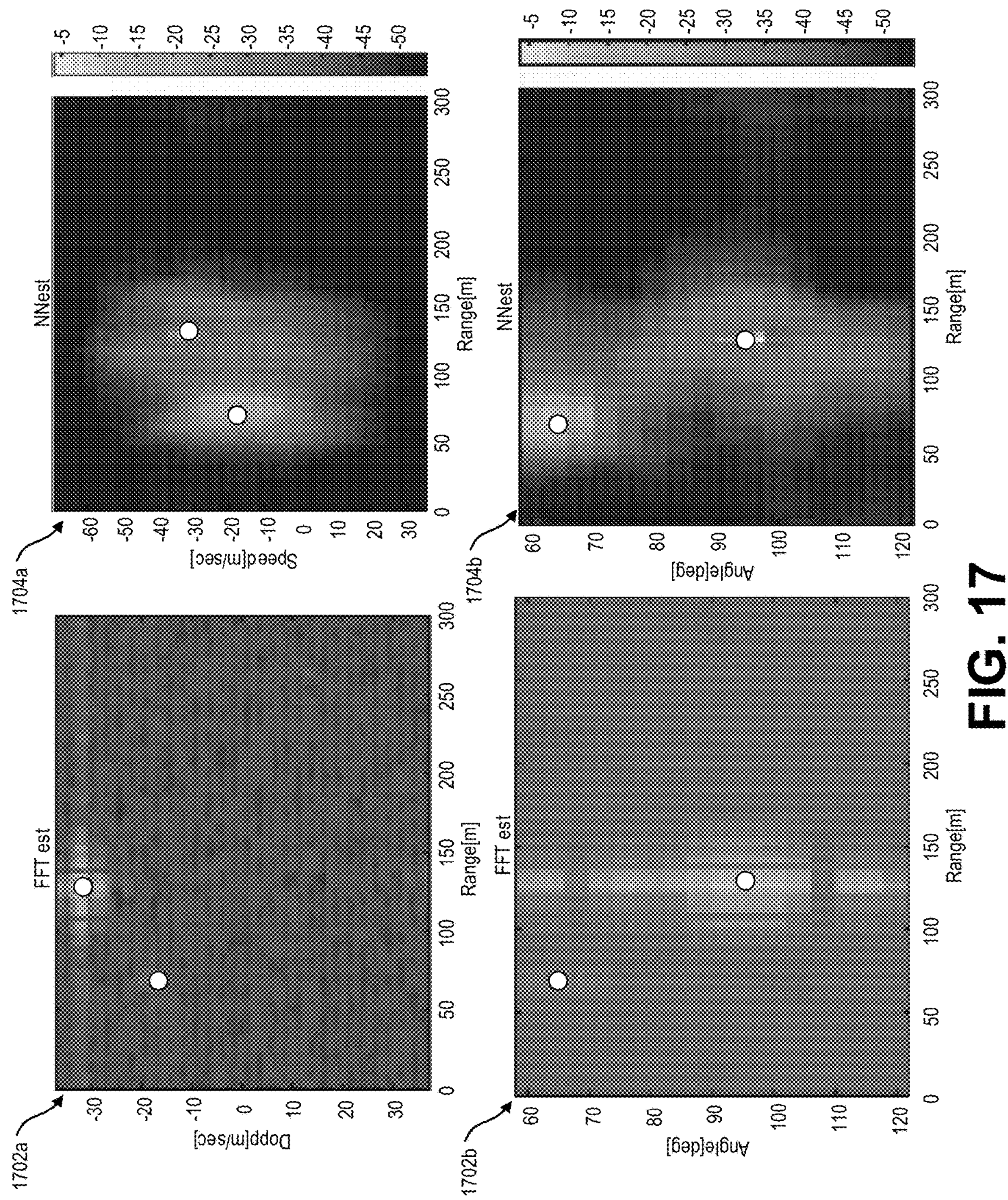
FIG. 17 illustrates graphical representations of simulations of object detection in environments.

FIG. 17 illustrates graphical representations 1702*a-b* and 1704*a-b* of simulations of object detection in environments, in accordance with at least one aspect described in the present disclosure. For the simulation, three receive antennas and three antennas were used. In FIG. 17, objects are illustrated as circles within the graphical representations 1702*a-b* and 1704*a-b*.

The graphical representations 1702*a-b* illustrate energy maps of the environment that include range, speed, azimuth, and elevation parameters according to a FFT process. The graphical representation 1704*a-b* were obtained using operations described above in relation to FIGS. 11-42. The graphical representations 1704*a-b* illustrate 4D maps that include estimations of the object parameters using the neural network machine learning algorithm. The graphical representations 1704*a-b* illustrate PHD estimates by the receiver 1602.

Figure 18:
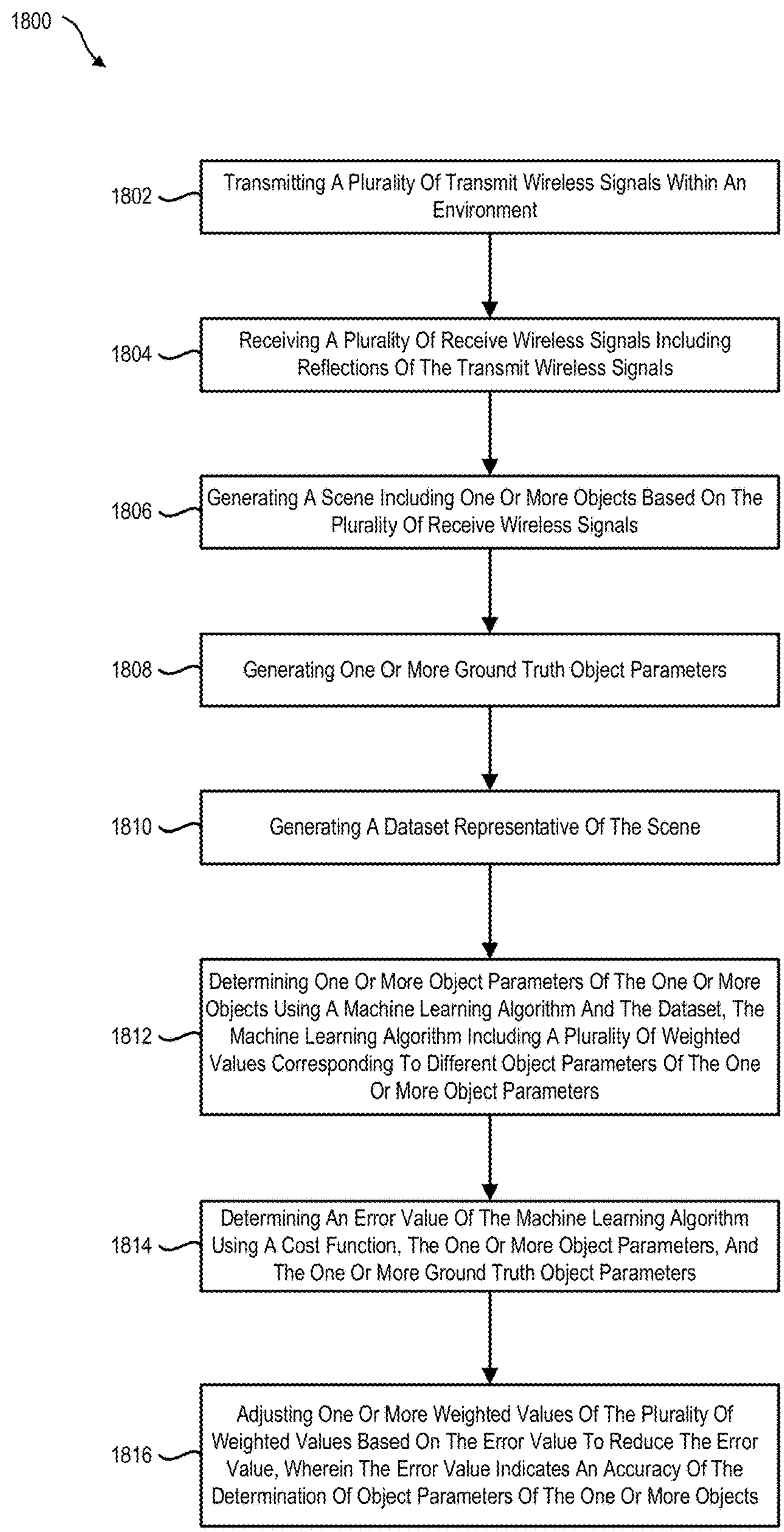
FIG. 18 illustrates an exemplary flowchart of a method of operating a radar device.

FIG. 18 illustrates an exemplary flowchart of a method 1800 of operating a radar device, in accordance with at least one aspect described in the present disclosure. The method 1800 may include transmitting a plurality of transmit wireless signals within an environment 1802; receiving a plurality of receive wireless signals including reflections of the transmit wireless signals 1804; generating a scene including one or more objects based on the plurality of receive wireless signals 1806; generating one or more ground truth object parameters 1808; generating a dataset representative of the scene 1810; determining one or more object parameters of the one or more objects using a machine learning algorithm and the dataset, the machine learning algorithm including a plurality of weighted values corresponding to different object parameters of the one or more object parameters 1812; determining an error value of the machine learning algorithm using a cost function, the one or more object parameters, and the one or more ground truth object parameters 1814; and adjusting one or more weighted values of the plurality of weighted values based on the error value to reduce the error value, wherein the error value indicates an accuracy of the determination of object parameters of the one or more objects 1816.

Figure 19:
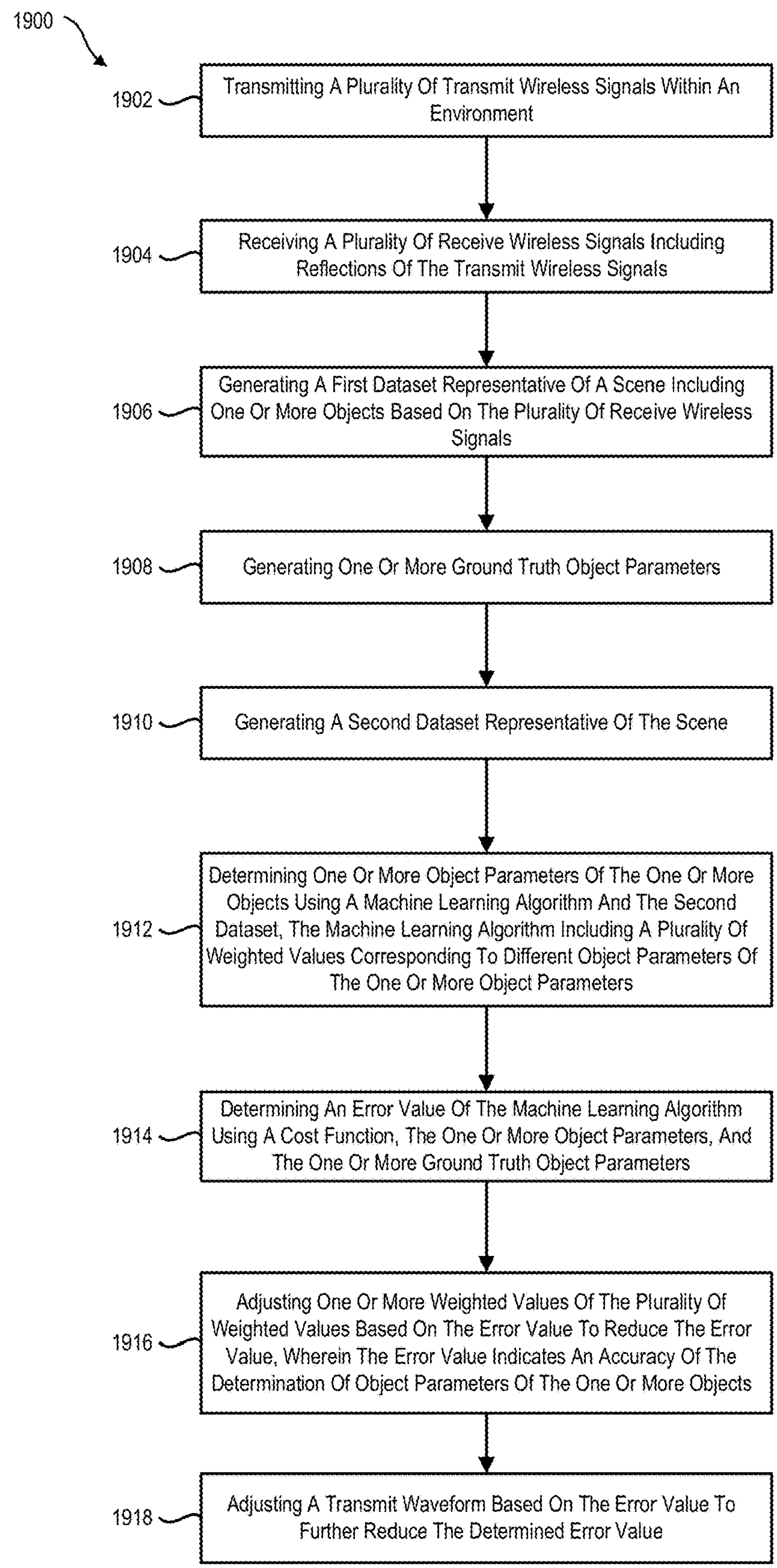
FIG. 19 illustrates an exemplary flowchart of a method of operating a radar device.

FIG. 19 illustrates an exemplary flowchart of a method 1900 of operating a radar device, in accordance with at least one aspect described in the present disclosure. The method 1900 may include transmitting a plurality of transmit wireless signals within an environment 1902; receiving a plurality of receive wireless signals including reflections of the transmit wireless signals 1904; generating a first dataset representative of a scene including one or more objects based on the plurality of receive wireless signals 1906; generating one or more ground truth object parameters 1908; generating a second dataset representative of the scene 1910; determining one or more object parameters of the one or more objects using a machine learning algorithm and the second dataset, the machine learning algorithm including a plurality of weighted values corresponding to different object parameters of the one or more object parameters 1912; determining an error value of the machine learning algorithm using a cost function, the one or more object parameters, and the one or more ground truth object parameters 1914; adjusting one or more weighted values of the plurality of weighted values based on the error value to reduce the error value, wherein the error value indicates an accuracy of the determination of object parameters of the one or more objects 1916; and adjusting a transmit waveform based on the error value to further reduce the determined error value 1918.

A radar device may include a neural network to detect objects, determine object parameters, or some combination thereof. In order to improve object detection, the radar device may include a radar detector or a receiver that include a neural network machine learning algorithm and a cost function. The radar device may use the machine learning algorithm and the cost function to determine a quality of performance of different configurations of the radar device. For the cost function to be practical to implement on the radar device, the cost function may be computed quickly, be differentiable, and provide an unbiased estimate of the machine learning algorithm.

The radar device may use the cost function defined according to Equation 5.

$$\mathcal{L} = E(l(xi, \hat{x})) \cong \Sigma l(xi, \hat{x}i) \quad \text{Equation 5}$$

In which xi represents ground truth parameters and x̂i represents the determined object parameters. Alternatively, the radar device may use the cost function according to the KL divergence function defined in Equation 1 discussed above.

The radar device may generate a PHD based on the cost function. The radar device may determine constraints such as pre-defined parameters that are to be placed on the receiver, the radar detector, the transmit waveform, or some combination thereof. For example, the pre-defined parameters may include a minimal power that the transmit waveform may be. The constraint of the minimal power may be defined according to Equation 6.

$$L^{-} = L + c \cdot \|TX\|2 \quad \text{Equation 6}$$

In which, c represents a constant values and TX represents a parameterized vector of the transmit waveform.

In some aspects, the radar device may include a radar processor and the radar detector. The radar processor may include RF components. The radar processor may identify pre-defined parameters that correspond to an environment in which the radar device operates. In some aspects, the pre-defined parameters may include target (e.g., object) distribution, noise parameters, interferers etc. In these and other aspects, the pre-defined parameters may include at least one of noise source parameters, outlier parameters, interference parameters, multipath parameters, object distribution parameters, and settings of one or more RF components. For example, the settings of the one or more RF components may include power constraints of antennas.

The radar processor may include the RF components that transmit wireless signals within the environment and may receive wireless signals The RF components may receive the receive wireless signals as reflections of the transmit wireless signals. The radar processor may generate a scene that includes one or more objects based on the receive wireless signals. In some aspects, the radar processor may generate the scene with the objects as randomly sampled objects based on the pre-defined parameters.

The radar processor may model a channel of communication using the scene. The radar processor may model the channel that the radar processor receives the receive wireless signals. In some aspects, the radar processor may model the channel as a mathematical representation of the channel through which the wireless signals propagate.

The radar processor may also determine one or more object scattering parameters using the scene. The radar processor may generate one or more ground truth object parameters. The ground truth object parameters may include locations, velocities, classes, a scene description, or some combination thereof of objects. In some aspects, the scene description may describe an environment of which the scene represents. For example, the scene description may include driving a highway with a double rail. In these and other aspects, the radar processor may determine the scene description based on input from external sources (e.g., a LIDAR sensor, a camera, etc.). The radar processor may also simulate a radar pipeline using the modelled channel and the one or more object scattering parameters.

The radar processor may generate a dataset representative of the scene, the channel modelling, the one or more object scattering parameters, information representative of the simulation of the radar pipeline, or some combination thereof. In some aspects, the dataset may include a complex values image. The complex values image may include a four-dimensional complex values image representative of a range, a doppler, an azimuth, and an elevation of the one or more objects.

In other aspects, the dataset may include IQ samples. The dataset may include an energy map representative of a range, a doppler, an azimuth, and an elevation of the one or more objects in the scene.

In some aspects, the radar processor may determine field test data. The radar processor may determine the field test data to be representative of the environment and one or more objects within the environment. The radar processor may determine the field test data based on the receive wireless signals In some aspects, the radar processor may generate the dataset to include the field test data.

In some aspects, the radar detector may include a neural network. In these and other aspects, the radar detector may include a parameterized deep fully convolutional neural network. The radar detector may receive an energy map of range-speed-azimuth-elevation (e.g., the dataset).

The radar detector may determine one or more object parameters of the one or more objects. The radar detector may determine the object parameters using the machine learning algorithm and the dataset. The machine learning algorithm may include neural network algorithms, decision tree ensemble algorithms, or any other appropriate machine learning algorithm. The machine learning algorithm may include a vector of weighted values. Each of the weighted values may correspond to a different object parameter. The radar detector may determine the one or more object parameters to include a location, a relative speed, and a classification of each object detected in the scene.

The machine learning algorithm may include a probability density portion and a regression portion. The probability density portion may determine a probability distribution of the objects detected in the scene. The probability density portion may generate a binned map that includes bins. Each of the bins may include values that are normalized to a value of one. Bins that include greater values than other bins may correspond to objects detected in the scene. In some aspects, a size of the binned map may be the same as or similar to a size of the dataset.

The regression portion may determine a total number of objects detected in the scene. The regression portion may generate a scalar representative of the total number of objects detected in the scene.

The radar detector may determine the one or more object parameters to include the probability distribution of the objects detected in the scene and the total number of objects detected in the scene.

The radar detector may determine an error value of the machine learning algorithm. The radar detector may determine the error value using a cost function, the one or more object parameters, the one or more ground truth object parameters, or some combination thereof. The error value may indicate an accuracy of the determination of object parameters of the one or more objects in the scene. In some aspects, the cost function may indicate how well current parameters (e.g., the vector of weighted values) are performing.

In some aspects, the cost function may include a KL divergence. The KL divergence may provide a PHD. In these and other aspects, the KL divergence may provide the PHD such that an integral of the PHD over a volume of a state space is equal to the number of objects detected in the scene. The KL divergence may be defined according to Equation 1 and Equation 2.

The radar detector may adjust one or more weighted values of the vector of weighted values of the machine learning algorithm. The radar detector may adjust the weighted values based on the error value. In addition, the radar detector may adjust the weighted values to reduce the error value.

In some aspects, the radar detector may iteratively perform the operations discussed above to reduce the error value. In these and other aspects, the error value may include a first error value and a second error value. The radar detector may determine another set of object parameters of the objects in the scene. The radar detector may use the machine learning algorithm including the adjusted weighted values and the dataset to determine the another set of object parameters.

The radar detector may determine the error value to include the second error value. The radar detector may determine the second error value to be associated with the machine learning algorithm including the adjusted weighted values when determining the another set of object parameters. The radar detector may use the cost function, the another set of object parameters, the ground truth object parameters, or some combination thereof to determine the second error value.

The radar detector may determine whether the second error value is greater than, less than, or equal to the first error value. The radar detector, responsive to the second error value being less than the first error value, may determine that the accuracy of the determination of the object parameters is improved. For example, the radar detector may determine that the adjusted weighted values caused the radar detector to more accurately determine the object parameters compared to the machine learning algorithm including the non-adjusted weighted values. Alternatively, the radar detector, responsive to the second error value being greater than or equal to the first error value, may determine that the accuracy of the determination of the object parameters is not improved. The radar detector may adjust one or more of the adjusted weighted values based on a difference between the second error value and the first error value to reduce the error value.

In some aspects, to improve performance of the radar device, the transmit waveform may be adjusted. In addition, a receiver of the radar device may be adjusted based on both the transmit waveforms and pre-defined parameters. The radar device may include a radar processor and the receiver, and a memory.

The radar processor may identify the one or more pre-defined parameters. In some aspects, the one or more pre-defined parameters may include at least one of noise source parameters, outlier parameters, interference parameters, multipath parameters, object distribution parameters, and settings of the one or more RF components.

The RF components may transmit wireless signals within the environment and may receive wireless signals The RF components may receive the receive wireless signals as reflections of the transmit wireless signals. The radar processor may generate a scene that includes one or more objects based on the receive wireless signals In some aspects, the radar processor may generate the scene with the objects as randomly sampled objects based on the pre-defined parameters.

The radar processor may generate a first dataset. The radar processor may generate the first dataset based on the scene. In some aspects, the first dataset may include IQ samples.

The radar processor may model a channel of communication using the scene and the transmit waveform. The radar processor may model the channel that the radar processor transmits the transmit wireless signals In some aspects, the radar processor may model the channel as a mathematical representation of the channel through which the wireless signals propagate.

In some aspects, the radar processor may model the channel based on the pre-defined parameters. In addition, the radar processor may model the channel such that the channel model is fully differentiable and that the gradient descent may be implemented when the transmit waveform is updated.

The radar processor may also determine one or more object scattering parameters using the scene and the transmit waveform. The radar processor may generate one or more ground truth object parameters. The ground truth object parameters may include locations, velocities, classes, a scene description, or some combination thereof of objects. In some aspects, the scene description may describe an environment of which the scene represents. For example, the scene description may include driving a highway with a double rail. In these and other aspects, the radar processor may determine the scene description based on input from external sources (e.g., a LIDAR sensor, a camera, etc.). The radar processor may also simulate a radar pipeline using the modelled channel and the one or more object scattering parameters.

In some aspects, the radar processor may simulate a radar pipeline using the modelled channel and the object scattering parameters. In these and other aspects, the radar processor may simulate cross correlation, doppler estimation, beamforming, etc. as part of simulating the radar pipeline. The radar processor may generate the first dataset to include information representative of the simulation of the radar pipeline.

In some aspects, the receiver may include a neural network. In these and other aspects, the receiver may include a parameterized deep fully convolutional neural network. The receiver may receive an energy map of range-speed-azimuth-elevation (e.g., the dataset).

The receiver may generate one or more ground truth object parameters. The ground truth object parameters may include locations, velocities, classes, a scene description, or some combination thereof of objects. In some aspects, the scene description may describe an environment of which the scene represents. For example, the scene description may include driving a highway with a double rail. In these and other aspects, the radar processor may determine the scene description based on input from external sources (e.g., a LIDAR sensor, a camera, etc.). The receiver may generate a second dataset representative of the scene based on the first dataset. In some aspects, the second dataset may include a complex values image. The complex values image may include a four-dimensional complex values image representative of a range, a doppler, an azimuth, and an elevation of the one or more objects. The receiver may generate the second dataset to include a current transmit waveform, a channel model of a current transmit channel, object scattering parameters, a channel model of a current receive channel, or some combination thereof.

In other aspects, the dataset may include IQ samples from the radar processor. The dataset may include an energy map representative of a range, a doppler, an azimuth, and an elevation of the one or more objects in the scene.

The receiver may determine one or more object parameters of the one or more objects. The receiver may determine the object parameters using a machine learning algorithm and the second dataset. The machine learning algorithm may include neural network algorithms, decision tree ensemble algorithms, or any other appropriate machine learning algorithm. The machine learning algorithm may include a vector of weighted values. Each of the weighted values may correspond to a different object parameter. The receiver may determine the one or more object parameters to include a location, relative speed, and a classification of each object detected in the scene. In some aspects, the machine learning algorithm may include large weight vector θ.

The machine learning algorithm may include a probability density portion and a regression portion. The probability density portion may determine a probability distribution of the objects detected in the scene. The probability density portion may generate a binned map that includes bins. Each of the bins may include values that are normalized to a value of one. Bins that include greater values than other bins may correspond to objects detected in the scene. In some aspects, a size of the binned map may be the same as or similar to a size of the dataset.

The regression portion may determine a total number of objects detected in the scene. The regression portion may generate a scalar representative of the total number of objects detected in the scene.

The receiver may determine the one or more object parameters to include the probability distribution of the objects detected in the scene and the total number of objects detected in the scene.

The receiver may determine an error value of the machine learning algorithm. The receiver may determine the error value using a cost function, the one or more object parameters, the one or more ground truth object parameters, or some combination thereof. The error value may indicate an accuracy of the determination of object parameters of the one or more objects in the scene. In some aspects, the cost function may indicate how well current parameters (e.g., the vector of weighted values) are performing.

In some aspects, the cost function may include a KL divergence. The KL divergence may provide a PHD. In these and other aspects, the KL divergence may provide the PHD such that an integral of the PHD over a volume of a state space is equal to the number of objects detected in the scene. The KL divergence may be defined according to Equation 1 and Equation 2.

The receiver may adjust one or more weighted values of the vector of weighted values of the machine learning algorithm. The receiver may adjust the weighted values based on the error value. In addition, the receiver may adjust the weighted values to reduce the error value.

In some aspects, the receiver may adjust the transmit waveform based on the error value to further reduce the determined error value. To adjust the transmit waveform, the receiver may parameterize the current transmit waveform.

In some aspects, the receiver may the transmit waveform as a vector of complex samples in a frequency domain or a time domain The receiver may use the machine learning algorithm for each sample to adjust each sample of the transmit waveform.

In some aspects, the receiver may use wavelets or other mathematical functions to parameterize the transmit waveform. In these and other aspects, the receiver may parameterize the transmit waveform as a plurality of samples using a wavelet function. In addition, may use the machine learning algorithm for each sample to adjust each sample of the transmit waveform.

In aspects in which adversarial robustness is to be considered (e.g. to avoid spoofing), the receiver may parameterize the transmit waveform as a plurality of samples using a probability distribution. In addition, may use the machine learning algorithm for each sample to adjust each sample of the transmit waveform.

In some aspects, the receiver may include a transmit neural network. The transmit neural network may receive the current transmit waveform and a noise vector. The noise vector may include variables representative of the transmit waveform. The transmit neural network may determine an adjustment of the noise vector to cause the transmit waveform to be adjusted based on the current transmit waveform. The receiver may adjust the transmit waveform based on the determined adjustment of the noise vector.

The memory may receive and store the updated transmit waveform. In addition, the memory may provide the updated transmit waveform to the radar processor to transmit as wireless signals.

In some aspects, the receiver may iteratively perform the operations discussed above to reduce the error value. In these and other aspects, the error value may include a first error value and a second error value. The receiver may determine another set of object parameters of the objects in the scene. The receiver may use the machine learning algorithm including the adjusted weighted values and the second dataset to determine the another set of object parameters.

The receiver may determine the error value to include the second error value. The receiver may determine the second error value to be associated with the machine learning algorithm including the adjusted weighted values when determining the another set of object parameters. The receiver may use the cost function, the another set of object parameters, the ground truth object parameters, or some combination thereof to determine the second error value.

The receiver may determine whether the second error value is greater than, less than, or equal to the first error value. The receiver, responsive to the second error value being less than the first error value, may determine that the accuracy of the determination of the object parameters is improved. For example, the receiver may determine that the adjusted weighted values caused the receiver to more accurately determine the object parameters compared to the machine learning algorithm including the non-adjusted weighted values. Alternatively, the receiver, responsive to the second error value being greater than or equal to the first error value, may determine that the accuracy of the determination of the object parameters is not improved. The receiver may adjust one or more of the adjusted weighted values based on a difference between the second error value and the first error value to reduce the error value.

In some aspects, a posterior of objects in the scene x, parameterized by the Tx signal, given the measurements y, may be denoted as: PT (x|y). In addition, the receiver (e.g., the neural network) may estimate the posterior, parameterized by the network weights θ, according to: qθ(x|y).

$$KL(PT(x|y)q\theta(x|y)) = \int PT(x|y)\log(PT(x|y)q\theta(x|y))\,dx = \int PT(x|y)\log(PT(x|y))dx - \int PT(x|y)\log(q\theta(x|y))dx = CE\{\theta, T\}(y) - H(X|y).$$

In some aspects, KL(PT(x|y)||qθ(x|y))>=0 for two probability distributions and any value of y. The receiver may determine the expectation over y according to:

$$0 \leq EPT(y)\ (KL(PT(x|y)\|q\theta(x|y))) = CE\{\theta,T\} - HT\ (X|Y)$$

In some aspects, the receiver may improve a value of CE{θ,T}. For example, the receiver may take a minimum over θ, for fixed T according to:

$$0 \leq \frac{\min}{\theta} EPT(y)\big(KL(PT(x|y)\|q\theta(x|y))\big) = \frac{\min}{\theta}(CE\{\theta, T\} - HT(X|Y))$$

The receiver may determine the minimum if the KL is zero for all values of y, which may return a value of:

$$\min\ \theta(CE\{\theta,T\}) = HT\ (X|Y)$$

The receiver may take the minimum over the transmit waveform parameters according to:

$$\min\ \theta,T(CE\{\theta,T\}) = \min\ T\ HT\ (X|Y)$$

Therefore, this receiver may minimize an entropy of the posterior of the object parameters.

As mentioned above in context of FIG. 1, the vehicle 100 may be an autonomous vehicle being controlled by vehicle controller 108 which, for taking control decisions, uses information provided by the radar processor 104.

In the case of an autonomous vehicle, it is typically required to have an accurate and a low-latency perception of the vehicle's environment. The radar processor 104 may achieve this by detection and classification of an object 106 such as pedestrian via extraction of hand-crafted features from micro-Doppler measurements that require radar measurement cycles to be in the order of few seconds. Classification of the pedestrians using micro-Doppler signals typically consider either features calculated or extracted by hand-crafted methods or learned features and may use a classification and tracking algorithmic chain to distinguish pedestrians and other dynamic road objects. Classification of human body and limb motion types such as boxing, clapping, waving, jogging and walking may be performed by collecting spectrograms of a couple (e.g. three) seconds duration using radar and training a stacked gated recurrent neural network architecture. Likewise, micro-power pulse Doppler radar operating and cascaded RNNs that consider complex time-series as an input may be used for the classification of human vs non-human objects.

To improve the resolution of radar sensors in range or Doppler or azimuth dimensions, super resolution techniques such as MIMO/sparse antenna array architectures may be applied. Data from such high resolution FMCW radar sensor systems may be processed by deep learning architectures such as a convolutional neural network for simultaneous detection and object classification.

However, conventional micro-Doppler classification algorithms as well as the other classification approaches mentioned above typically require merging or stacking of more than one frame of radar measurement data or a spectrogram of a few seconds in duration resulting in a radar observation time of up to few seconds as an input to a hand-crafted or data-driven feature learning approaches before making any sort of classification decision. They are therefore mainly applicable for indoor applications but are less suitable for fully automated ADAS (advanced driver assistance systems) in fast-paced city traffic environments.

In view of the above, according to various embodiments, a 5D DNN (five-dimensional deep neural network) architecture is provided which considers both the 3D spatial (i.e. range, azimuth and elevation or x, y and z) features and the radial velocity features of an object as a time-sequence of four-dimensional radar measurements (spatial plus radial velocity), for example, collected in the order of tens of milliseconds to localize, detect and recognize dynamic objects and classify their activities such as walking pedestrians. Thus, four-dimensional radar reception data (in the form of what is referred to 4D voxels) is used as a sequential input (i.e. one input voxel is input for each input time of a sequence of input times, thus having time as fifth dimension) to the 5D DNN architecture. The data of an input voxel (i.e. the input data for a certain time) for example consists of elevation dimension as well in addition to the range, azimuth and radial velocity dimension. According to various embodiments, the 5D DNN architecture includes two concatenated deep neural networks (DNN) to learn both 3D spatial and temporal features of an object. The output of the 5D DNN is for example an estimate of dynamic objects classification type, activity (e.g. walking pedestrian) and/or estimate of the motion (e.g. speed and orientation) per input time (i.e. per input data voxel). It should be noted that the spatial bin combinations belonging to the same object (i.e. whose values, e.g. FFT output values) indicate the presence of the same object, may have different radial velocities since, for example, the arm of a pedestrian moves at a different speed that his torso. The determination of the speed or radial velocity of an object may thus be seen as determination of the main body of the object, e.g. the torso in case of the pedestrian, or also as an average speed of displacement of the object (as a whole) over time.

It should be noted that the usage of 4D input data, which includes 3D spatial data, allows localizing an object 106 in 3D space which is useful in complex scenarios like driving in dense urban areas, where, for example, objects may be located at different levels (bridges etc.).

Figure 20:
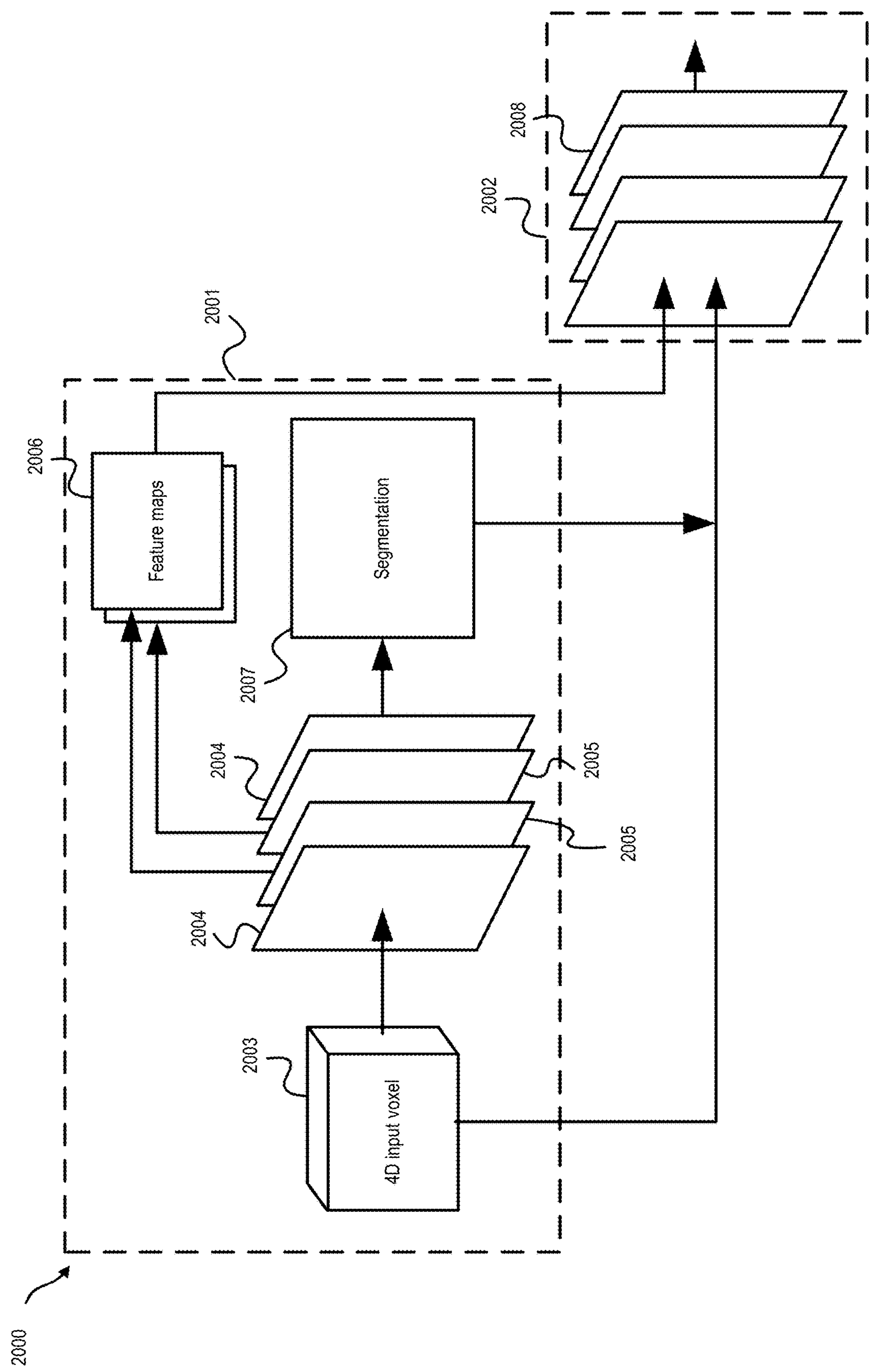
FIG. 20 illustrates a block diagram of a neural network according to an embodiment.

FIG. 20 illustrates a block diagram of a neural network 2000 according to an embodiment.

The neural network 2000 includes a first neural network (also referred to as first neural network stage) 2001 and a second neural network (also referred to as second neural network stage) 2002.

The first neural network receives as input data an input data voxel 2003, for each input data time.

The input data voxel 2003 includes values for bins, similarly to the R/D map 505 (e.g. second FFT state output values) but unlike the R/D map 505, which contains these values for two dimensions (i.e. for each range Doppler bin), the input data voxel 2003 includes the values for four dimensions. This means that the input data voxel 2003 includes a value whose magnitude indicates (radar) detection of the presence of an object for each combination of three spatial bins and a radial velocity bin.

The three spatial bins may be a bin for each cartesian coordinate (x, y, z) or may be a bin for range, a bin for azimuth and a bin for elevation. The bin for radial velocity may be a radial velocity bin, a Doppler velocity bin or a Doppler frequency bin.

The input data voxel 2003 is the output of a processing (e.g. performed by radar processor 104) of output data of a radar sensor, e.g. a single high-resolution radar sensor or a multi-radar sensor network, e.g. being implemented by the antenna arrangement 102 and the radar frontend 103 and parts of the radar processor 104. The neural network 2000 is for example implemented by the radar processor 104 as well.

Figure 21:
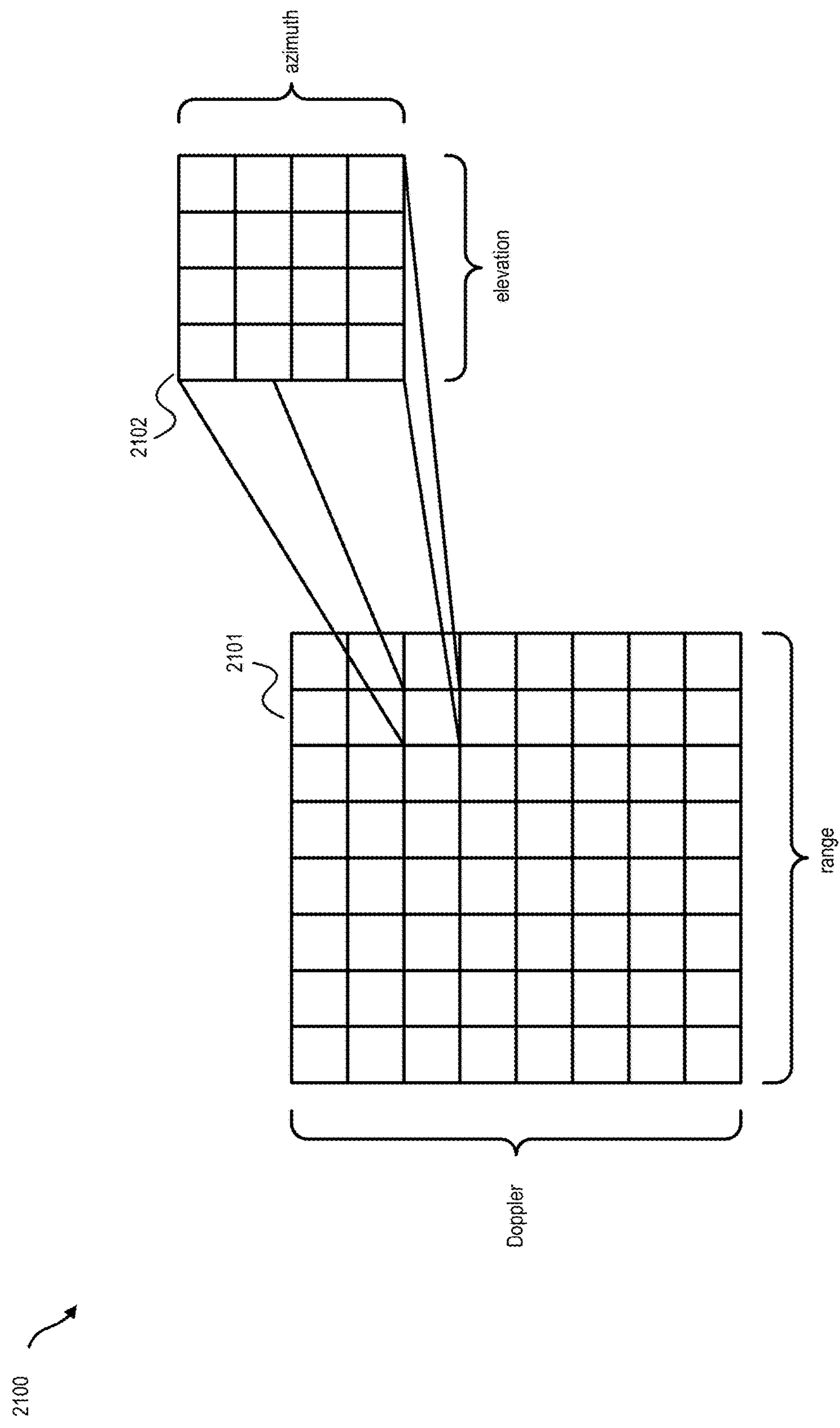
FIG. 21 illustrates an example for an input data voxel.

FIG. 21 illustrates an example for an input data voxel 2100.

The input data voxel 2100 includes a first array 2101 which is arranged like a range-doppler map, i.e. it has an entry for each combination of a range bin and a doppler bin.

However, instead of having a single complex value (e.g. FFT output) for each range bin Doppler bin combination (i.e. each range-Doppler bin), the input data voxel 2100 has a second array 2102 for each range bin doppler bin combination. The second array 2102 contains a real or complex value for each combination of an elevation bin and an azimuth bin. As in a range-Doppler map, a peak of the values indicates an object at the 3D position given by the elevation bin, azimuth bin and range bin with a radial velocity given by the radial velocity bin.

It should be noted that multiple 4D-bins (i.e. combinations of elevation, azimuth, range and radial velocity bins or alternatively combinations of cartesian coordinate bins and a radial velocity bin) may correspond to the same object. In fact, one of the tasks of the neural network 2000 may be to associate 4D-bins with an object, i.e. determining to which object a 4D-bin belongs. Over time, i.e. over the course of a sequence of input voxels, a task of the neural network 2000 may accordingly be to track an object in terms of the 4D-bins that belong to it.

When the first neural network 2001 has determined which 4D-bins belong to an object (e.g. has performed a segmentation of an input data voxel 2003) the neural network 2000 may classify the object. For this, the neural network 2000 may be trained to make use of the fact that different objects have different profiles of 4D-bins. For example, a rigid object (like a vehicle) has 4D-bins having substantially equal radial velocities. In contrast, a pedestrian for example, has 4D-bins with different radial velocities because the arms usually move at different speed that the torso, i.e. there is a radial velocity spread. Moreover, when considering a sequence of input data voxels over time it is possible, for example, to distinguish objects having more or less variations in their velocity profile (such as a walking and a waving person). In addition to the radial velocity, the contrast between car and pedestrian is also in the spatial dimension. A car occupies more bins because of its size than a pedestrian (specifically in short and medium range). This spatial features are what is typically prominently learnt by the first neural network 2001 in addition to the radial velocities.

The first neural network 2001 includes a first sequence of neural network layers 2004, 2005. For example, the first neural network 2001 is a convolutional network and (at least some of) the neural network layers 2004, 2005 are convolutional layers. The outputs of some of the network layers 2005 are features maps 2006. The output of the first sequence of neural network layers 2004, 2005 is, according to various embodiments, a segmentation 2007 of the input data voxel.

This means that for each 4D-bin, the first neural network 2001 outputs an object class of an object to which the 4D-bin belongs. It should be noted that this may be in terms of a vector of softmax values, wherein each component of the vector is associated with a class and the respective softmax value indicates an estimate of the likelihood that the 4D-bin belongs to an object of the class. In other words, the first neural network 2001 can be seen to perform dense prediction. The first neural network 2001 may also output bounding boxes for the various objects, i.e. bounding boxes of the 4D-bins within the input data voxel belonging to the same object. The first neural network 2001 may also generate a radial velocity estimate and/or an orientation and/or 2D/3D bounding boxes for the object associated with a segment.

Figure 22:
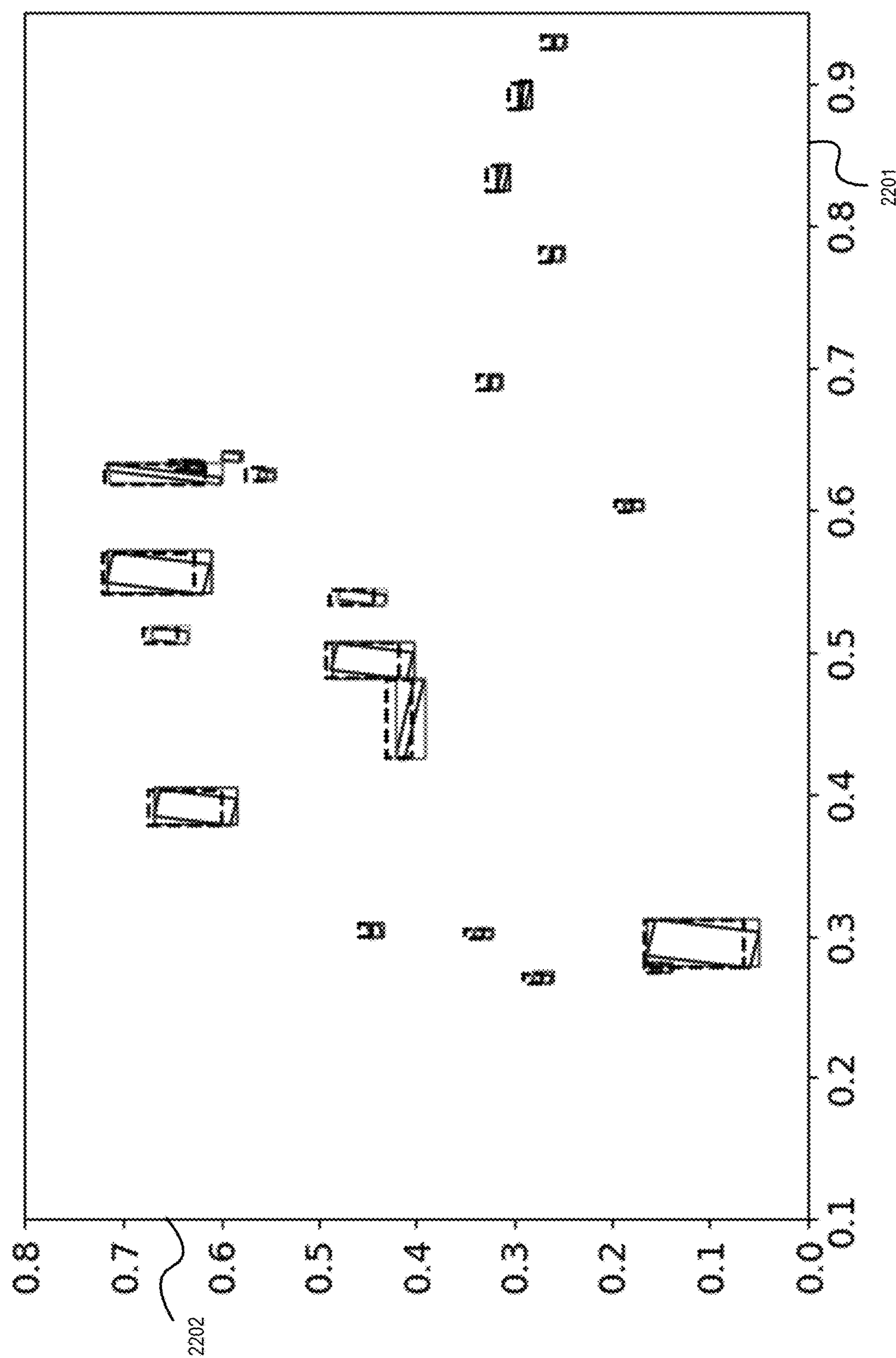
FIG. 22 illustrates a 2-D representation of an exemplary output of the first neural network.

FIG. 22 illustrates a 2-D representation 2200 of an exemplary output of the first neural network 2101.

In this example, the x-coordinate bins extend along the horizontal axis 2201 and the y-coordinate bins extend along the vertical axis 2202.

For various objects (in this example in the form of slanted rectangles) the first neural network 2001 determines bounding boxes (dashed straight rectangles) as well as a class for each object. The class is not shown in FIG. 22 but may for example be "pedestrian", "bike", "trailer", "car", "motor bike", "truck", "pole" etc.

For training of the first neural network 2001, ground truth bounding boxes and ground truth classes are provided for input data voxels. In the example of FIG. 22, the ground truth bounding boxes are shown as straight rectangles with solid lines. The ground truth bounding boxes shown as straight rectangles with solid line is an example. This ground truth can also be 2D slanted bounding boxes or 3D bounding boxes with center and length, height, width.

Figure 23:
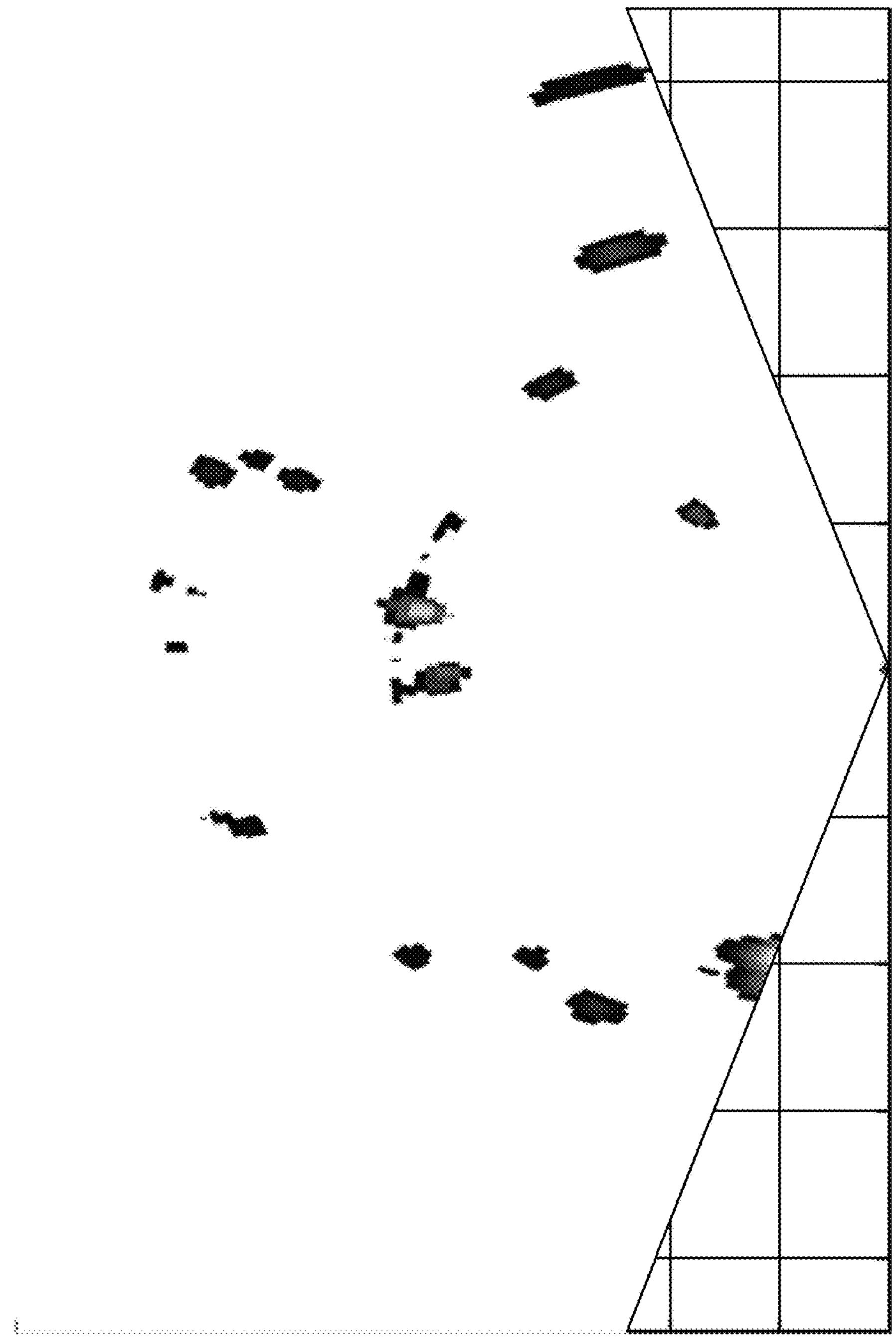
FIG. 23 illustrates a corresponding 2-D slice of an input data voxel which leads to the exemplary output of FIG. 22.

FIG. 23 illustrates a corresponding 2-D slice 2300 of an input data voxel which leads to the exemplary output of FIG. 22.

For each segment of the segmentation 2007, the part of the feature maps 2006 corresponding to the 4D-bins of the segment as well as the 4D-bins of the segment itself are fed to the second neural network 2002 which contains a second sequence of neural network layers 2008. In this context, the part of a feature map 2006 corresponding to the 4D-bins of the segment may be seen as the feature map values located at the same positions within the feature map (which may also be 4D) as the 4D-bins within the input data voxel. The feature map 2006 may have a different resolution than the input data voxel 2001 so a position of a feature map may for example correspond to multiple positions with in the input data voxel but still feature map values may thus be associated with 4D-bins of segments located at certain positions in the input data voxel.

The output of the second neural network 2002 (i.e. the second sequence of neural network layers 2008) may be a refined classification, a refined bounding box, etc., for the segment. For example, for an object classified as "pedestrian" by the first neural network 2001 the second neural network 2002 determines a classification into "walking pedestrian", "running pedestrian" and "standing pedestrian". The output of the second neural network can also enhance detection by the first neural network 2001. For example, for an object classified as "pedestrian" with low confidence by the first neural network 2001, the second neural network 2002 further determines the class of the object to "pedestrian" or "non-pedestrian".

The second neural network 2002 generates an output for each input data voxel 2003. However, when providing an output for a later input data voxel 2003 of a sequence of input data voxels it may take information from earlier input data voxels of the sequence into account. For this, the second neural network 2002 may be a recurrent neural network, an LSTM (long short-term memory) neural network or a transformer network.

So, the neural network 2000 can be seen as a two-stage deep neural network (DNN) wherein, in the neural network 2001 of the first-stage, 3D spatial features and coarse radial velocity object features are explored while in the second stage, i.e. the concatenated temporal/sequential processing based neural network 2002, the fine changes between the current and previous voxel data and/or consecutive voxels are explored. The input to the concatenated DNN network includes the reduced (i.e. cropped) 4D input voxel data (i.e. the 4D input voxel data of the respective segment) and/or intermediate feature maps 2006 as well as further possible outputs of the first neural network 2001 such as the 2D or 3D bounding box and/or orientation of the segment or the radial velocity estimate and/or classification label of the segment.

Figure 24:
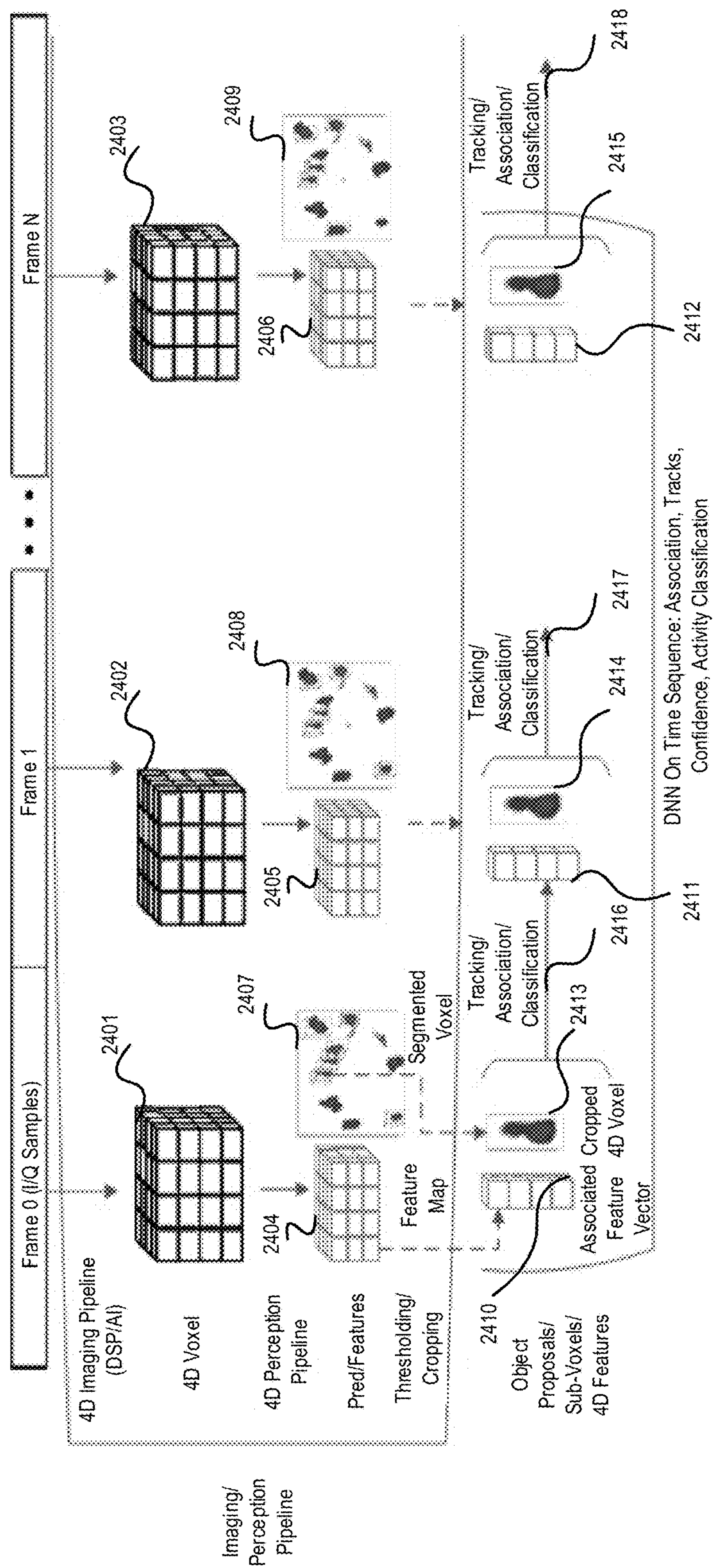
FIG. 24 illustrates the processing of a sequence of input data voxels by the neural network 2000 of FIG. 20.

FIG. 24 illustrates the processing of a sequence of input data voxels 2401, 2402, 2403 by the neural network 2000 of FIG. 20.

Each input data voxel 2401, 2402, 2403 corresponds to a certain point in time of a sequence of input times, e.g. the times at which the radar sensor outputs a radar measuring result, i.e. the data for an input data voxel.

Each input data voxel 2401, 2402, 2403 is for example generated from radar measurement data of a respective input data frame, for example by one or more FFT stages as for example described with reference to FIG. 5. For example, the radar measurement data may include, for each frame, radar measurement data for a predetermined number of chirps (e.g. K chirps as in the example of FIG. 5). The radar measurement data for example include digital reception data values generated by an ADC (e.g. ADC 411). The digital reception data values may include IQ samples. For example, the ADC 411 provides I samples and a second chain including a second mixer, a second filter and a second ADC is provided, wherein the second mixer mixes the radio receive signal with the radio transmit signal shifted by 90° such that the second ADC provides Q samples.

The sequence of input times may include a plurality or a multiplicity of input times. Correspondingly, the sequence of input data voxels 2401, 2402, 2403 may include a plurality or a multiplicity of input data voxels 2401, 2402, 2403.

The first neural network generates, for each input data voxel 2401, 2402, 2403 a respective feature map 2404, 2405, 2406 and a respective segmentation 2407, 2408, 2409.

For each input time and each segment, the second neural network gets a feature map part corresponding to the segment (e.g. a feature vector) 2410, 2411, 2412 and the 4D-bins of the segment, i.e. the cropped 4D input voxel) 2413, 2414, 2415 for the segment. For each input time and each segment, the second neural network generates an output wherein, for later input times of the sequence, it takes information (e.g. results) of earlier input times into account, as indicated by arrows 2416, 2417, 2418.

Figure 25:
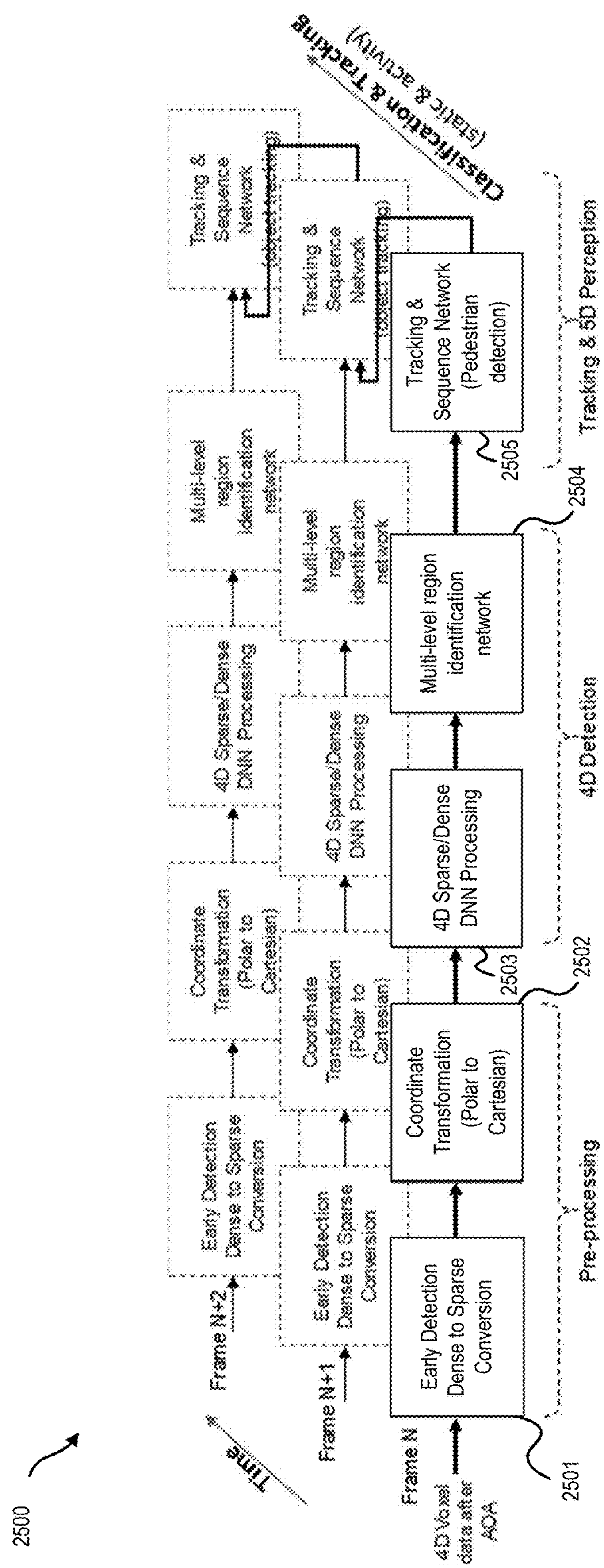
FIG. 25 illustrates a hardware architecture for AI radar perception accelerating the pipeline stages of the 5D DNN architecture as described above with reference to FIG. 20 and FIG. 24.

FIG. 25 illustrates a hardware architecture 2500 for AI radar perception accelerating the pipeline stages of the 5D DNN architecture as described above with reference to FIG. 20 and FIG. 24.

The input is, for each frame, 4D voxel data after AOA determination, i.e. an input data voxel for each (e.g. corresponding to input data voxels 2401, 2402, 2403).

In the present example, the input data voxel is, for each frame, processed by an early detection and dense to sparse conversion block 2501, followed by a coordinate transformation block 2502. It should be noted that block 2502 is optional. It is also possible that the next block 2503 can take on polar/spherical data as well.

These two blocks 2501, 2502 may perform pre-processing. Specifically, the early detection and dense to sparse conversion block 2501 may for example filter out bins whose values lie beneath a predetermined threshold and may bring the resulting data (which is typically sparse) into a compressed format. The coordinate transformation block 2502 may perform transformation of polar coordinates to cartesian coordinates (i.e. polar coordinate bins to cartesian coordinate bins).

The result of the pre-processing by blocks 2501, 2502 is then processed by a 4D DNN processing block 2503 (which may operate on dense or sparse data) and a multi-level region identification network 2504. The operation of these blocks 2503, 2504 may correspond to the operation of the first neural network stage 2001 and may be seen as the 4D detection.

The result of the 4D detection is followed by association and tracking and 5D perception performed by a tracking & sequence network 2505. The operation of this block may for example correspond to the second neural network stage 2002.

The tracking & sequence network 2505 implements a tracking engine or sequential neural network core.

Figure 26:
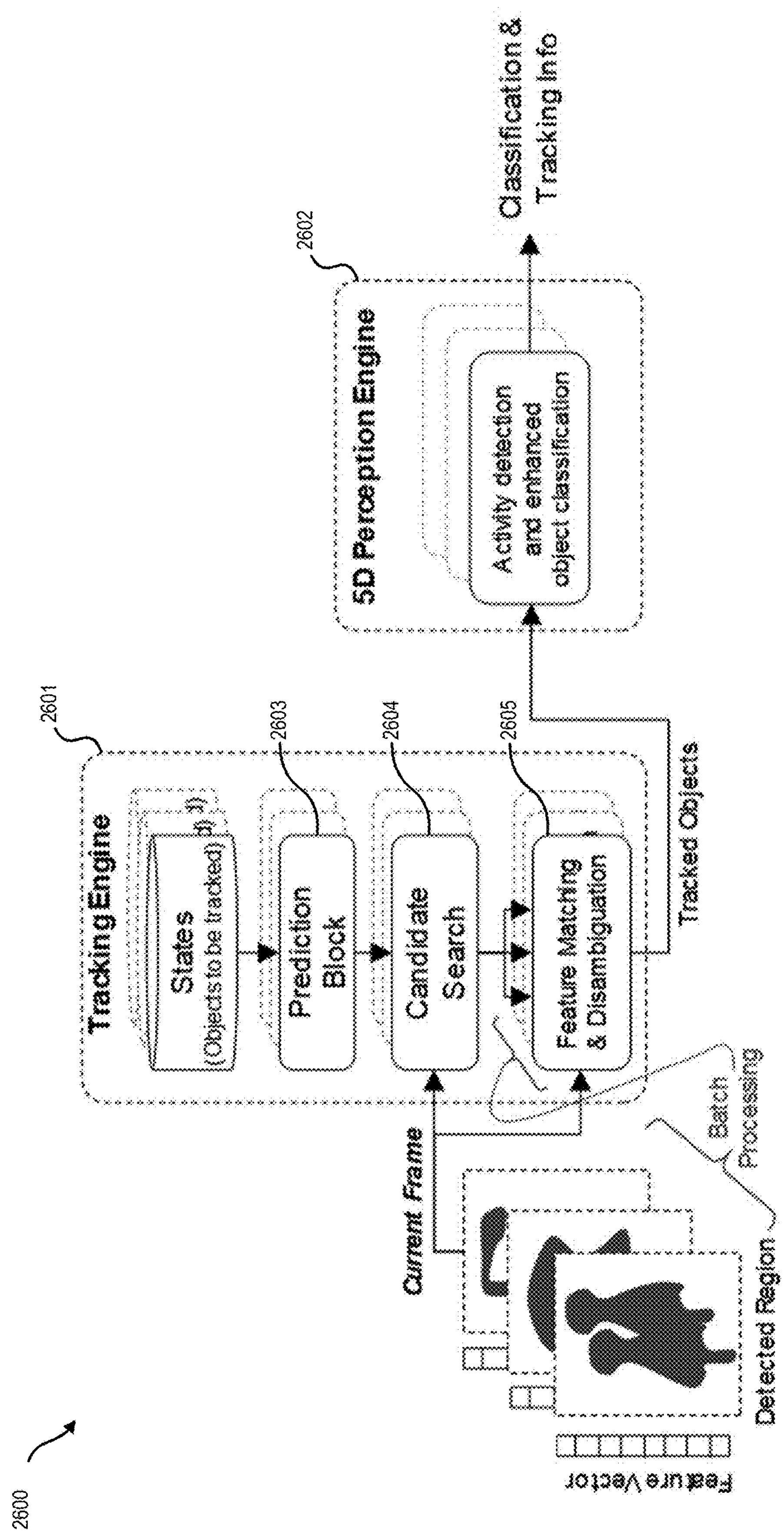
FIG. 26 shows an exemplary hardware architecture for a tracking & sequence network.

FIG. 26 shows an exemplary hardware architecture for a tracking & sequence network 2600.

The tracking & sequence network 2600 receives time-series of detected regions of objects along with features (e.g. as explained above from the first neural network stage 2001). As front-end, the tracking & sequence network 2600 includes a tracking engine 2601 which establishes the association of tracked objects with detected objects for the current frame. The tracking & sequence network 2600 further includes a 5D perception engine 2602 which receives the results from the tracking engine 2601 and includes a fast-matrix-multiply engine and special function unit (SFU), accelerates sequential NN models that provides functionalities such as activity detection, gesture recognition, high fidelity object detection along with tracking information of moving objects specifically slow moving ones. The tracking engine 2601 includes a prediction block 2603, a candidate search block 2604 and an FMD (feature matching and disambiguation) block 2605 which may support DNN, non-DNN or hybrid methods.

Thus, according to various embodiments, a pipelined hardware architecture for 5D AI radar perception and a tracking engine that establishes association of tracked and detected objects is provided.

Figure 27:
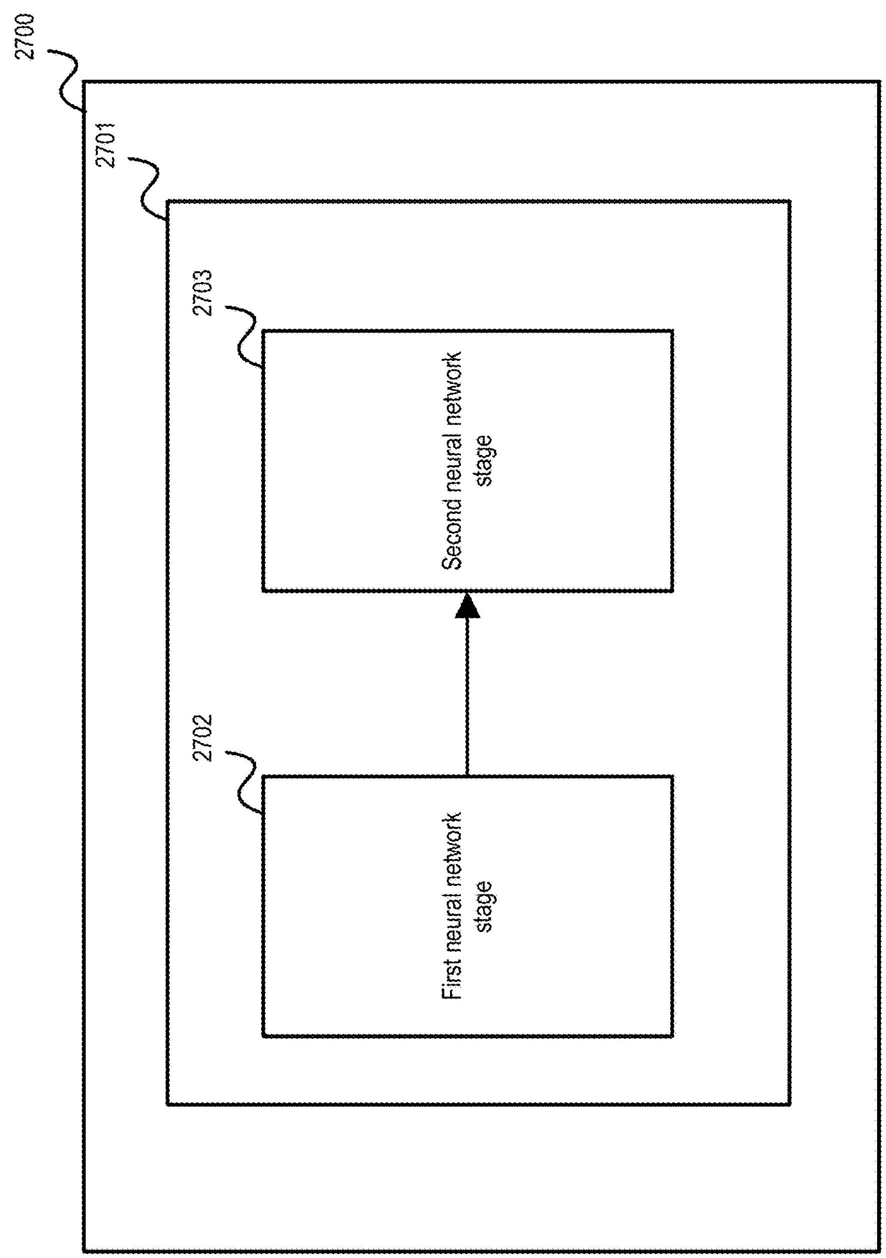
FIG. 27 illustrates a radar processing device.

According to various embodiments, in other words, a radar processing device is provided as illustrated in FIG. 27.

FIG. 27 illustrates a radar processing device 2700.

The radar processing device 2700 includes one or more neural network processing units (e.g. implemented one or more processors) 2701 including a first neural network stage 2702 configured to generate, for each radar measurement frame of a sequence of radar measurement frames, one or more feature maps of radar reception data and a segmentation of the radar reception data (e.g. into a plurality of segments), wherein the feature maps contain feature map information (e.g. for each of the plurality of segments).

The one or more neural network procesing units 2701 further include a second neural network stage 2703 configured to generate, for a segment (e.g. for each segment of the plurality of segments), for each radar measurement frame of the sequence of radar measurement frames, information of an object (e.g. for which detection of presence is indicated in the segment) from the feature information contained in the feature maps for the segment and, if the radar measurement frame follows an earlier radar measurement frame in the sequence of radar measurement frames, from the feature information contained by the feature maps for the segment to the second neural network stage of the one or more earlier radar measurement frames.

According to various embodiments, in other words, segmentations and features maps are determined by a first neural network stage and, for each segment, the features maps are combined over the sequence of frames by the second network stage to determine information of an object (for which the segment indicates detection of its presence). It should be noted that when generating the information of the object for a radar measurement frame, the second neural network stage may do this based on information of the object it has generated for one or more earlier radar measurement frames in the sequence of radar measurement frames. So, generating the information of the object from the feature information contained by the feature maps for the segment to the second neural network stage of the one or more earlier radar measurement frames may be understood as generating the object information based on the results of the generation of information of the object for the one or more earlier radar measurement frames.

The approach of FIG. 27 allows discrimination of challenging targets and activities such as pedestrian and bike movement in an automotive driving scenario on the basis of radar measurements, or gait detection for human recognition, gesture recognition for a wireless user interface using a high resolution radar sensor data operating at a short measurement cycle, wherein a result of classification, motion estimation etc. may be given for each input data voxel.

According to various embodiments, a sequential four-dimensional input data based deep neural network is provided to which may output object classification and/or activity results for dynamic objects such as pedestrians using a high-resolution radar sensor at a fast rate (at minimum using data of a single frame, i.e. an output is generated for each radar measurement frame). Here, "fast" depends on frame duration and the frame rate of the radar sensor—it is not dependent or tied to the micro-motion cycle period of the objects as in traditional micro-Doppler classification algorithms.

Figure 28:
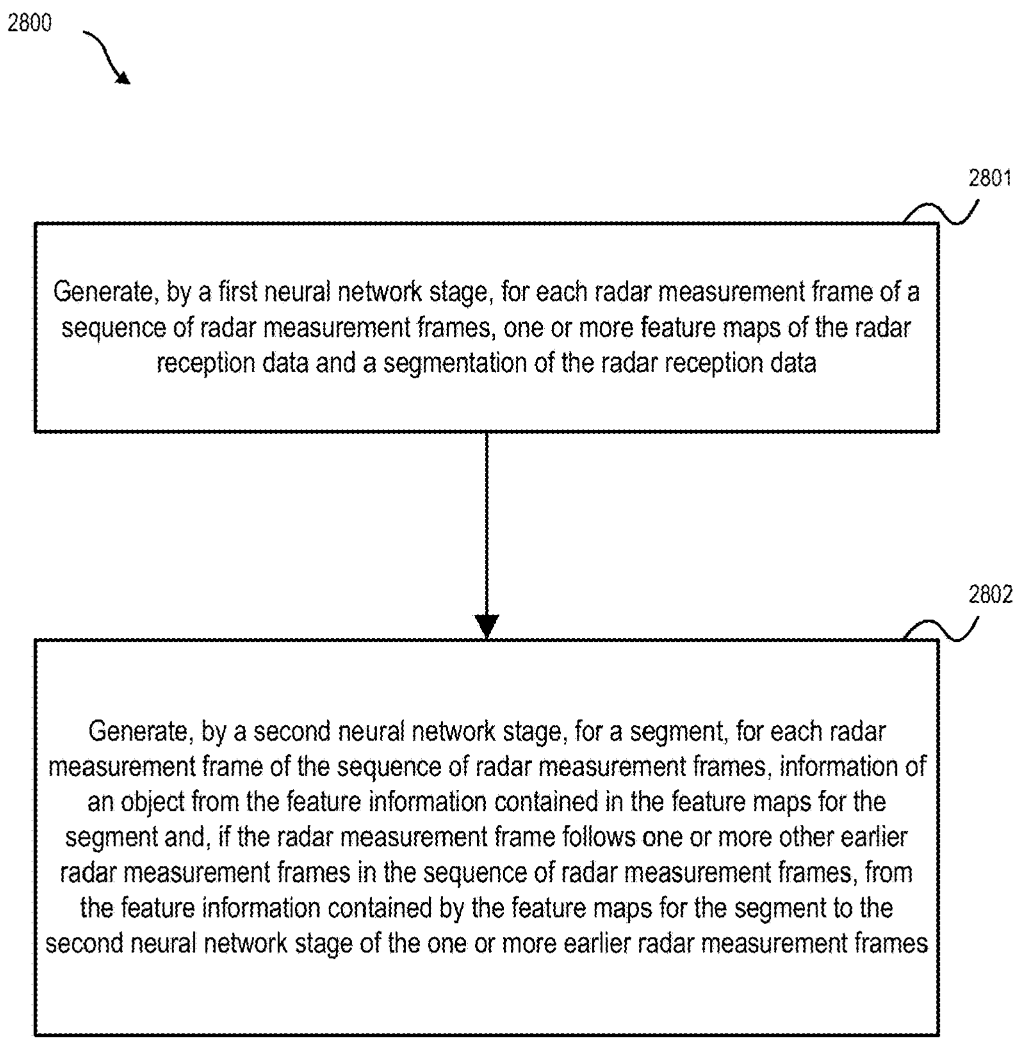
FIG. 28 illustrates an exemplary flowchart of a method for determining information of an object, for example carried out by a radar processing device.

According to various embodiments, a method is provided as illustrated in FIG. 28.

FIG. 28 illustrates an exemplary flowchart 2800 of a method for determining information of an object, for example carried out by a radar processing device.

In 2801, the radar processing device generates, by a first neural network stage, for each radar measurement frame of a sequence of radar measurement frames, one or more feature maps of the radar reception data and a segmentation of the radar reception data, wherein the feature maps contain feature map information.

In 2802, the radar processing device generates, by a second neural network stage, for a segment, for each radar measurement frame of the sequence of radar measurement frames, information of an object from the feature information contained in the feature maps for the segment and, if the radar measurement frame follows an earlier radar measurement frame in the sequence of radar measurement frames, from the feature information contained by the feature maps for the segment to the second neural network stage of the one or more earlier radar measurement frames.

According to various embodiments, an end-to-end learnable architecture is provided that reconstructs (e.g. 4D) radar images from (raw) digital (radar) reception data received from the radar ADC. The digital reception data may be raw IQ samples. For example, the ADC 411 provides I samples and a second chain including a second mixer, a second filter and a second ADC is provided, wherein the second mixer mixes the radio receive signal with the radio transmit signal shifted by 90° such that the second ADC provides Q samples. The ADC 411 and the second ADC may together form and be referred to as the radar ADC (which provides, in this case, IQ samples as digital (radar) reception data).

An architecture as it is provided may according to various embodiments be extended to be concurrently used for perception tasks such as object classification, detection, scene segmentation, orientation estimation etc.

It should be noted that recent advancements in MIMO radar resolution open the possibility of using MIMO radar systems to perform perception tasks. However, as the radar resolution increases with an increasing number of transmitter and receiver chains, there is a blow-up in the data generated by the radar front-end (e.g. in the digital reception data). Therefore, it becomes challenging to handle the resulting data stream within a reasonable power, processing and latency budget. Conventional techniques for generating high-resolution radar images (i.e. point clouds) are extremely data intensive, have a lack of flexibility and have high computational complexity. The computational burden of further using this data for perception (e.g., using deep neural networks) either makes the overall perception system unscalable, or in cases where the data is pruned or compressed, this may compromise the accuracy of the perception inference. It particular, it may be challenging to meet the latency and accuracy requirements in real-world applications such as in autonomous driving.

According to various embodiments, these limitations are addressed by providing an end-to-end trainable network architecture to generate the point clouds as well as to provide perception. In addition, it allows outputs from multiple stages of the training/inference pipeline, to be used in a feedback loop to modify the radar system parameters (e.g., waveform) for improved detection. It may include an image reconstruction network that is trainable in a self-supervised way, and thus does not require hard-to-obtain ground truth labels for training the image reconstruction part.

Specifically, according to various embodiments, a radar processing device (or radar processor) is provided having an end-to-end trainable hybrid architecture that relies on a combination of minimal, simple signal processing steps (e.g., FFTs) and an autoencoder network is provided. According to various embodiments the architecture is based on a neural network which can be trained in a self-supervised way (i.e., without requiring ground truth labels) to reconstruct radar voxels and/or point-cloud images to arbitrary resolution and perform perception tasks such as object detection/classification, scene segmentation etc.

According to various embodiments, the overall pipeline is trainable in an end-to-end fashion, i.e., it is fully differentiable, taking as input complex-valued IQ samples and outputting semantic information (object class, segmentation etc.) while providing access to the 3D/4D/ point-clouds/ voxels generated as an intermediate part of the pipeline. While the outputs are produced on a frame-by-frame basis, the outputs can be used in a sequential manner as inputs for a 5D-DNN network for tracking usages, as well as leveraging features like micro-doppler signatures across several frames for, e.g., robust pedestrian detection.

According to various embodiments, the radar processing uses outputs from the intermediate stages of the neural network-based processing in a feedback loop to drive changes in the radar system (e.g. the radar frontend), e.g., changing the radar waveform, field-of-view etc. These cognitive adaptive features further improve overall perception accuracy. These outputs can come after range/Doppler, or direction determination (i.e. AoA reconstruction), or full perception output.

As explained above with reference to FIG. 5 and FIG. 6, the baseband processing pipeline (i.e. the processing starting after ADC conversion, e.g. by ADC 411) includes range processing and Doppler processing followed by Angle of Arrival (AOA) estimation (i.e. angle (azimuth and elevation) determination). Range processing may be performed by a range FFT stage (or by matched filtering) and Doppler processing may be performed by a Doppler FFT. AOA estimation may be performed in two steps, namely, coarse and super-resolution. In a coarse step, the antenna response is transformed into angular domain based on steering vectors and array factors. In the super-resolution step, more advanced signal processing algorithms may be used to refine and further separate the target in the angular domain. The pipeline is typically arranged in an increasing order of complexity, with the super-resolution AOA algorithms notoriously computationally heavy. Hand-crafted iterative algorithms, approximated algorithms and other techniques may be used to reduce complexity of each step. Furthermore, to reduce overall complexity, handcrafted detector algorithms may optimally be used after each of the processing stages gating uninteresting output from entering and being processed by the following processing stages.

In a MIMO radar system, to achieve desired higher resolution (of spatial bins, radial velocity bins and angular bins or, in other words, imaging quality), a larger number of virtual antenna elements and a larger system data bandwidth may be used. However, scaling the system to high resolution the complexity of conventional methods quickly becomes infeasible for practical implementation even with the complexity-reduction techniques.

Range and Doppler processing creates a range-doppler map, and the AoA estimation creates a azimuth-elevation map for each range-doppler bin, thus resulting in a 4D voxel. A detector may then create a point cloud, which can then be an input for a perception pipeline.

Each detected point corresponds to a combination of one or more spatial bins (e.g. a range bin or a combination of two or more cartesian or polar bins) and a radial velocity bin. For example, a detector compares the output of the AOA determination, e.g. Doppler FFT output values for each bin combination (e.g. for each range-Doppler bin) with a threshold and discards those bin combinations where the value if below the threshold. The remaining bin combinations form the point cloud. A separate pipeline of perception may then be used to further perform tasks such as object detection classification, segmentation and tracking on the point cloud.

According to various embodiments, a baseband processing pipeline (i.e. a processing of digital radar reception data) for radar image reconstruction is described which includes one or more neural networks.

Figure 29:
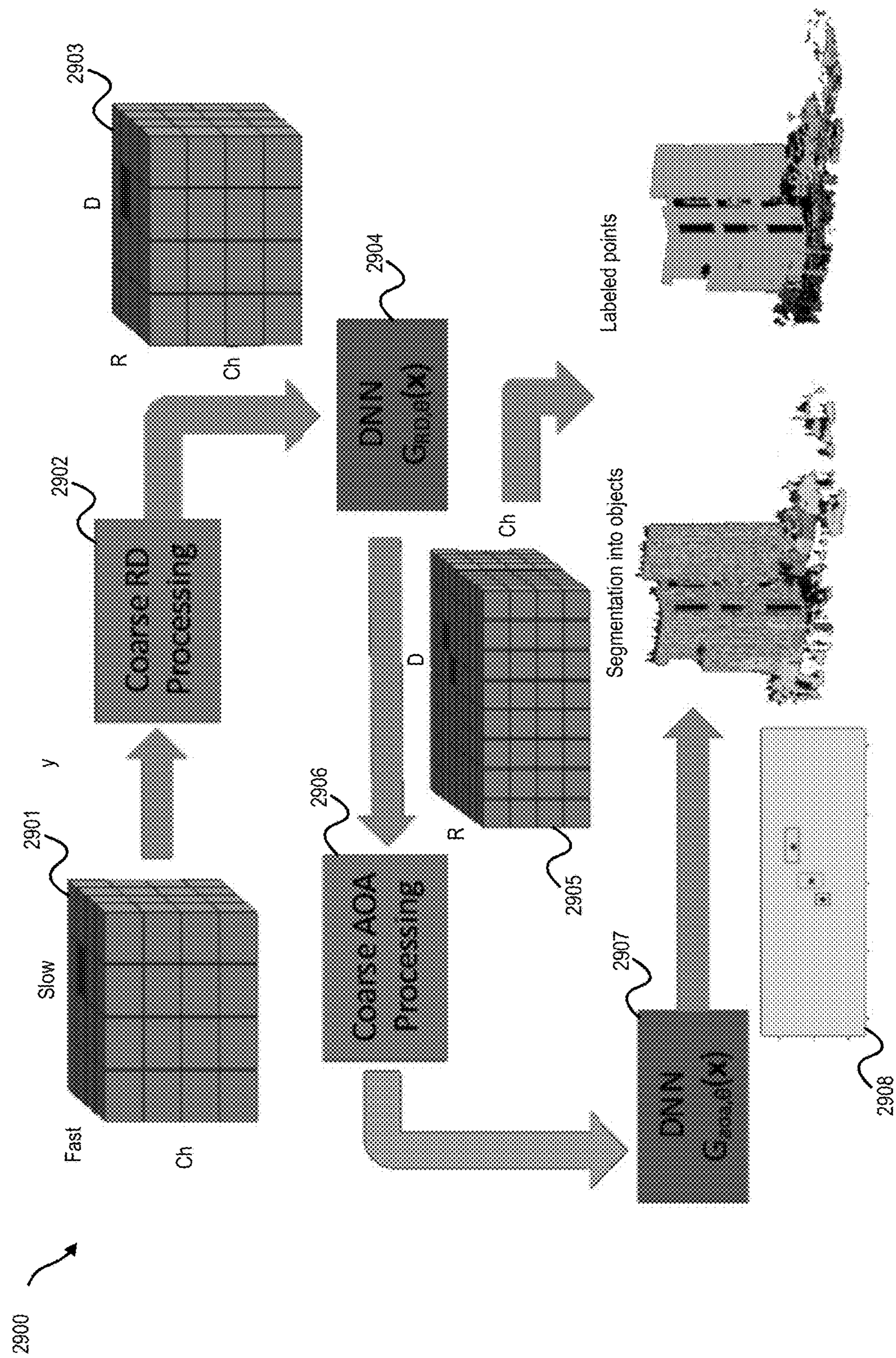
FIG. 29 shows a baseband processing and image reconstruction pipeline according to an embodiment.

FIG. 29 shows a baseband processing and image reconstruction pipeline 2900 according to an embodiment.

For example, the radar processor 402 implements the baseband processing and image reconstruction pipeline 2900.

The input to the baseband processing and image reconstruction pipeline 2900 is a data cube 2901 as described with reference to FIG. 5 (i.e. corresponding to data cube 504).

As a first processing stage, the baseband processing and image reconstruction pipeline 2900 includes coarse range-Doppler (CRD) processing 2902. The coarse range-Doppler processing 2902 for example uses the a range matched filtering DSP (digital signal processor) block (or a range FFT DSP block) and a Doppler FFT DSP block to generate an initial estimate of the range-doppler maps for each virtual channel of the received MIMO radar signals Thus, the output of the coarse RD processing 2902 is a range-Doppler map for each virtual channel, i.e. a stack (or voxel) of range-Doppler maps 2903. This means that there is no aggregation over the virtual channels (or antennas) in this example but a range-Doppler map is generated for each channel.

Next, the baseband processing and image reconstruction pipeline 2900 includes a first neural network processing stage 2904 which generates a refined a stack (or voxel) of range-Doppler maps 2905.

Next, the baseband processing and image reconstruction pipeline 2900 includes a coarse angle of arrival (CAOA) processing. For example, the baseband processing and image reconstruction pipeline 2900 uses a digital beam-scan block on each refined range-Doppler bin to convert the array response into a coarse angular domain The output of the CAOA processing 2906 is a coarse direction estimation, e.g. a coarse estimation of an angle of arrival map. The CAOA processing 2906 for example removes the dependency on specific array geometry for the following neural network processing.

Next, the baseband processing and image reconstruction pipeline 2900 includes a second neural network processing stage 2907 which refines the coarse direction estimation to a refined direction estimation.

By the two (deep) neural network processing stages 2904, 2907, the baseband processing and image reconstruction pipeline 2900 implements a two-stage DNN based reconstruction and (optionally) perception. The output 2908 of the radar reconstruction pipeline is a "reconstructed" radar image (i.e. an AOA map) and, optionally, perception outputs. The radar image is in the present example a 3D radar image (range, one angle of direction (AOA), Doppler) or a 4D radar image or 4D voxel (range, two angles of directions (AOA), Doppler). The 4D radar image has for example a value which, in dependence of its magnitude (e.g. a measure of its power), indicates the detection of the presence of an object for each combination of a range, an azimuth, an elevation and a radial velocity.

The two neural network processing stages 2904, 2907 refine the coarse RD and AOA processing results for improved performance and efficiency of reconstruction. In particular, the use of design of handcrafted algorithms can be avoided.

In the first neural network stage 2904, a neural network referred to as DeepRD takes an input from each channel of the CRD block (i.e. range-Doppler map stack 2903) to generate a refined, phase corrected RD response. The refined RD output 2905 is further processed by the CAOA 2906 before input to the second neural network stage 2907.

The second neural network processing stage 2907, implemented by a neural network referred to as DeepAOA, takes as input a coarse AOA estimation for each range-Doppler bin, and refines it to obtain a refined AOA output with improved resolution and suppressed clutters. The two- stage neural network architecture allows a very efficient inference-time configuration.

It should be noted that a "refined" map may have, with respect to a "coarse" map, a higher resolution of bins (i.e. range, azimuth, elevation and/or radial velocity bins).

Minimally only one instance of DeepRD and needs to be instantiated for the first neural network processing stage 2903 and only one instance of DeepAOA needs to be instantiated for the second neural network processing stage 2906. The neural network processing stages 2903, 2906 may evaluate DeepRD and DeepAOA, respectively, in respective loops over all virtual channels and range-doppler bins, respectively.

Further, for training the neural networks DeepRD and DeepAOA, they can be first trained separately with independently collected or generated training samples in respective Range-Doppler and angular dimensions, followed by an end-to-end finetuning step on full 4D input. This training time configuration promotes data efficiency and greatly reduces overall training time. In addition, where labeled data is available the final layers of the DeepAOA can be straightforwardly configured for perception tasks (e.g., detection, segmentation).

This means that the output 2908 of DeepAOA may include perception outputs like bounding boxes, a segmentation or a labeling of points. To achieve this, DeepAOA (e.g. final layers) may also receive the refined stack of range-Doppler maps 2905 as input.

Figure 30:
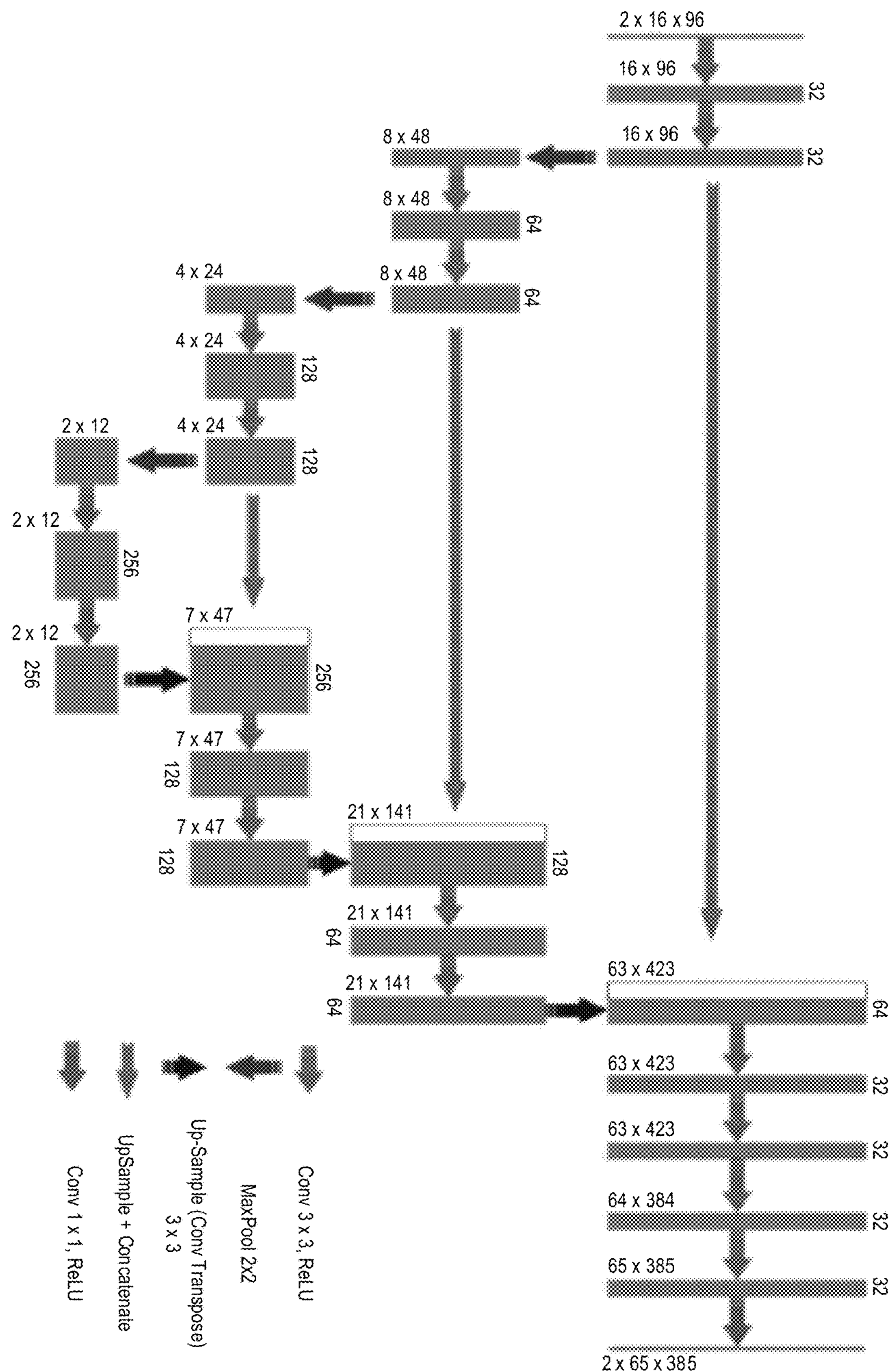
FIG. 30 shows an exemplary neural network architecture.

FIG. 30 shows an exemplary neural network architecture 3000.

One or both of DeepRD and DeepAOA may have the neural network architecture 3000.

The neural network architecture 3000 can be seen as a variant of a U-Net model. A neural network having the neural network architecture 3000 is a fully convolutional network (FCN) consisting of a contractive part 3001 and an expansive part 3002 (separated by a dashed line 3003 for illustration). The contractive part 3001 generates features through successive convolution operations and max-pooling (downsampling).

In contrast, the expansive side 3002 uses up-sampling operators which increase the output resolution. Further, the concatenation of the features from the contractive layers help allows the context information to propagate to the higher resolution layers, which helps the reconstruction process. The use of only convolutional layers (and no fully connected layers) ensures that the spatial information is maintained and the output layers only contain information from the voxels for which some information is available in the contractive layers. Further, autoencoder architectures like the U-Net shown here have been known to perform very well on 3-D segmentation tasks and thus their use in reconstruction can be extended to perform segmentation (or perception) tasks. Alternatively, the outputs of the reconstruction step can be fed to a separate neural network to perform perception.

It should be noted that the neural network architecture 3000 is only an example and any general autoencoder architecture, featuring encoder and high-resolution decoder blocks can be employed for DeepRD, DeepAOA or both.

The baseband processing and image reconstruction pipeline 2900 splits the end-to-end image reconstruction pipeline into two sequential steps of firstly, reconstruction in the range-doppler domain, followed by the angle-of-arrival (AoA) reconstruction for each of the range-Doppler bins to result in the final output 2908 (e.g. 3D or 4D voxel output).

For range-doppler reconstruction, IQ samples from the radar frontend ADC are passed through the coarse range-doppler processing 2902 to yield the low-resolution range-doppler (RD) map per virtual channel. This RD map is the input to the DeepRD neural network (e.g. a U-Net type neural network), whose output is a high-resolution RD map.

Figure 31:
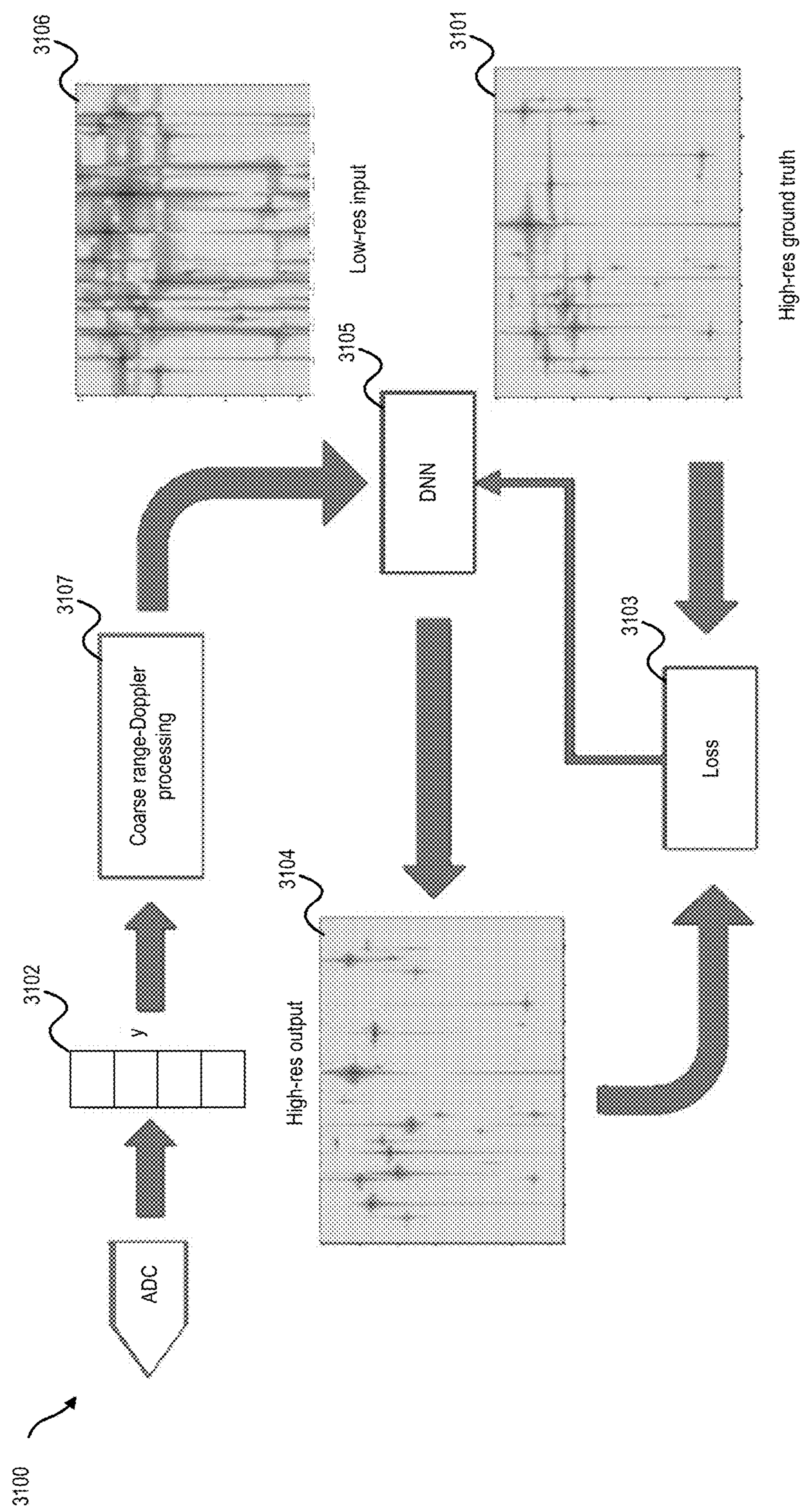
FIG. 31 illustrates a supervised training of a neural network according to an embodiment.

FIG. 31 illustrates a supervised training of the DeepRD neural network according to an embodiment.

The training is performed by a training device and, according to various embodiments, the training of the DeepRD neural network relies on creating a high-resolution ground truth map 3101 for given IQ samples 3102 using the known channel impulse response.

The training device determines the mean squared error loss 3103 between the output 3104 of the neural network 3105 (i.e. the DeepRD), which the neural network 3105 generates from the coarse output 3106 of the coarse RD processing 3107, and the ground truth 3101. The training device uses the loss 3103 to train the neural network 3105, i.e. trains the neural network 3105 in a supervised way.

The training device may similarly train the DeepAOA in a supervised way. For example, the training device may train the DeepAOA to minimize the modified L2 loss, $L(x,x')=\|Cx-x'\|_2^2$ where x' are values of a reconstructed radar image generated by the DeepAOA, x are values of a ground truth image and C is a hyperparameter (the best value of which can be determined during the training process). In cases where a high-resolution ground truth is available, the DeepAOA can be trained to improve the resolution of the AOA reconstruction as a substitute for a computationally expensive super-resolution block.

However, a key challenge in radar imaging is that high-resolution ground truth in the angular domain is difficult to obtain. Therefore, according to various embodiments, the training device uses a self-supervised approach.

Figure 32:
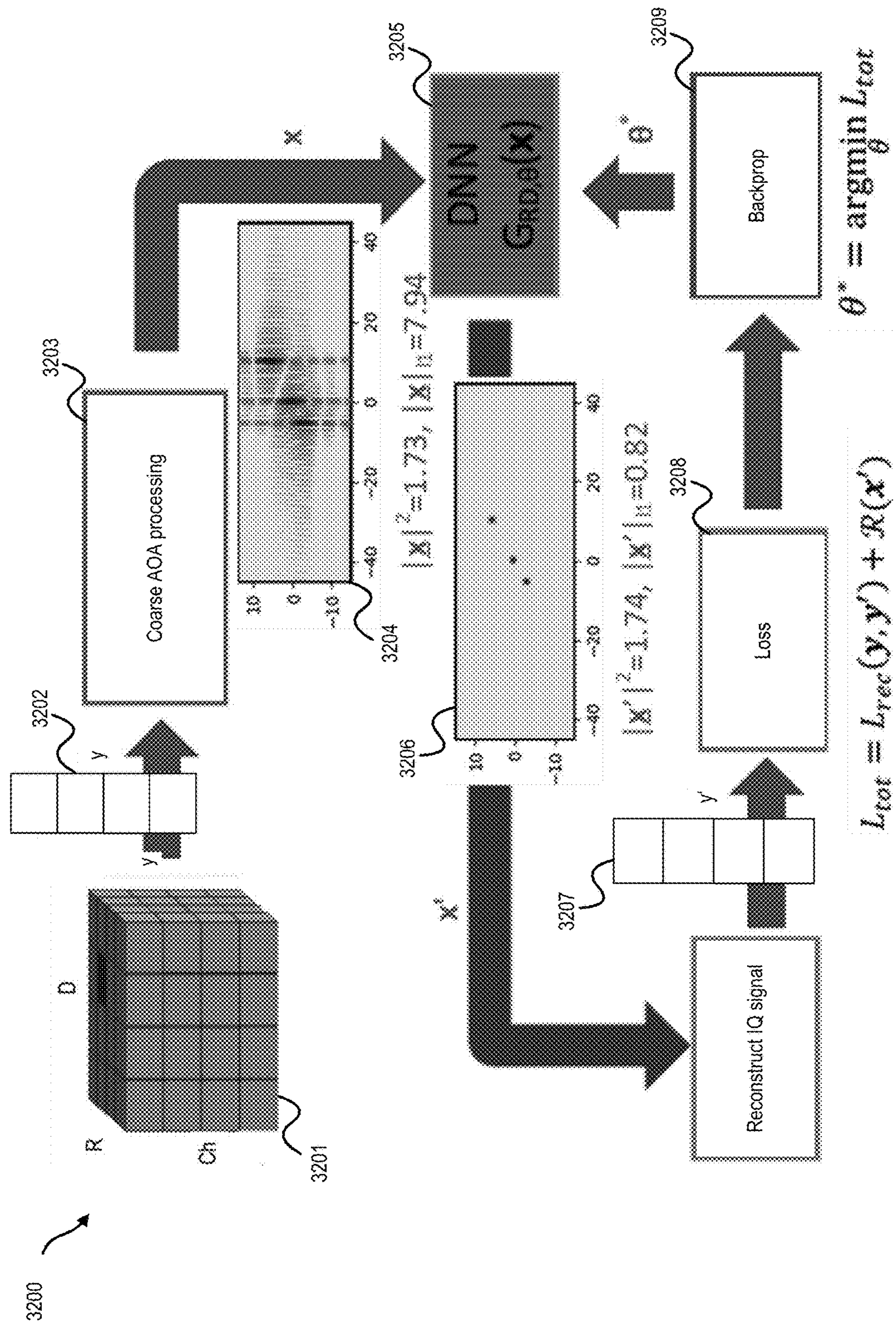
FIG. 32 illustrates a self-supervised training of a neural network according to an embodiment.

FIG. 32 illustrates a self-supervised training of the DeepAOA neural network according to an embodiment.

The training is performed by a training device. The training device takes, from a data cube 3201, IQ samples 3202 for all the virtual channels for a given range doppler bin and passes them through coarse AOA processing 3203 to generate a low-resolution AOA map 3204 . This serves as an input to the DeepAOA 3205. The output of the DeepAOA 3205 is a high-resolution AOA map 3206. Since it is assumed that there is no ground truth AOA map available, the training device uses the output of DeepAOA 3205 to reconstruct the IQ samples 3207.

The training device then determines a loss 3208 between the IQ samples 3202 and the reconstructed IQ samples 3203 and uses backpropagation 3209 to adapt the weights of the DeepAoA 3205 to reduce the loss 3208. The loss function is for example designed to minimize the mean squared error between the IQ samples 3202 and the reconstructed IQ samples 3203. According to an embodiment a sparsity constraint is additionally imposed on the AOA output 3206 of the DeepAOA 3205. Thus, the overall loss function for training the DeepAOA 3205 is for example $Ltot=a\|y-y'\|2^2+\beta\|x'\|_1$ wherein x' is the sparsity of the AOA output 3206. Here the weights assigned to the L2 and L1 components of the loss, $\alpha$ and $\beta$ respectively, can be considered as hyperparameters to be tuned.

Together, the two reconstruction stages (RD reconstruction, implemented by the CRD and the DeepRD and the AOA reconstruction implemented by the CAOA and the DeepAOA) of the baseband processing and image reconstruction pipeline 2900 in sequence can yield the overall 3D/4D point cloud or voxel representation for a given scene for a given frame. The use of auto-encoder type frameworks for reconstruction also enables their use in direct semantic information extraction, if labels are available. The reconstructed voxels and the semantic information can be further input into a 5D pipeline to process the time-series data of the sequence for tracking targeted objects in a scene, in an end-to-end fashion.

Figure 33:
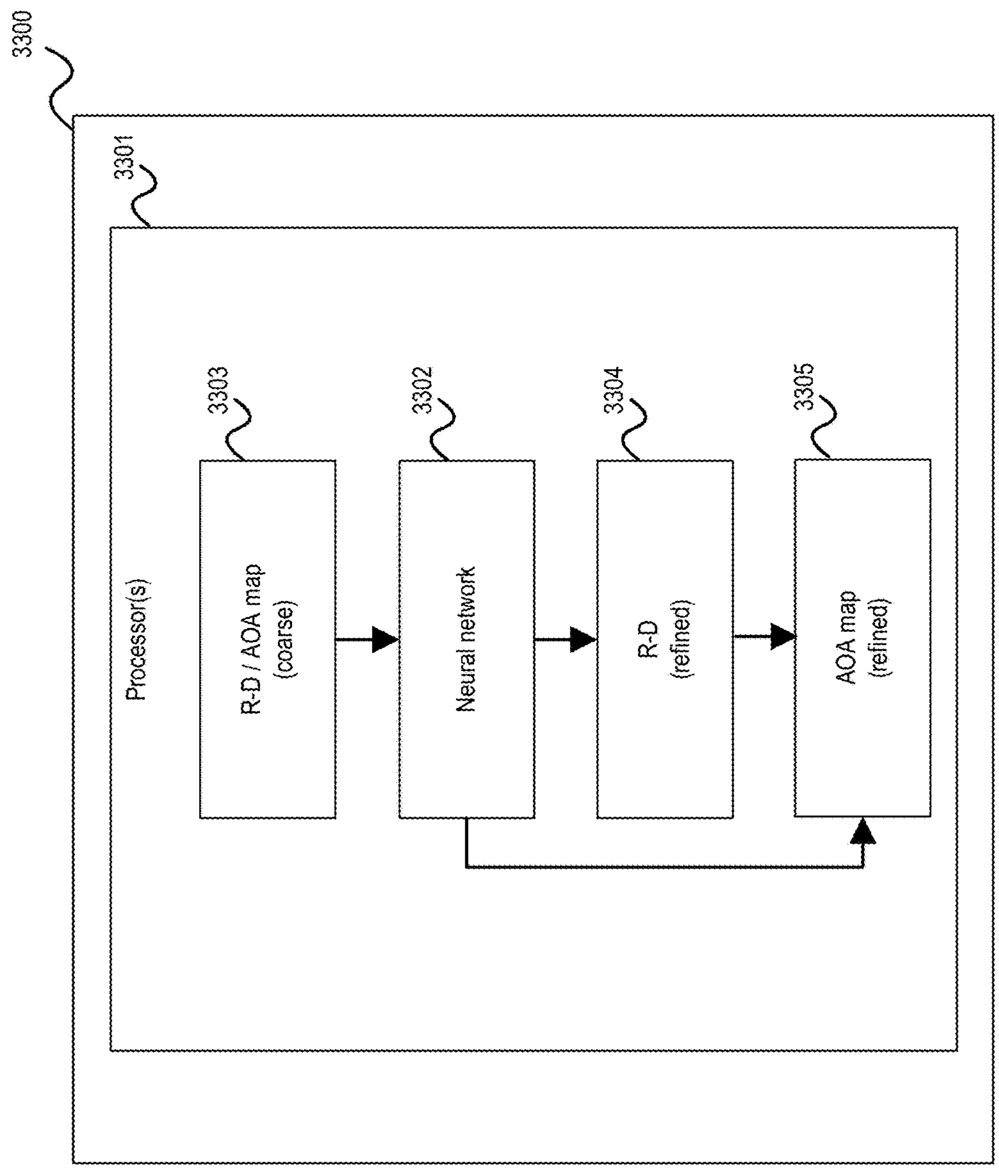
FIG. 33 shows a radar processing device according to an embodiment.

In summary, according to various embodiments, a radar processing device is provided as illustrated in FIG. 33.

FIG. 33 shows a radar processing device 3300.

The radar processing device 3300 includes one or more processors 3301.

The one or more processors 3301 are configured to determine, using a neural network 3302, from a first range-Doppler map 3303, a second range-Doppler map 3304, wherein the second range-Doppler map 3304 has a higher resolution than the first range-Doppler map 3303 and to determine, from the second range-Doppler map 3304, an angle of arrival map 3307 specifying spatial information of one or more (detected) objects.

Alternatively or in combination, the one or more processors are configured to determine, using a neural network 3302, from a first angle of arrival map 3303, a second angle of arrival map 3305 specifying spatial information of one or more (detected) objects, wherein the second angle of arrival map 3305 has a higher resolution than the first angle of arrival map 3303.

According to various embodiment, in other words, one or more neural networks are included in a radar baseband processing pipeline which refine intermediate results, i.e. a range-Doppler map or an angle of arrival map (or both). The one or more neural networks may each generate a refined version of a coarse version of the respective map. The coarse version may be generated by the one or more processors using a handcrafted method, i.e., in other words, a method which is free from being trained or trainable (rather than a machine learning model such as a neural network).

The approach of FIG. 33 provides more flexibility (being easily adaptable to new domains), data-efficiency and scalability which allows in particular the application of MIMO radar in autonomous driving for imaging-based radar solutions. The flexibility and scalability of the approach of FIG. 33 allows application also in other domains such as indoor monitoring, industrial surveillance, and healthcare.

It should be noted that while the approaches described herein are mostly described in context of image reconstruction for MIMO-based radars, they are in principle also directly applicable to non-MIMO-based radar (e.g., analog array, radars ((e.g. Active Electronically Scanned Array or Digital Beamforming array). The processing remains largely the same except that in the case of the MIMO-based approaches described the input to the range-Doppler neural network are IQ samples from all virtual channels while in other applications the IQ samples are from the respective physical channels According to various embodiments, methods are provided as illustrated in FIG. 34 and FIG. 35.

Figure 34:
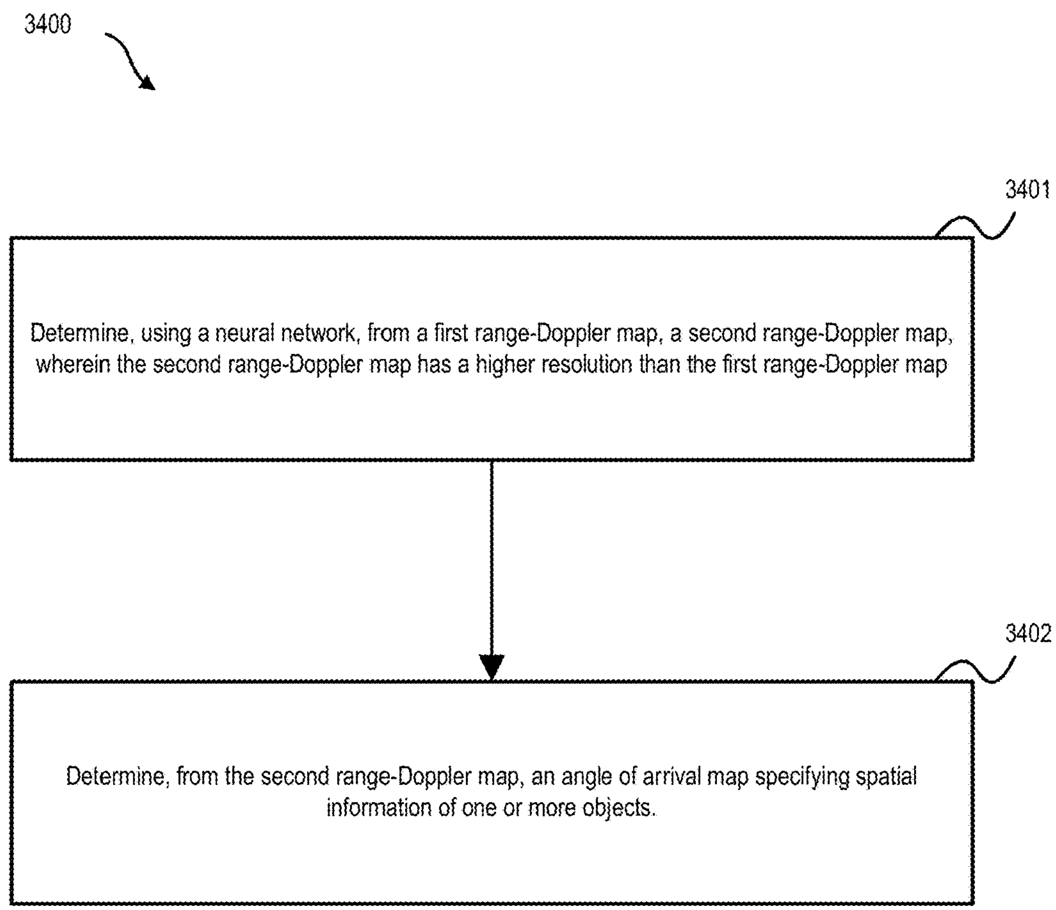
FIG. 34 shows a flow diagram illustrating a method for processing radar reception data according to an embodiment.

FIG. 34 shows a flow diagram 3400 illustrating a method for processing radar reception data, for example carried out by a radar processing device.

In 3401, the radar processing device determines, using a neural network, from a first range-Doppler map, a second range-Doppler map, wherein the second range-Doppler map has a higher resolution than the first range-Doppler map.

In 3402, the radar processing device determines, from the second range-Doppler map, an angle of arrival map specifying spatial information of one or more objects.

FIG. 35 shows a flow diagram 3500 illustrating a method for processing radar reception data, for example carried out by a radar processing device.

In 3501, the radar processing device determines, using a neural network, from a first angle of arrival map, a second angle of arrival map specifying spatial information of one or more objects. The second angle of arrival map has a higher resolution than the first angle of arrival map.

A high-resolution radar frontend 103 typically use large signal bandwidth, long integration time and many transceiver chains to sense the surrounding environment with imaging quality in spatial and radial velocity dimensions. Such high-resolution in 4D results in a large amount of raw digital reception data which creates heavy load on the data link between radar frontend 103 and radar processor 104 and between components of the radar processor 104, memory, storage, signal processing and inference subsystems of the overall radar perception system implemented by the radar processor 104. In practice, digital radar reception data are sparse comparing to the volume of the whole space which is monitored.

Detectors and thresholding mechanisms may optionally be used in various stages of the radar system 101 and certain dimensions of the radar reception data (or signal) space in order to reduce the amount of digital reception data that needs to be transferred, stored and processed. For example, a list of detected points may be output by a pre-processor (of the radar processor 104). The radar processor 104 may use one or more neural networks to perform radar-based perception tasks (such as object detection, classification, segmentation) based on a 3D point cloud or projecting 4D/3D reception data to a 2D plane such as range-Doppler or range-azimuth (optionally projected to X-Y plane in Cartesian space) for reduced storage and computational complexity.

However, conventional detectors may lead to significant loss of perceptual and semantic information in real-world applications. Further, neural network-based methods operation on 3D point clouds and projections to 2D planes are not suitable for 4D high resolution radar sensors and/or lose information by indiscriminately projecting 4D measurement to 2D planes.

According to various embodiments, an architecture and operations for radar data representation, processing and DNN (deep neural network) models to enable efficient data transmission, storage, processing, training and inferencing when the effective dimension of the reception data is much lower than the volume of the space the reception data resides in (hence reception data is sparse) while generating accurate high-resolution radar-based perception.

The various approaches described in the following are applicable to practical problems that use sparse data in 4D or even higher dimensional space. Example of such problems in sensing space including FMCW lidar and Sonar sensor.

In particular, according to various embodiments, the radar processor 104 generates a sparse representation of 4D radar reception data (e.g. in the form of 4D voxels which are input to the perception (e.g. DNN) block of the radar processor 104). Further, according to various embodiments, the radar processor 104 uses sparse DNN operations for data in this sparse representation. In particular, a DNN architecture with the use of both sparse data input and sparse DNN operation is provided. Further, according to various embodiments, a hardware architecture and accelerators for the DNN network and the sparse operations are provided.

In a high resolution radar system 101, digital reception data for input to the perception block (or pipeline) in the radar processor 104 include data for each frame of a sequence of frames. The digital reception data for each frame forming the input data of the perception block for the frame is typically in the form of a 4D input data voxel, e.g. is natively generated in the form of range-azimuth-elevation-radial velocity voxels (having IQ values for range-azimuth-elevation- radial velocity bins).

Each input data voxel is for example generated from radar measurement data of a respective input data frame, for example by one or more FFT stages as for example described with reference to FIG. 5. For example, the radar measurement data may include, for each frame, radar measurement data for a predetermined number of chirps (e.g. K chirps as in the example of FIG. 5). The radar measurement data for example include digital reception data values generated by an ADC (e.g. ADC 411). The digital reception data values may include IQ samples. For example, the ADC 411 provides I samples and a second chain including a second mixer, a second filter and a second ADC is provided, wherein the second mixer mixes the radio receive signal with the radio transmit signal shifted by 90° such that the second ADC provides Q samples.

Each input data voxel includes values for bins, similarly to the R/D map 505 (e.g. second FFT state output values) but unlike the R/D map 505, which contains these values for two dimensions (i.e. for each range Doppler bin), the input data voxel includes the values for four dimensions (e.g. range, azimuth, elevation and radial velocity), i.e. includes a value for each 4D bin. This means that the input data voxel includes a value whose magnitude indicates (radar) detection of the presence of an object for each combination of three spatial bins and a radial velocity (or Doppler) bin. The value for each 4D bin may be complex, i.e. may be a pair of an I value and a Q value (i.e. may be regarded as an IQ sample). It should be noted that the IQ samples of the input data voxels may be the result of processing of (raw) IQ samples of the radar measurement data, i.e. the (raw) IQ samples as provided by the ADCs.

Thus, for example, a fully dense representation of each input data voxel is of dimensionality Nrng×Naz×Nel×Ndop×2 where the last dimension corresponds to the in-phase (I) and quadrature (Q) channel of radar signals Dense representation creates a large amount of data at a moderate update rate of 10 fps (frames per second) in use cases such as automotive for high resolution radars. This means that the input data voxel includes an IQ value (e.g. in the form of a complex number) for each range-azimuth-elevation-Doppler bin, which is a combination of a range bin, an azimuth bin, an elevation bin and a Doppler bin and is in the following referred to as a 4D bin. It should be noted the dimensions may different from the present example, e.g. the spatial dimensions may also correspond to cartesian coordinates.

An input data voxel can thus be written as an element $X \in R^{Nrng \times Naz \times Nel \times Ndop \times d}$ (with d=2 in the present example and R denoting the real numbers). The d-tuple of values is also referred to as a d-tuple of features or feature tuple or feature vector. For example, for each 4D bin, there is a I feature and a Q feature.

In a typical input data voxel, the 4D bins in the field of view in general consists of three categories: I) 4D bins genuinely occupied by objects; II) 4D bins with clutter and ghost responses; III) 4D bins with only thermal noise. Most of the 4D bins in the field of view fall into Category III. Typically, the goal is to preserve 4D bins in Category I and remove noise, clutter and ghost responses. However, it often erroneously eliminates genuine weak targets.

According to various embodiments, the radar processor 104 includes a pre-processor at the entry of the radar perception pipeline. This means that the pre-processor pre-processes digital radar reception data fed to the radar perception pipeline.

The pre-processor carries out the following:

1) The pre-processor vectorizes the input data voxel $X \in R^{Nrng \times Naz \times Nel \times Ndop \times d}$ along the first four dimensions to a two-dimensional array $X' \in R^{(NrngNazNelNdop) \times d}$ (for complex valued I/Q radar input d=2, with real and imaginary parts handled as pairs of real values). Each row in X' corresponds to a 4D bin and is a list of features of the 4D bin.

FIG. 36 illustrates a vectorized input data voxel 3600. The vectorized input data voxel is list of feature vector. This means that the vectorized input data voxel 3600 includes a plurality of rows wherein each row corresponds to a 4D bin (in this example rng1, az1, el1, dop1 to rngNrng, azNaz, elNel, dopNdop). Each row contains, in this example an I feature and a Q feature (which are each real values).

2) The pre-processor removes the rows of X'selectively according to specified rules. According to various embodiments, features of category III bins only are removed. For complex value I/Q radar reception data, the pre-processor calculates the power (e.g. in dB) for each row in X', e.g, for the kth row, as Pdb,k=X'[0, k]2+X'[1, k]2 (wherein the row index is indicated second here).

The pre-processor then removes the rows of X' with Pdb,k<th from X' wherein th=CσN 2 is a predefined threshold value which is for example based on thermal noise variance σN 2. For example the radar system includes a temperature sensor configured to measure the ambient temperature and determines the threshold from the measured temperature. The result of this removal operation is an array $X'' \in R^{N \times 2}$ with $N \ll N_{rng} N_{dop} N_{az} N_{el}$.

3) The pre-processor specifies for each row in X" a 4D location according to the 4D bin it corresponds (i.e. corresponding to the location in the original 4D voxel of the 4D bin whose features the row contains). The pre-processor for example attaches a list L which specifies the 4D location to each row.

FIG. 37 illustrates a vectorized input data voxel 3700 with location information in the form of a location vector or a location index for each feature tuple.

Options for specifying the location (which the pre-processor may use depending on the need) are for example:

a) In spherical coordinates: $L_{sph,k}=(r_k, \theta_k, \phi_k, vr_k)$ where $r_k$, $\theta_k$, $\phi_k$, $vr_k$ denote range, azimuth angle, elevation angle and radial velocity of the kth location, respectively;

b) In electrical spherical coordinates: $L_{uv,k}=(r_k, v_k, u_k, vr_k)$ with $u_k=\cos(\theta_k) \sin(\phi_k)$, $v_k=\sin(\phi_k)$;

c) In cartesian coordinate: $L_{cart,k}=(x_k, y_k, z_k, vr_k)$, with $x_k$, $y_k$, $z_k$, denotes x, y, z of the kth location in cartesian coordinate which can be uniquely derived from (a) above.

d) Indexed location: the location can be discretized based on the target resolution in any of the above-mentioned coordinate system, using Cartesian for the first three dimensions as example:

$$I_k = \left( \left\lfloor \frac{x_k - x_{min}}{\Delta x} \right\rfloor, \left\lfloor \frac{y_k - y_{min}}{\Delta y} \right\rfloor, \left\lfloor \frac{z_k - z_{min}}{\Delta z} \right\rfloor, \left\lfloor \frac{v_{r_k} - v_{r_{min}}}{\Delta v_r} \right\rfloor \right)$$

wherein Δx, Δy, Δz and Δvr denote the nominal resolution in x, y, z and radial velocity dimension.

Figure 38:
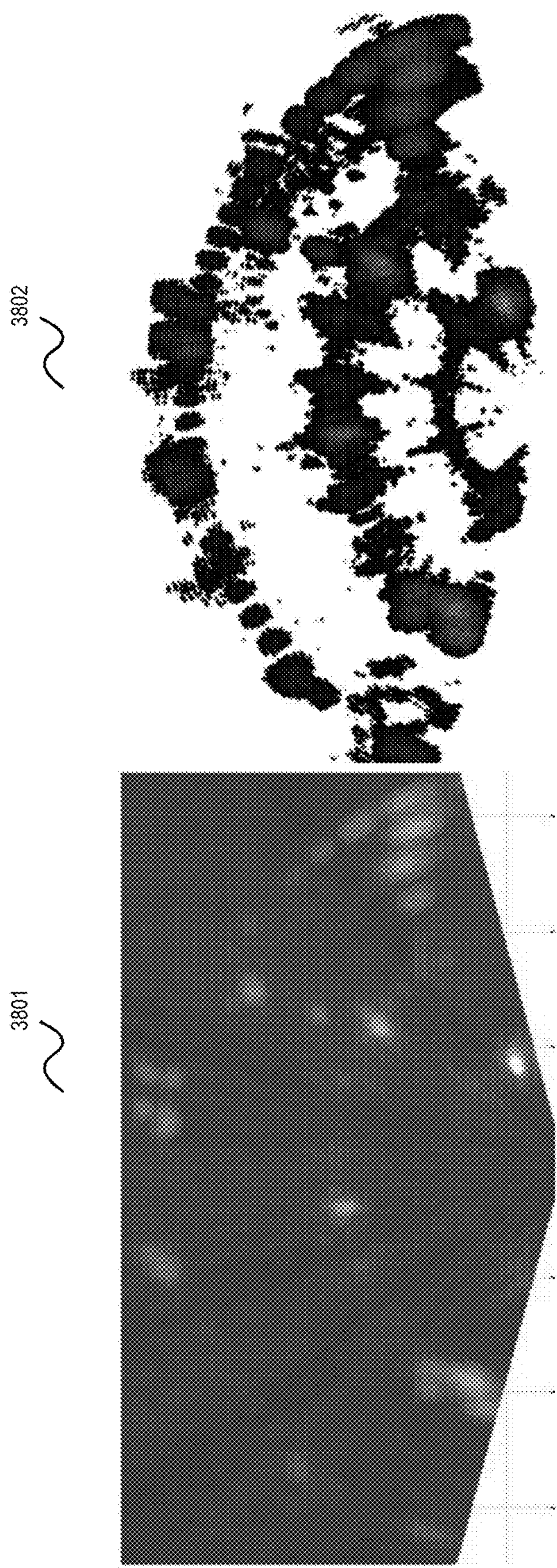
FIG. 38 illustrates, for an input data voxel projected to the X-Y plane, the removal of 4D bins (e.g. by removing row of X').

FIG. 38 illustrates, for an input data voxel projected to the X-Y plane, the removal of 4D bins (e.g. by removing row of X').

A first diagram 3801 illustrates the original voxel data and a second diagram 3802 illustrates the voxel data after removal of 4D bins containing thermal noise. It should be noted that since the pre-processor only removes bins containing (only) thermal noise, weak targets (i.e. objects) as well as peaks due to sidelobes and multipath clutters are preserved in the data while bins due to thermal noise are eliminated.

As described above and illustrated in FIG. 37, the conversion of the input data voxel to a sparse representation by the pre-processor introduces a location vector for feature vector in the feature vector list, which adds to the memory requirement, i.e. introduces memory overhead. This overhead grows with the number of active bins (i.e. bins whose power is above the thermal threshold) and the size of the field of view.

As described above under option d), each location may be specified by specifying an index of a location (i.e. the index of a 4D bin). The lower bound of the memory to store the indices is given by:

$$N\times\lceil\log_2(N_{rng}\times N_{az}\times N_{el}\times N_{dop})\rceil \text{ bits}$$

wherein N denotes the number of active bins, i.e. the number of rows of X". Because of this memory overhead the saving of using the sparse representation diminishes when N grows large enough.

To reduce the memory overhead, according to various embodiments, the pre-processor applies a sedectree based 4D voxel compression. Specifically, to reduce the memory overhead generated by the indices of the locations the pre-processor generates a hierarchical sparse representation in the form of a (pruned) tree (e.g. sedectree) based hierarchical sparse structure to further losslessly compress the location overhead. By using this sparse structure the pre-processor can be considered to takes advantage of the property that most active bins in naturally occurring radar reception data are often clustered in "blobs" in 4D space.

According to various embodiments, the pre-processor generates the hierarchical sparse representation for example by carrying out the following:

1) (Initialize the root of sedectree) Starting from 4D space, the pre-processor divides the space in half along each dimension into 16 subspaces (hence "sedec"). The pre-processor indexes each of the subspace is indexed from 0 to 15.
2) (Initialize the root of sedectree) The pre-processor constructs a 16-elements binary vector [b0, b1, . . . , b15] having one bit for each of the subspace and assign values to the bits so according to
   bi=0 if ith subspace is inactive (does not contain active bins)
   bi=1 if ith subspace active (contains active bins).
3) (Construct next level of tree) For each of the subspace of dimension K (wherein K is lower than or equal to 4 since dimensions may become singular), the pre-processor divides the space in half along each dimension into $2^K$ subspaces. Each of the subspace is indexed from 0 to $2^K-1$.

4) (Construct next level of tree) The pre-processor constructs a $2^K$-element binary vector [b0, b1, . . . , b2K−1], one bit for each of the subspace and assign values to the bits according to bi=0 if ith subspace is inactive (does not contain active bins)

bi=1 if ith subspace active (contains active bins).

5) (Recursively construct levels of tree) The pre-processor recursively applies 3) and 4) for each of the active subspaces until the resulting subspaces each contain a region of predefined minimal size (i.e. number of bins). The pre-processor for example determines the minimal size based on tradeoff between indexing memory requirement and execution indexing/accessing latency requirements.

Figure 39:
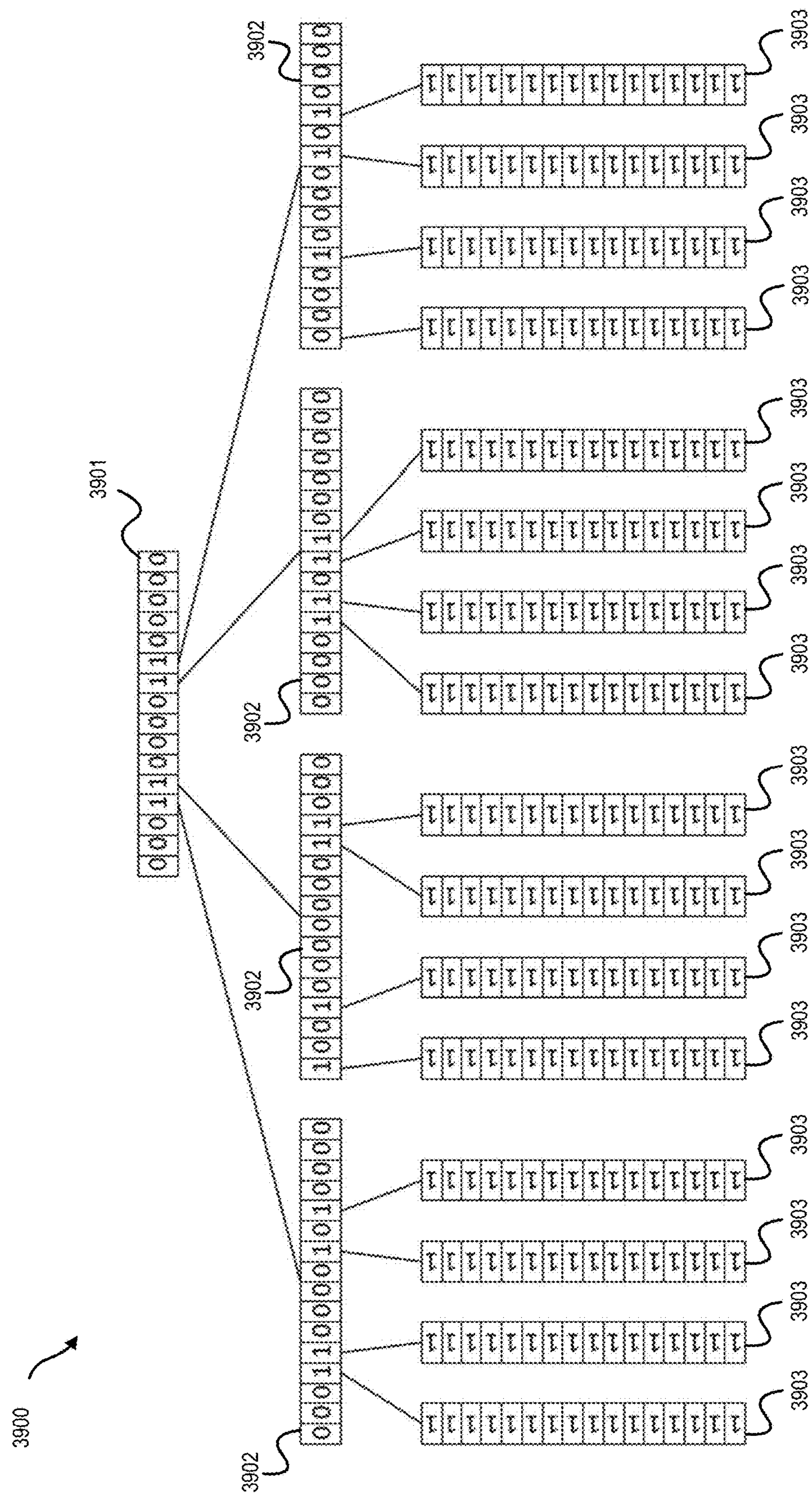
FIG. 39 illustrates a pruned sedectree based data structure.

FIG. 39 illustrates a pruned sedectree based data structure 3900.

The sedectee based data structure 3900 has a root 3901 including 16 bits. For each bit with a value of 1 the root has a (first-level) child 3902.

Similarly, each child includes 16 bits and has a (second-level) child 3903 for each bit with a value of 1. This may go on further to deeper layers but in this example it is assumed that the subspaces of each lowest level child 3903 (i.e. the number of bins that are contained in the subspaces of the lowest level children 3903) is below or equal to the predefined minimum size.

Thus, in this example, the first-level children 3902 are intermediate nodes and the second-level children 3903 are leaf nodes of the tree data structure 3900.

For example, the subspaces of the lowest level children 3903 may be single bins (i.e. the minimum size may be a single bin). In that case, a feature vector is attached to each bit $b_i=1$ of each lowest level child. This feature vector contains the features for the bin.

In case that a subspace of a lowest level child 3903 includes more than one active bin a list of feature vectors is attached to each bit $b_i=1$ (i.e. for each active subspace) (e.g. a sparse feature list as shown in FIG. 37), wherein only the locations within the active subspace need to be indexed.

It should be noted that in step 3), 4), a dimension can become singular so a level (lower than the root) of the sedectree may have less number of children nodes than 16. The resulting data structure can thus be considered as a generalized sedectree. The sedectree based sparse structure indexing saves space if the targets are mostly clustered in small areas in the field of view as most of the subspace are empty hence corresponding branches in the tree are "pruned" (since a node has no children for non-active sub-spaces). By using the pruned sedectree based sparse structure the pre-processor can save a significant amount of memory for indexing when active bins are clustered in 4D subspaces. The upper-bound of memory requirement of indexing with the pruned sedectree based sparse structure is given by:

$$N\times\lceil\text{log2(max(Nrng, Naz, Nel, Ndop))}\rceil \text{ bits}$$

(assuming that the tree is continued until the size of the sub-spaces are single bins)

Table 1 gives an example of the number of bits required for direct index listing of the location of 256 active bins in an 8×8×8×8 space (dimensions d1 to d4).

TABLE 1

| | d1 | d2 | d3 | d4 | d1 × d2 × d3 × d4 |
|---|---|---|---|---|---|
| #bins | 8 | 8 | 8 | 8 | 4096 |
| #bits | 3 | 3 | 3 | 3 | 12 |
| #active bins | 256 | | | | |
| total bits for indexing | 12*256 = 3072 | | | | |

In comparison, in the example of FIG. 39, the pruned sedectree indexing requires only 336 bits (1*16+4*16+16*16).

FIG. 40 shows a comparison of memory requirements for indexing schemes with exemplary 4D array dimensionality. It can be seen that in the worst case the pruned sedectree based indexing saves 62% over direct listing. The "worst case" scenario assumes no further clustering bigger than clusters of size 2×2×2×2. In practice the minimal subspaces can be equal or larger than 2×2×2×2.

In many use cases, radar sensors and other sensors continuously generate sequence of 4D input data voxels at a given frame rate. Such a 4D input data voxel sequence of a given number of frames can be grouped to a "5D super frame voxel" by treating the time dimension as the 5th dimension.

According to various embodiments, the pre-processor extends the sedectree based sparse structure to 5-dimensional data by extending the number of children in the tree from 16 to 32, for example.

However, radar digital reception data is typically not sparse in the time dimension. Therefore, directly extending the sedectree to a "dotriaconta"-tree in this case does not directly provide saving in memory. On the other hand, with a high enough frame rate, the content of consecutive frames is highly correlated.

According to various embodiments, the pre-processor leverages the temporal correlation in content by means of a differential coding scheme on the sequence of 4D frame.

For this, the pre-processor for example carries out the following

1) For a critical frame t, the pre-processor represents the digital reception data $X_t$ in 4D. The pre-processor may use a representation which is dense or which is sparse (e.g. a list representation as described with reference to FIG. 37 or sedectree based representation as illustrated in FIG. 39).
2) For frame t+i with i≥1, the pre-processor represents $X_{t+i}$ as $X_{t+i-1}+dX_{t+i}$, with $dX_{t+i}=H(X_{t+i}-X_{t+i-1})$, where H(.) can be some compression function leveraging the properties of the difference (i.e. feature delta voxel) $X_{t+i}-X_{t+i-1}$ such that a) most of the difference's entries are zero or near zero hence can be compressed based on sparseness; b) the dynamic range of the entries is smaller than that of the original features (i.e. of the features in the voxels $X_t$) hence the entries can be represented by smaller number of bits.
3) For every Nth frame, the pre-processor creates a "critical" frame (for which the pre-processor does not use differential coding) and repeats step 1) and 2) to reset the error propagated through differentially encoded frames.

As mentioned above, the pre-processor is at the entry of the radar perception block of the radar processor 104. A neural network which performs perception tasks may follow the pre-processor.

Figure 41:
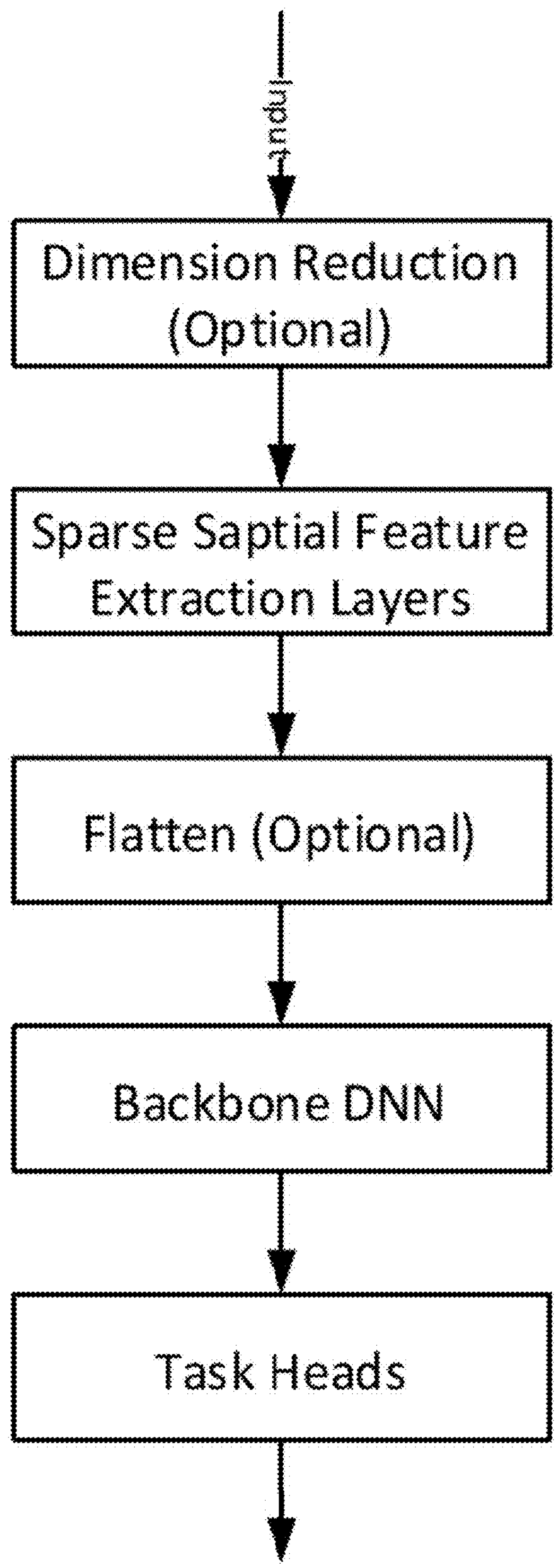
FIG. 41 shows an architecture for a deep neural network (DNN) 4100 with 5D radar reception data input.

FIG. 41 shows an architecture for a neural network (DNN) 4100 with 5D radar reception data input.

According to various embodiments, the DNN 4100 operates on sparse data. This may be a list-based sparse representation as illustrated in FIG. 37 or another sparse representation like the tree-based data structure described with reference to FIG. 39.

In the present example, it is assumed that the input data is in the form of a list-based sparse representation. Specifically, it is assumed that the input to the DNN 4100 consists of two parts, namely, a list of features vectors (i.e. a feature array) and an array of indexed locations (i.e. for each feature vector, a location index).

However, in the present example, in contrast to the illustration of FIG. 37 the feature array does not only include the I and Q values as features but is concatenated in the row direction of X" with one more of location array vectors. For example the input data is, F=[X", Lcart, Lsph (0:2, :)], with the last column of Lsph with replicated information is ignored.

Thus, in the present example, the kth row of the feature array includes I and Q features for one detection from the radar and cartesian and spherical location features, i.e. has the form $[x_{I,k}, x_{Q,k}, x_k, Y_k, v_{rk}, z_k, r_k, \theta_k, \phi_l]$. The indexed location array (i.e. the location contains a location index for each row of the feature array) can for example either be based on a discretized grid in 4D space in cartesian coordinates, spherical coordinates or U-V coordinates.

FIG. 42 shows an example for memory required to store the sparse representation of digital radar reception data.

In the example of FIG. 41, the neural network 4101 optionally performs a dimension reduction 4101 as first stage.

In dimension reduction 4101, the neural network 4101 may reduce the dimensionality of its input data. The neural network 4101 may implement a dimension reduction method that includes handcrafted operations such as mean( )or argmax( )along one of the four dimensions. It can also be a trainable projection on one dimension. The neural network attaches the output of the dimension reduction function to the feature vector as additional features. For example, the neural network may take an argmax( )on power along the radial velocity of dimension. Equivalently, in the sparse representation, the neural network may collapse the entries of same radial velocity to one row in the feature array, and attach the radial velocity with maximum power as an additional feature.

As next processing stage, the neural network 4101 performs sparse spatial feature extraction 4102. Rather than operating on a densely populated continuous array stored in memory, a sparse spatial feature extraction layer of the neural network 4101 takes the input of lists of IQ features, location features and location indexes of the sparse data representation.

The neural network 4101 may for example perform the sparse spatial extraction 4102 according to the following options for neural network layers:

a. (Submanifold) sparse convolutional layers: the neural network mimics conventional convolutional layers by treating each entry in the list of features and indices as a non-zero values in dense multi-dimensional array while skipping unnecessary computation on zero values.
b. Self-attention layers: the neural network takes the feature array as an order-less list of feature vectors. It mixes the location and indexing information with the feature vectors through a positional encoding step. It may employ an FFT based projection in place of positional encoding.
c. Graph-neural network layers: the neural network may treat each row (detection) from the input data array as a node in a graph. It may set connections between the nodes for example according to:

i. For a node, the neural network may consider the node's k nearest neighbor (kNN) nodes to be connected to the node.
it. As distance, the neural network may use the 4D Euclidean distance in the (x, y, z, vr) space.
ii. The neural network may consider a node to be connected to other nodes in the same range bin and close in angles to a-prior known peaks of sidelobes.

As next processing stage, the neural network 4101 optionally performs flattening 4103.

According to various embodiments, the result of 4102, i.e. the extracted spatial feature tensor, is still in 3D or 4D. To fit the input dimensionality of the backbone DNN processing 4104 which follows, the neural network 4100 may flatten the spatial feature tensor one or two dimensions, for example according to the following options:

a. For a 4D feature tensor with the last dimension as radial velocity (., . . . , ., vr), the neural network may flatten the last dimension. The first three dimensions can be 3D cartesian coordinate (x, y, z) or spherical coordinate (r, θ, ϕ).

b. The neural network can flatten a 3D feature tensor in 3D cartesian space (x, y, z), third (i.e. z) dimension to get a top-down view of feature map in (x, y) coordinates.

c. The neural network can flatten a 3D feature tensor in 3D spherical space (r, θ, ϕ) in one of the dimensions to get a camera-like perspective view in any pair combination of the other dimensions, e.g. flatten in the elevation to obtain a combined view in (θ, ϕ) coordinates.

d. The neural network may combine a and b and a and c to flatten a 4D tensor to a 2D tensor if needed.

As next processing stage, the neural network 4101 performs backbone DNN processing 4104.

The backbone DNN includes 3D or 2D convolutional layers (e.g. of a YOLO, ResNet, or U-Net architecture) which extract features depending on the task. Sparse convolutional layers can replace the convolutional layers in the respective backbone NN architecture to further reduce computational complexity and memory size.

The results 4108 of the backbone processing may be 2D/3D bounding boxes (each specified by center, width, height) and/or orientation of objects, radial velocity and/or classification label of objects (or bins).

The radar perception block may include one or more further neural networks that operate on sequential input to refine object detection and tracking over the temporal dimension (i.e. the 5th dimension).

Figure 43:
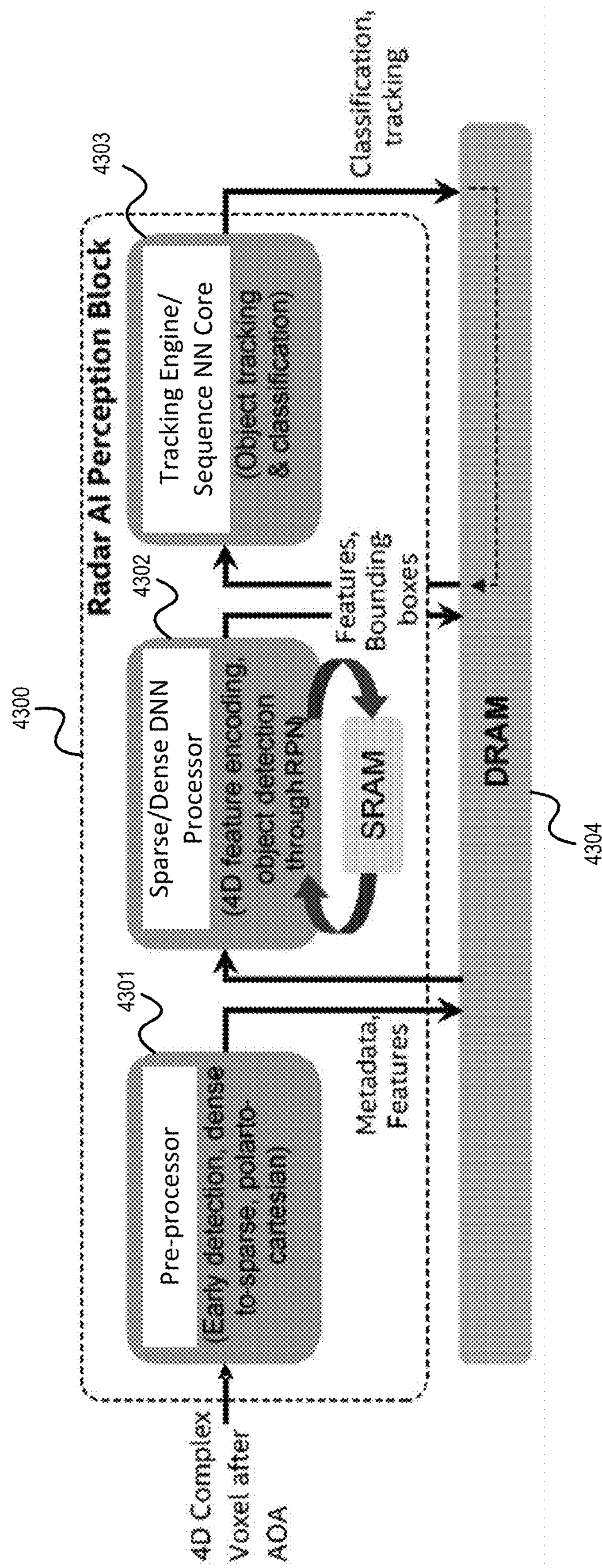
FIG. 43 shows a hardware architecture for a (5D DNN) radar (AI) radar perception block.

FIG. 43 shows a hardware architecture for a (5D DNN) radar (AI) radar perception block 4300.

The radar AI perception block 4300 includes a pre-processor (or pre-processor engine) 4301, a sparse 4D DNN processor 4302 and a tracking & sequence neural network (NN) core 4303. Each of these operational blocks 4301, 4302, 4303 stores processing results in a memory (e.g. a dynamic random access memory (DRAM)) 4304. The DNN processor 4302 and the tracking & sequence NN core 4303 take input data from the memory 4304.

The combination of the pre-processor 4301 and the a sparse 4D DNN processor 4302 with the tracking sequence NN core 4303 allows the hardware to realize a 5D DNN.

Figure 44:
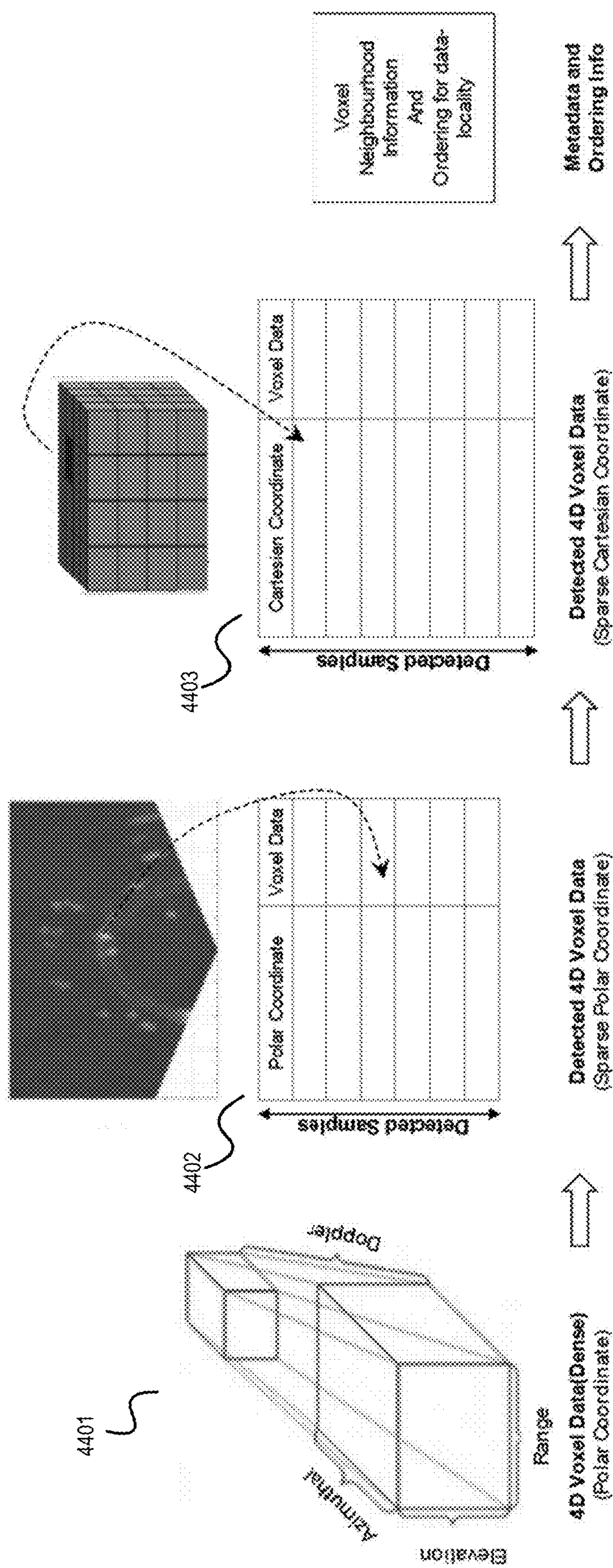
FIG. 44 illustrates the operation of the pre-processors of the radar perception block of FIG. 43 according to an embodiment.

FIG. 44 illustrates the operation of the pre-processors 4301 of the radar perception block 4300 according to an embodiment.

The pre-processor receives a 4D voxel 4401 of radar I/Q samples from a AOA determination block and serially writes them to memory 4404 after sparsifying the dense 4D voxel through coarse detection/thresholding to a list-based sparse representation 4402 using polar coordinates for indicating locations. The pre-processor then performs a transformation of the detected (i.e. sparsified) 4D radar data from polar to cartesian i.e. transforms the list-based sparse representation 4402 using polar coordinates to a list-based sparse representation 4403 using cartesian coordinates. The lists 4402, 4403 have a similar form as described with reference to FIG. 37 with the difference that in this example the columns are reversed (location indication is in the first column, voxel data, i.e. features (IQ values) are in the right column).

The pre-processor stores the a list-based sparse representation 4403 using cartesian coordinates in the memory 4104.

Additionally, the pre-processor may collects neighborhood information and voxel ordering information 4404 that allows optimizing the next-stage processing.

The sparse 4D DNN processor 4302 may for example be implemented as described in the following with reference to FIG. 45.

Figure 45:
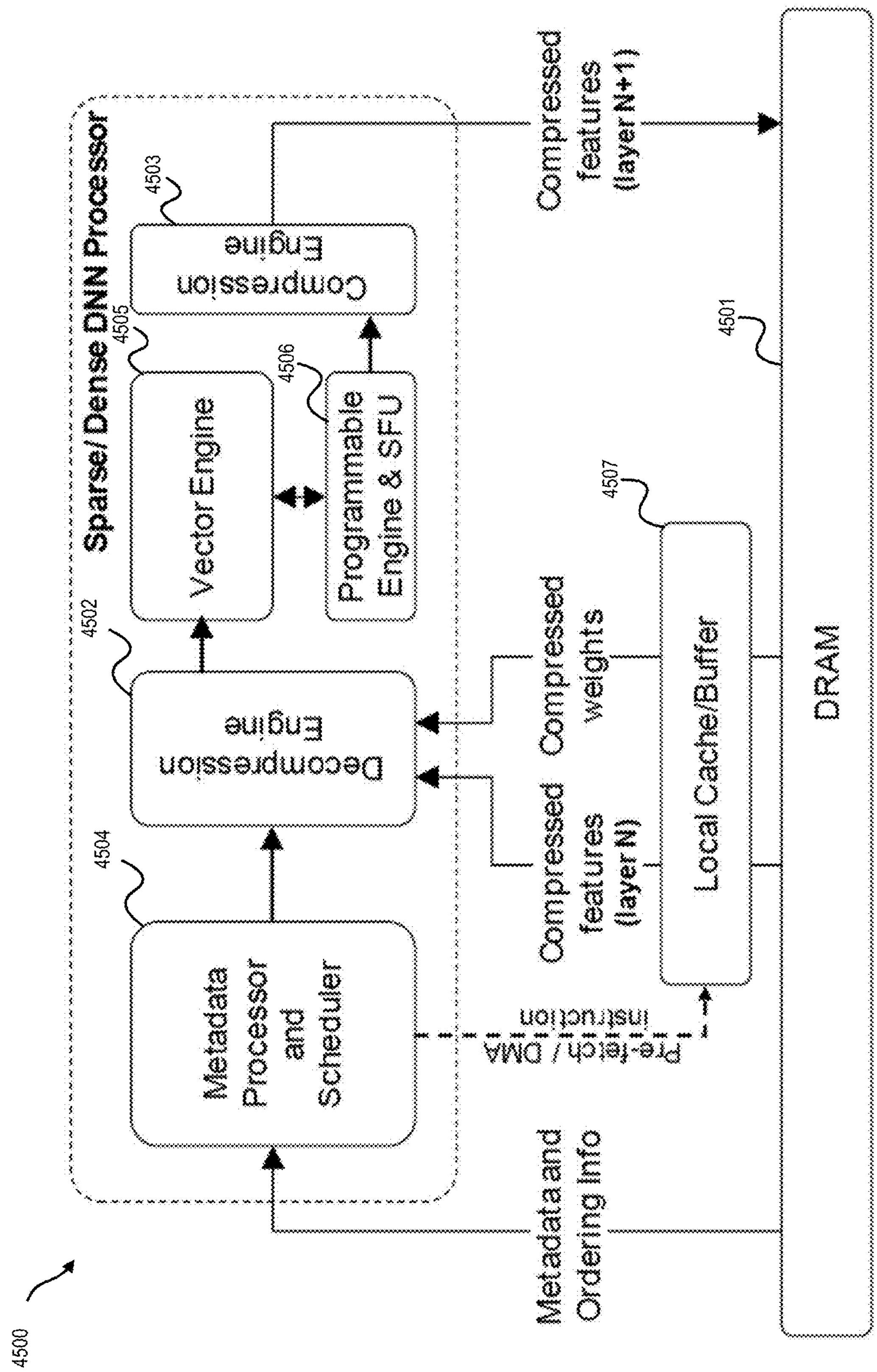
FIG. 45 shows a sparse 4D DNN processor for AI radar perception.

FIG. 45 shows a sparse 4D DNN processor 4500 for AI radar perception.

The 4D DNN processor 4500 processes sparse 4D radar reception data on a per frame basis (where a frame corresponds to a radar scan at a given time-stamp) according to the DNN architecture as described with reference to FIG. 41, i.e. the 4D DNN processor 4500 implements a deep neural network (DNN) according to the neural network 4100. The DNN processor 4500 performs the processing of the NN layers of the DNN by sequentially fetching input features from DRAM and writing output features back to a memory 4501 (corresponding to memory 4104). Memory access happens via a cache 4507. A decompression engine 4502 parses compressed data identifying valid operands to process, while a compression engine 4503 compresses output features by detecting zeros. A metadata processor 4504 schedules the processing by fetching data optimally as per the ordering and neighborhood information 4404 collected in the pre-processing stage. A vector engine 4505 and a programmable engine & SFU (special function unit) process the data provided by the decompression engine 4502 and supplies the results of the processing to the compression engine 4503. Select modes of the metadata processor 4504, the compression engine 4502 and the decompression engine4503 provide the capability to process both dense and sparse data as required for NN layers in the DNN. The last few layers of the DNN architecture estimate regions of detected objects along with associated feature-vectors. This means that the 4D DNN processor 4500 may also be switched to operation on dense data, i.e. may be configured to operate as a sparse/dense DNN processor for AI radar perception.

As described with reference to FIG. 39, the pre-processor 4101 may generate a sedectree-based sparse representation of the digital reception data. According to various embodiments, the radar processor 103 may include a custom acceleration block (e.g. as part of the pre-processor 4101) having an architecture as illustrated in FIG. 46.

Figure 46:
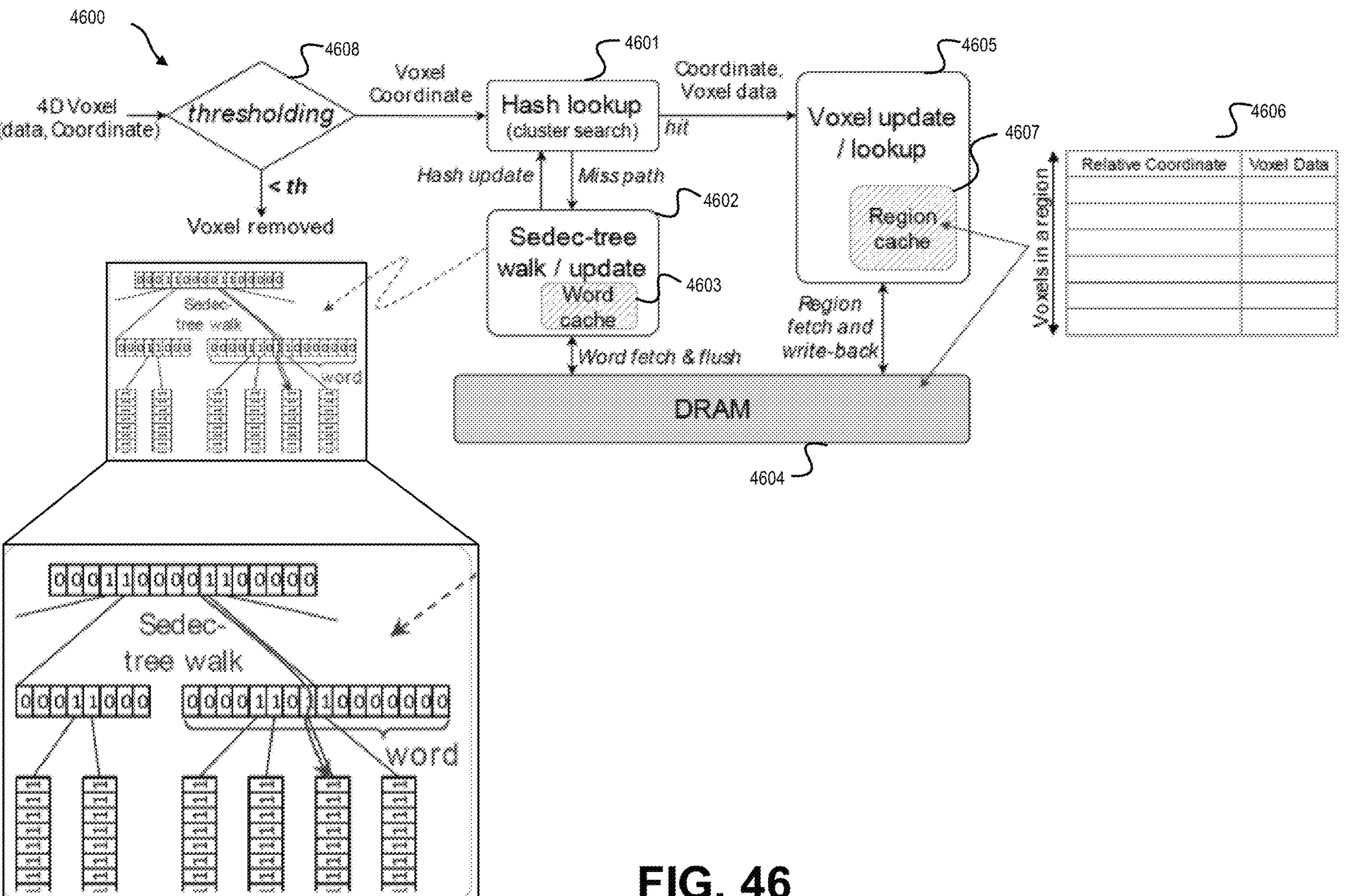
FIG. 46 shows an architecture of a sedectree creation and 4D voxel lookup block.

FIG. 46 shows an architecture of a sedectree creation and 4D voxel lookup block 4600.

The sedectree creation and 4D voxel lookup block 4600 supports to create a sedectree-based sparse representation (i.e. a secectree-based sparse storage structure) of voxel data (containing digital radar reception data subjected to thresholding 4608 as described above) and access to voxel data as required for NN layer processing during 4D object detection. A hash lookup block 4601 uses a spatial locality aware hash structure provide fast lookup for coordinate to region mapping. Upon miss at hash-lookup, a tree traversal block 4602 performs a sedectree walk traversing the required data words (corresponding to given voxel coordinates at all levels in sedectree hierarchy) to return a region ID (either existing or newly allocated) which it further updates into the hash structure. A (small) word cache allows avoiding frequent accesses to memory 4604 (corresponding to memory 4104) during the sedectree walk. After the tree traversal or upon hit at hash lookup a voxel update/lookup block 4605 updates voxel data (e.g. features values (e.g. IQ values)) into a corresponding region structure 4606. The region structure 4606 is a list and indexed with relative coordinates (instead of full voxel coordinates) to save storage space. The voxel update/lookup block 4605 also contains a region cache 4607 for quick update and lookup functionality. Upon miss at region cache 4607, the voxel update/lookup block 4605 fetches the required region from the memory 4104.

According to various embodiments, a radar processing device (e.g. radar processor 103) thus has a radar AI perception block with a hardware architecture which implements A pre-processor engine that sparsifies 4D dense I/Q data through coarse detection (e.g. through thresholding I/Q values) and writes detected voxels in compressed format.

On-the-fly polar to cartesian coordinate conversion along collecting neighborhood information and determining ordering structure to maximize data-reuse in next processing stage.

Figure 47:
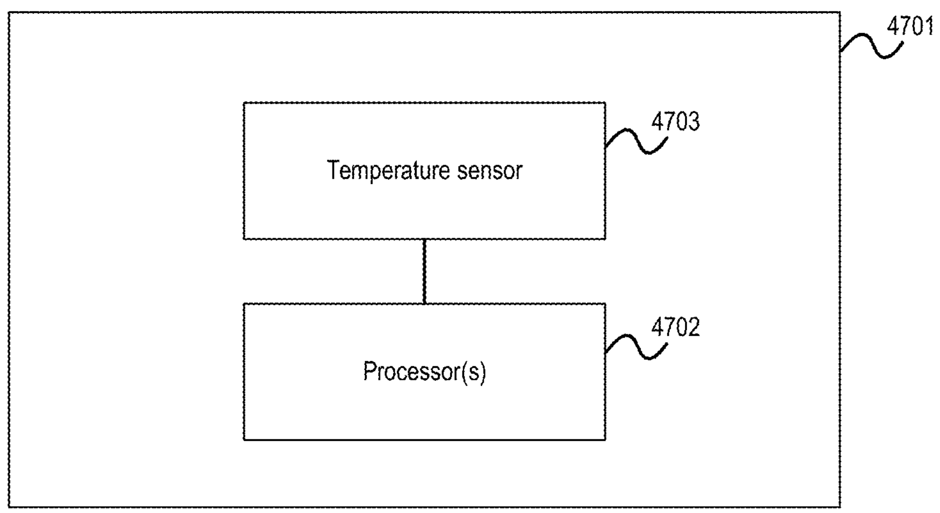
FIG. 47 shows a radar system according to an embodiment.

A storage and processing of compressed data (radar samples, intermediate features) that minimizes data accesses to DRAM An Accelerator for sedec-tree creation and 4D voxel lookup In summary, according to various embodiments, a radar system is provided as illustrated in FIG. 47.

FIG. 47 shows a radar system 4700 according to an embodiment.

The radar system 4700 includes a temperature sensor 4701 configured to measure a temperature of the radar system 4700.

The radar system 4700 further includes one or more processors 4702 configured to select a portion of radar reception data values for further processing based on a thermal noise threshold based on a measured temperature.

According to various embodiments, in other words, a radar system proceeds on the basis of radar reception values (e.g. IQ samples) which lie above a thermal noise threshold. Thus, it may for example be ensured that weak targets are considered in the further processing (e.g. are detected) while keeping the amount of data to be processed, stored and communicated, e.g. in the radar baseband processing pipeline, low. The reception data values are for example generated by a radar sensor of the radar system. It should be noted that the further processing may include removal of clutter and ghost responses (e.g. followed by detection, perception etc.).

Figure 48:
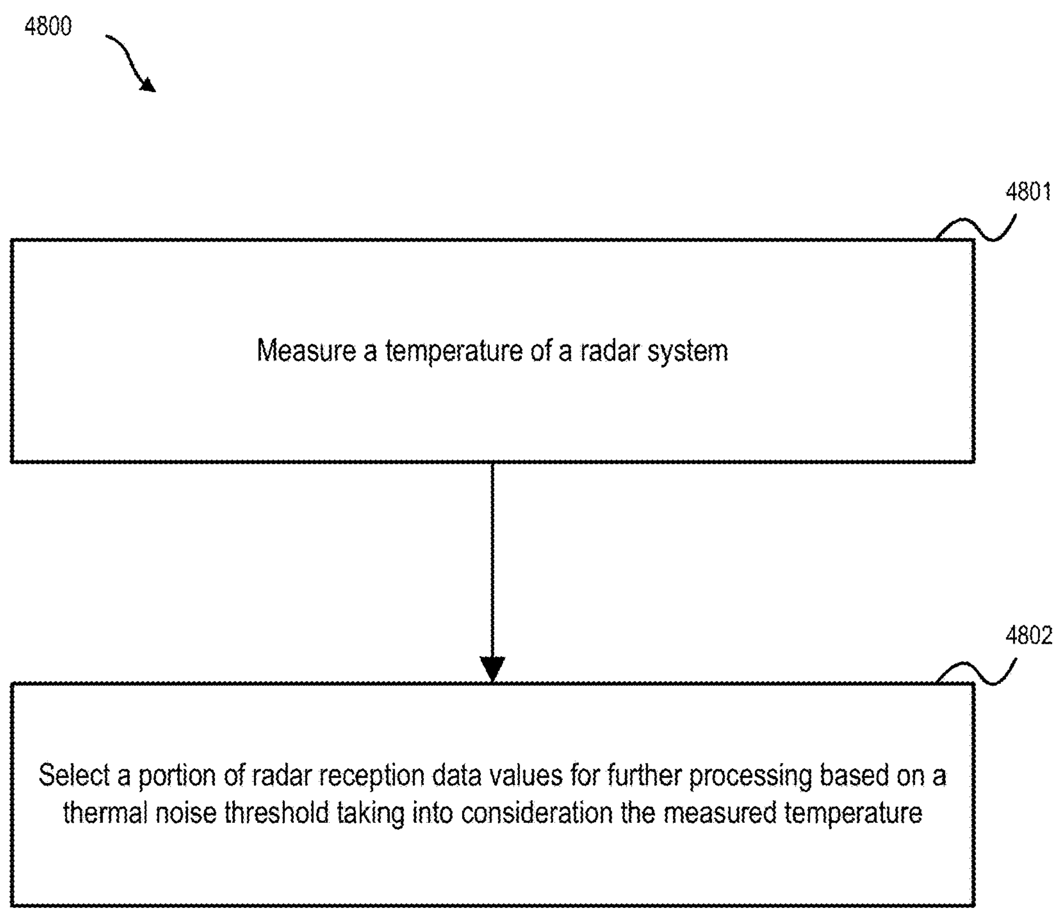
FIG. 48 shows a flow diagram illustrating a method for processing radar reception data, for example carried out by a radar system.

FIG. 48 shows a flow diagram 4800 illustrating a method for processing radar reception data, for example carried out by a radar system.

In 4801, the radar system measures a temperature of a radar system.

In 4802, the radar system selects a portion of radar reception data values for further processing based on a thermal noise threshold based on the measured temperature.

Figure 49:
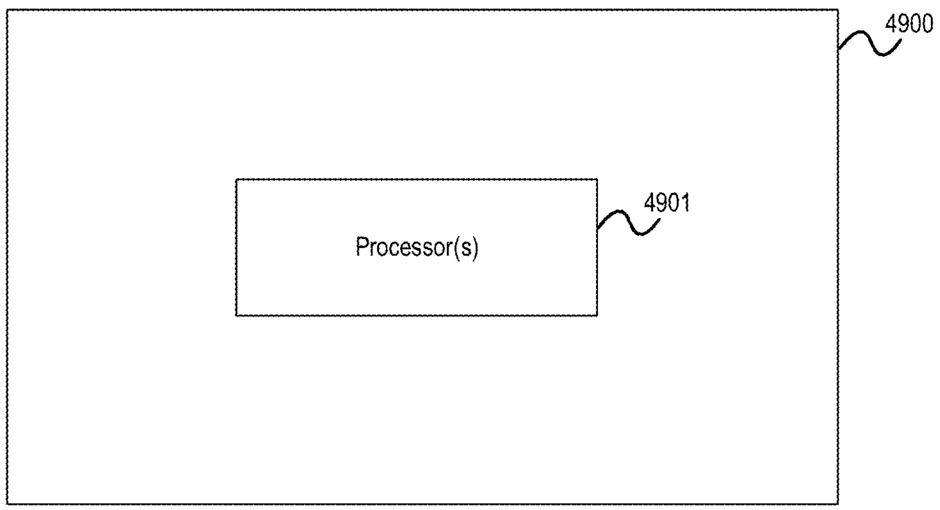
FIG. 49 shows a radar processing device according to an embodiment.

According to a further embodiment, a radar processing device is provided as illustrated in FIG. 49.

FIG. 49 shows a radar processing device 4900 according to an embodiment.

The radar processing device 4900 includes one or more processors 4901 configured to determine radar reception data values for locations in a multi-dimensional space from radar measurement data and to represent the radar reception data values in a tree data structure by generating nodes for sub-spaces of the multi-dimensional space and attaching, to each node, generated for a respective sub-space, radar reception data values determined for locations of the sub-space in a data structure attached to the node.

According to various embodiments, in other words, a radar processing device represents radar reception data values in a tree-based sparse storage structure wherein sub-trees of the tree correspond sub-spaces of the multi-dimensional space. The smaller a sub-tree is (i.e. the further its root node is away from the root node of the (complete) tree), the smaller the sub-space (for which the sub-tree is generated) is. Attaching data or a data structure to a node (or general other data or another data structure) may be understood that there is a link between the data or data structure and the other data or other data structure. This may for example be a reference by means of an ID or an index (e.g. to an array) or an association that is represented in any other way. The radar processing device may store the radar reception data values represented in the tree data structure in a memory.

Figure 50:
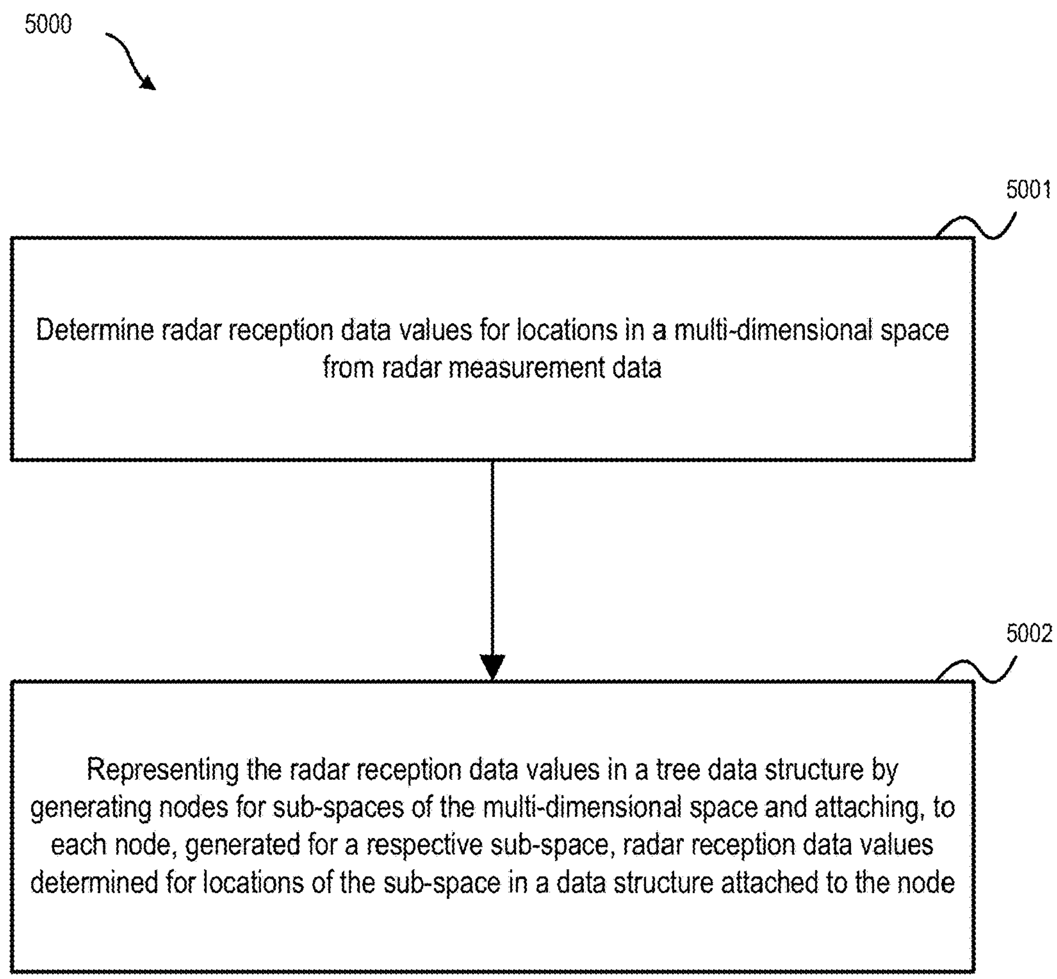
FIG. 50 is a flow diagram 5000 illustrating a method for representing radar reception data, for example carried out by a radar processing device.

FIG. 50 is a flow diagram 5000 illustrating a method for representing (and e.g. storing) radar reception data, for example carried out by a radar processing device.

In 5001, the radar processing device determines radar reception data values for locations in a multi-dimensional space from radar measurement data.

In 5002, the radar processing device represents the radar reception data values in a tree data structure by generating nodes for sub-spaces of the multi-dimensional space and attaching, to each node, generated for a respective sub-space, radar reception data values determined for locations of the sub-space in a data structure attached to the node.

Figure 51:
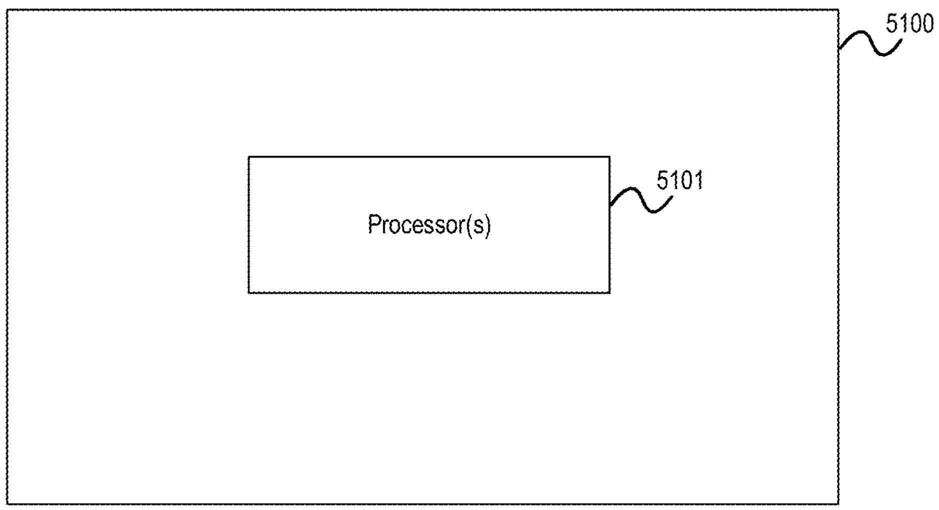
FIG. 51 shows a radar processing device according to an embodiment.

According to a further embodiment, a radar processing device is provided as illustrated in FIG. 51.

FIG. 51 shows a radar processing device 5100 according to an embodiment.

The radar processing device 5100 includes one or more processors configured to determine radar reception data including radar reception data values from radar measurement data, determine which radar reception data values of the radar reception data values satisfy a predefined evaluation criterion, arrange the radar reception data values of the radar reception data values which satisfy the predefined evaluation criterion into a data structure for sparse data and process the data structure for sparse data by means of a neural network.

According to various embodiments, in other words, radar reception data is sparsified by filtering out radar reception data values which do not fulfill an evaluation criterion and put into a sparse storage structure (i.e. a storage structure for sparse data). The sparse storage structure is then processed by means of a neural network.

Figure 52:
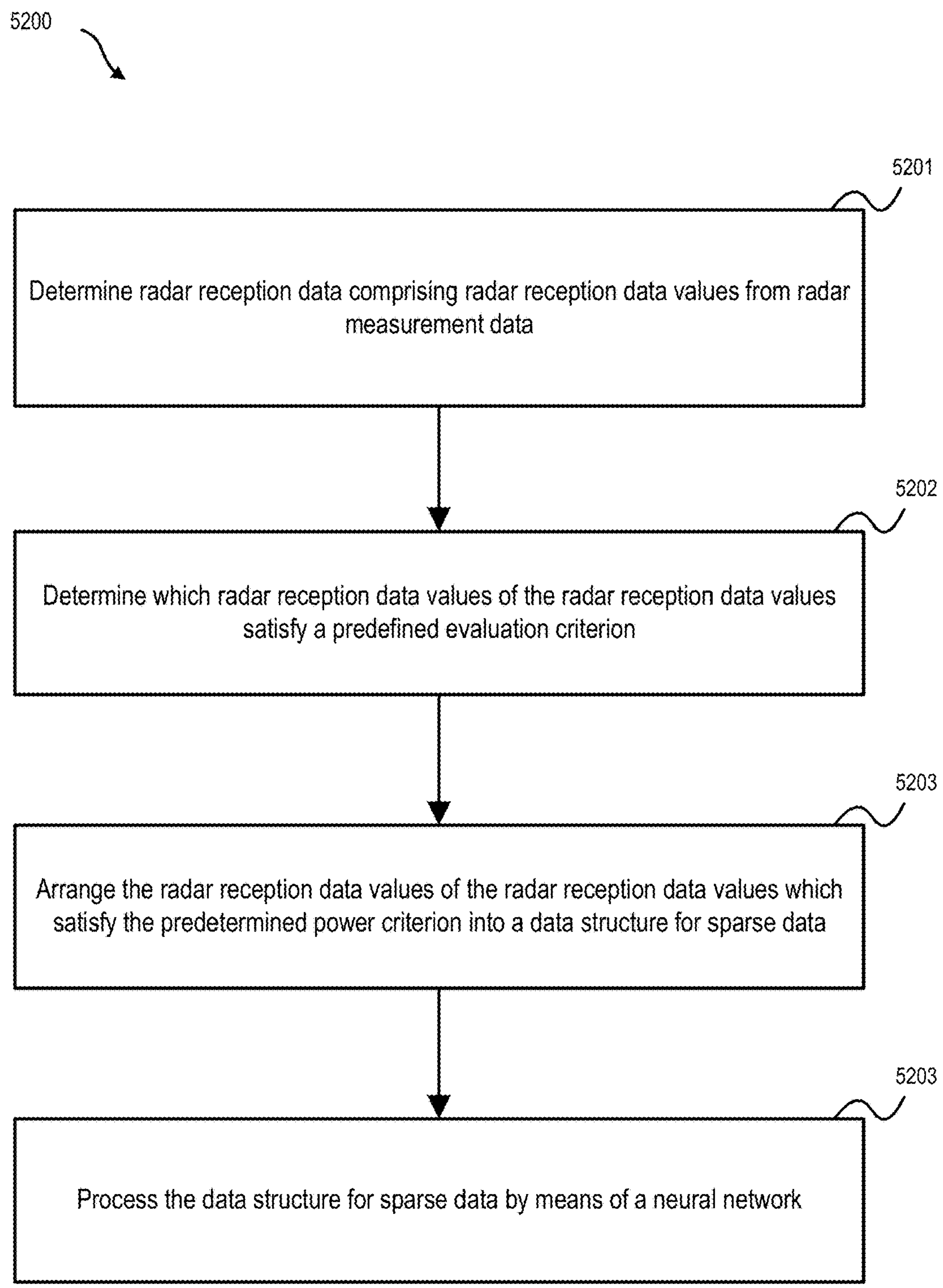
FIG. 52 shows a flow diagram illustrating a method for processing radar reception data, for example carried out by a radar processing device.

FIG. 52 shows a flow diagram 5200 illustrating a method for processing radar reception data, for example carried out by a radar processing device.

In 5201, the radar processing device determines radar reception data including radar reception data values from radar measurement data.

In 5202, the radar processing device determines which radar reception data values of the radar reception data values satisfy a predefined evaluation criterion.

In 5203, the radar processing device arranges the radar reception data values of the radar reception data values which satisfy the predefined evaluation criterion into a data structure for sparse data.

In 5204, the radar processing device processes the data structure for sparse data by means of a neural network.

In the following, various aspects of the present disclosure will be illustrated:

Example 1a may include a radar device that includes a radar processor configured to generate a scene including one or more objects based on a plurality of receive wireless signals; generate one or more ground truth object parameters of the one or more objects; and generate a dataset representative of the scene; a radar detector configured to determine one or more object parameters of the one or more objects using a machine learning algorithm and the dataset; determine an error value of the machine learning algorithm using a cost function, the one or more object parameters, and the one or more ground truth object parameters; and adjust the machine learning algorithm values to reduce the error value.

Example 2a may include the radar device of example la, wherein the radar processor is further configured to transmit a plurality of transmit wireless signals within an environment; and receive the plurality of receive wireless signals including reflections of the transmit wireless signals.

Example 3a may include the radar device of any of examples 1a and 2a wherein using the machine learning algorithm includes using a plurality of weighted values corresponding to different object parameters of the one or more object parameters.

Example 4a may include the radar device of any of examples 1a-3a wherein the error value indicates an accuracy of the determination of object parameters of the one or more objects.

Example 5a may include the radar device of any of examples 1a-4a, wherein the one or more object parameters includes a location, relative speed, and a classification of each object detected in the scene.

Example 6a may include the radar device of any of examples 1a-5a, wherein using the machine learning algorithm includes using a probability density portion configured to determine a probability distribution of the objects detected in the scene and a regression portion configured to determine a total number of objects detected in the scene; and the one or more object parameters include the probability distribution of the objects detected in the scene and the total number of objects detected in the scene.

Example 7a may include the radar device of example 6a, wherein an output of the probability density portion includes a binned map including bins that include values normalized to one and the bins that include greater values than other bins may correspond to objects detected in the scene.

Example 8a may include the radar device of any of examples 6a and 7a, wherein an output of the regression portion includes a scalar representative of the total number of objects detected in the scene.

Example 9a may include the radar device of any of examples 1a-8a, wherein the cost function includes a KL divergence function that outputs a PHD, wherein an integral of the PHD over a volume of a state space is the number of objects detected in the scene.

Example 10a may include the radar device of example 9a, wherein the KL divergence function is defined according to:

$$L=N\cdot KL(p_{em}\|\widehat{p_\theta})+\hat{N}-N\log(\hat{N})$$

in which N represents an actual number of objects in the scene, N^ represents a detected number of objects in the scene, $p_{em}$ represents an empirical distribution of objects in a state-space of the objects, and $\widehat{p_\theta}$ represents a detected distribution of the objects in the scene.

Example 11a may include the radar device of example 10a, wherein pem is defined according to:

$$p_{em}=\frac{1}{N}\sum\delta_{x_i}$$

in which N represents the actual number of objects in the scene and δ is representative of a Kronecker delta function.

Example 12a may include the radar device of any of examples 1a-11a, wherein the radar processor is further configured to determine field test data representative of the environment and one or more objects within the environment based on the receive wireless signals and wherein the dataset is further representative of the field test data.

Example 13a may include the radar device of any of example 1a-12a, wherein the radar processor is further configured to identify one or more pre-defined parameters; generate the scene including the one or more objects as randomly sampled objects based on the one or more pre-defined parameters; model a channel of communication that the radar processor is configured to use to receive wireless signals using the scene; determine one or more object scattering parameters using the scene; and simulate a radar pipeline using the modelled channel and the one or more object scattering parameters, the dataset including information representative of the simulation of the radar pipeline.

Example 14a may include the radar device of example 13a, wherein the one or more pre-defined parameters include at least one of noise source parameters, outlier parameters, interference parameters, multipath parameters, and object distribution parameters.

Example 15a may include the radar device of any of example 13a and 14a, wherein the radar processor includes one or more RF components and the one or more pre-defined parameters include settings of the one or more RF components.

Example 16a may include the radar device of any of examples 13a-15a, wherein the radar processor is configured to model the channel as a mathematical representation of the channel through which the wireless signals propagate.

Example 17a may include the radar device of any of examples 1a-16a, wherein the one or more object parameters include a first set of object parameters and the error value includes a first error value, the radar detector is further configured to determine a second set of one or more object parameters of the one or more objects using the machine learning algorithm including the one or more adjusted weighted values and the dataset; determine a second error value of the machine learning algorithm using the cost function, the second set of one or more object parameters, and the one or more ground truth object parameters; and determine whether the second error value is greater than, less than, or equal to the first error value, wherein responsive to the second error value being less than the first error value, the radar detector is further configured to determine that the accuracy of the determination of object parameters of the one or more objects is improved; and responsive to the second error value being greater than or equal to the first error value, the radar detector is further configured to adjust one or more adjusted weighted values of the plurality of adjusted weighted values based on a difference between the second error value and the first error value to reduce the error value.

Example 18a may include the radar device of any of example 1a-17a, wherein the dataset includes a complex values image.

Example 19a may include the radar device of example 18a, wherein the complex values image includes a four-dimensional complex values image representative of a range, a doppler, an azimuth, and an elevation of the one or more objects.

Example 20a may include the radar device of any of examples 1a-19a, wherein the dataset includes IQ samples.

Example 21a may include the radar device of any of examples 1a-19a, wherein the dataset includes an energy map representative of a range, a doppler, an azimuth, and an elevation of the one or more objects.

Example 22a may include the radar device of any of examples 1a-21a, wherein the radar detector includes a neural network.

Example 23a may include the radar device of examples 1a-22a, wherein the radar detector includes a parameterized deep fully convolutional neural network.

Example 24a may include a method that includes generating a scene including one or more objects based on a plurality of receive wireless signals; generating one or more ground truth object parameters of the one or more objects; and generating a dataset representative of the scene; determining one or more object parameters of the one or more objects using a machine learning algorithm and the dataset; determining an error value of the machine learning algorithm using a cost function, the one or more object parameters, and the one or more ground truth object parameters; and adjusting the machine learning algorithm values to reduce the error value.

Example 25a may include the method of example 24a further including transmitting a plurality of transmit wireless signals within an environment; and receiving the plurality of receive wireless signals including reflections of the transmit wireless signals.

Example 26a may include the method of any of examples 24a and 25a, wherein using the machine learning algorithm includes using a plurality of weighted values corresponding to different object parameters of the one or more object parameters.

Example 27a may include the method of any of examples 24a-26a, wherein the error value indicates an accuracy of the determination of object parameters of the one or more objects.

Example 28a may include the method of any of examples 24a-27a, wherein the one or more object parameters includes a location, relative speed, and a classification of each object detected in the scene.

Example 29a may include the method of any of examples 24a-28a, wherein determining one or more object parameters of the one or more objects using the machine learning algorithm and the dataset includes determining a probability distribution of the objects detected in the scene; and determining a total number of objects detected in the scene, wherein the one or more object parameters include the probability distribution of the objects detected in the scene and the total number of objects detected in the scene.

Example 30a may include the method of example 29a, wherein the probability distribution of the objects detected in the scene includes a binned map including bins that include values normalized to one and the bins that include greater values than other bins may correspond to objects detected in the scene.

Example 31a may include the method of any of examples 29a and 30a, wherein the total number of objects detected in the scene includes a scalar representative of the total number of objects detected in the scene.

Example 32a may include the method of any of examples 24a-31a, wherein the cost function includes a KL divergence function that outputs a PHD, wherein an integral of the PHD over a volume of a state space is the number of objects detected in the scene.

Example 33a may include the method of example 32a, wherein the KL divergence function is defined according to:

$$L = N \cdot KL(p_{em} \| \hat{p}_\theta) + \hat{N} - N \log(\hat{N})$$

in which N represents an actual number of objects in the scene, $\hat{N}$ represents a detected number of objects in the scene, $p_{em}$ represents an empirical distribution of objects in a state-space of the objects, and $\hat{p}_\theta$ represents a detected distribution of the objects in the scene.

Example 34a may include the method of example 33a, wherein $p_{em}$ is defined according to:

$$p_{em} = \frac{1}{N} \sum \delta_{x_i}$$

in which N represents the actual number of objects in the scene and δ is representative of a Kronecker delta function.

Example 35a may include the method of any of examples 24a-34a, further including determining field test data representative of the environment and one or more objects within the environment based on the receive wireless signals and wherein the dataset is further representative of the field test data.

Example 36a may include the method of any of examples 24a-35a, further including identifying one or more pre-defined parameters; generating the scene including the one or more objects as randomly sampled objects based on the one or more pre-defined parameters; modelling a channel of communication to receive wireless signals using the scene; determining one or more object scattering parameters using the scene; and simulating a radar pipeline using the modelled channel and the one or more object scattering parameters, the dataset including information representative of the simulation of the radar pipeline.

Example 37a may include the method of example 36a, wherein the one or more pre-defined parameters include at least one of noise source parameters, outlier parameters, interference parameters, multipath parameters, and object distribution parameters.

Example 38a may include the method of any of examples 24a-37a, wherein the one or more object parameters include a first set of object parameters and the error value includes a first error value, the method further including determining a second set of one or more object parameters of the one or more objects using the machine learning algorithm including the one or more adjusted weighted values and the dataset; determining a second error value of the machine learning algorithm using the cost function, the second set of one or more object parameters, and the one or more ground truth object parameters; and determining whether the second error value is greater than, less than, or equal to the first error value, wherein responsive to the second error value being less than the first error value, the method further includes determining that the accuracy of the determination of object parameters of the one or more objects is improved; and responsive to the second error value being greater than or equal to the first error value, the method further including adjusting one or more adjusted weighted values of the plurality of adjusted weighted values based on a difference between the second error value and the first error value to reduce the error value.

Example 39a may include a radar device that includes a radar processor configured to generate a first dataset representative of a scene including one or more objects based on a plurality of receive wireless signals; and a receiver configured to generate one or more ground truth object parameters; generate a second dataset representative of the scene based on the first dataset; determine one or more object parameters of the one or more objects using a machine learning algorithm and the second dataset, the machine learning algorithm including a plurality of weighted values corresponding to different object parameters of the one or more object parameters; determine an error value of the machine learning algorithm using a cost function, the one or more object parameters, and the one or more ground truth object parameters; adjust one or more weighted values of the plurality of weighted values based on the error value to reduce the error value, wherein the error value indicates an accuracy of the determination of object parameters of the one or more objects; and adjust a transmit waveform based on the error value to further reduce the determined error value.

Example 40a may include the radar device of example 39a, wherein the radar processor is further configured to transmit a plurality of transmit wireless signals within an environment; and receive the plurality of receive wireless signals including reflections of the transmit wireless signals.

Example 41a may include the radar device of any of examples 39a and 40a, wherein using the machine learning algorithm includes using a plurality of weighted values corresponding to different object parameters of the one or more object parameters.

Example 42a may include the radar device of any of examples 39a-41a, wherein the error value indicates an accuracy of the determination of object parameters of the one or more objects.

Example 43a may include the radar device of any of examples 39a-42a, wherein the first dataset includes a plurality of IQ samples.

Example 44a may include the radar device of any of examples 39a-43a, wherein the one or more object parameters includes a location, relative speed, and a classification of each object detected in the scene.

Example 45a may include the radar device of any of examples 39a-44a, wherein using the machine learning algorithm includes using a probability density portion configured to determine a probability distribution of the objects detected in the scene and a regression portion configured to determine a total number of objects detected in the scene; and the one or more object parameters include the probability distribution of the objects detected in the scene and the total number of objects detected in the scene.

Example 46a may include the radar device of example 45a, wherein an output of the probability density portion includes a binned map including bins that include values normalized to one and the bins that include greater values than other bins may correspond to objects detected in the scene.

Example 47a may include the radar device of any of examples 45a and 46a, wherein an output of the regression portion includes a scalar representative of the total number of objects detected in the scene.

Example 48a may include the radar device of any of examples 39a-47a, wherein the cost function includes a KL divergence function that outputs a PHD, wherein an integral of the PHD over a volume of a state space is the number of objects detected in the scene.

Example 49a may include the radar device of example 48a, wherein the KL divergence function is defined according to:

$$L=N\cdot KL(p_{em}\|\widehat{p_\theta})+\hat{N}-N\log(\hat{N})$$

in which N represents an actual number of objects in the scene, N^ represents a detected number of objects in the scene, $p_{em}$ represents an empirical distribution of objects in a state-space of the objects, and $\widehat{p_\theta}$ represents a detected distribution of the objects in the scene.

Example 50a may include the radar device of example 49a, wherein $p_{em}$ is defined according to:

$$p_{em}=\frac{1}{N}\sum\delta_{x_i}$$

in which N represents the actual number of objects in the scene and δ is representative of a Kronecker delta function.

Example 51a may include the radar device of any of examples 49a-50a, wherein the radar processor is further configured to identify one or more pre-defined parameters; generate the scene including the one or more objects based on the pre-defined parameters; receive the updated transmit waveform, model a channel of communication that the radar processor is configured to use to transmit wireless signals using the scene and the updated transmit waveform; determine one or more object scattering parameters using the scene and the updated transmit waveform; and simulate a radar pipeline using the modelled channel and the one or more object scattering parameters, the second dataset including information representative of the simulation of the radar pipeline.

Example 52a may include the radar device of any of examples 39a-51a, wherein the second dataset includes a current transmit waveform, a channel model of a current transmit channel, object scattering parameters, a channel model of a current receive channel Example 53a may include the radar device of example 52a, wherein the one or more pre-defined parameters include at least one of noise source parameters, outlier parameters, interference parameters, multipath parameters, and object distribution parameters.

Example 54a may include the radar device of any of examples 52a and 53a, wherein the radar processor includes one or more RF components and the one or more pre-defined parameters include settings of the one or more RF components.

Example 55a may include the radar device of any of examples 52a-54a, wherein the radar processor is configured to model the channel as a mathematical representation of the channel through which the wireless signals propagate.

Example 56a may include the radar device of any of examples 39a-55a, wherein the one or more object parameters include a first set of object parameters and the error value includes a first error value, the receiver is further configured to determine a second set of one or more object parameters of the one or more objects using the machine learning algorithm including the one or more adjusted weighted values, the second dataset, and the updated transmit waveform; determine a second error value of the machine learning algorithm using the cost function, the second set of one or more object parameters, and the one or more ground truth object parameters; and determine whether the second error value is greater than, less than, or equal to the first error value, wherein responsive to the second error value being less than the first error value, the receiver is further configured to determine that the accuracy of the determination of object parameters of the one or more objects is improved; and responsive to the second error value being greater than or equal to the first error value, the receiver is further configured to adjust one or more adjusted weighted values of the plurality of adjusted weighted values and to adjust the adjusted transmit waveform based on a difference between the second error value and the first error value to reduce the error value.

Example 57a may include the radar device of any of examples 39a-56a, wherein the second dataset includes a complex values image.

Example 58a may include the radar device of example 57a, wherein the complex values image includes a four-dimensional complex values image representative of a range, a doppler, an azimuth, and an elevation of the one or more objects.

Example 59a may include the radar device of any of examples 39a-58a, wherein the second dataset includes IQ samples.

Example 60a may include the radar device of any of examples 39a-58a, wherein the second dataset includes an energy map representative of a range, a doppler, an azimuth, and an elevation of the one or more objects.

Example 61a may include the radar device of any of examples 39a-59a, wherein the receiver includes a neural network.

Example 62a may include the radar device of any of examples 39a-60a, wherein the receiver includes a deep fully convolutional neural network.

Example 63a may include the radar device of any of examples 39a-62a further including a memory configured to receive and store the updated transmit waveform; and provide the updated transmit waveform to the radar processor to transmit as wireless signals.

Example 64a may include the radar device of any of examples 39a-63a, wherein the receiver is configured to parameterize the transmit waveform.

Example 65a may include the radar device of example 64a, wherein the receiver is configured to parameterize the transmit waveform as a vector of complex samples in a frequency domain or a time domain; and adjust each sample of the transmit waveform.

Example 66a may include the radar device of example 64a, wherein the receiver is configured to parameterize the transmit waveform as a plurality of samples using a wavelet function; and adjust each sample of the transmit waveform.

Example 67a may include the radar device of example 64a, wherein the receiver is configured to parameterize the transmit waveform as a plurality of samples using probability distribution; and adjust each sample of the transmit waveform.

Example 68a may include the radar device of any of examples 39a-63a, wherein the receiver further includes a transmit neural network configured to receive a current transmit waveform; receive a noise vector including a plurality of variables representative of the transmit waveform; and determine an adjustment of the noise vector to cause the transmit waveform to be adjusted based on the current transmit waveform, and wherein the receiver is configured to adjust the transmit waveform based on the determined adjustment of the noise vector.

Example 69a may include a method that includes generating a first dataset representative of a scene including one or more objects based on a plurality of receive wireless signals; and generating one or more ground truth object parameters of the one or more objects; generating a second dataset representative of the scene; determining one or more object parameters of the one or more objects using a machine learning algorithm and the second dataset; determining an error value of the machine learning algorithm using a cost function, the one or more object parameters, and the one or more ground truth object parameters; adjusting the machine learning values to reduce the error value; and adjusting a transmit waveform based on the error value to further reduce the determined error value.

Example 70a may include the method of example 69a further including transmitting a plurality of transmit wireless signals within an environment; receiving a plurality of receive wireless signals including reflections of the transmit wireless signals.

Example 71a may include the method of any of examples 69a and 70a, wherein using the machine learning algorithm includes using a plurality of weighted values corresponding to different object parameters of the one or more object parameters.

Example 72a may include the method of any of examples 69a-71a, wherein the error value indicates an accuracy of the determination of object parameters of the one or more objects.

Example 73a may include the method of any of examples 69a-72a, wherein the one or more object parameters includes a location, relative speed, and a classification of each object detected in the scene.

Example 74a may include the method of any of examples 69a-73a, wherein determining one or more object parameters of the one or more objects using the machine learning algorithm and the dataset includes determining a probability distribution of the objects detected in the scene; and determining a total number of objects detected in the scene, wherein the one or more object parameters include the probability distribution of the objects detected in the scene and the total number of objects detected in the scene.

Example 75a may include the method of example 74a, wherein the probability distribution of the objects detected in the scene includes a binned map including bins that include values normalized to one and the bins that include greater values than other bins may correspond to objects detected in the scene.

Example 76a may include the method of any of examples 74a and 75a, wherein the total number of objects detected in the scene includes a scalar representative of the total number of objects detected in the scene.

Example 77a may include the method of any of examples 69a-76a, wherein the cost function includes a KL divergence function that outputs a PHD, wherein an integral of the PHD over a volume of a state space is the number of objects detected in the scene.

Example 78a may include the method of example 77a, wherein the KL divergence function is defined according to:

$$L=N\cdot KL(p_{em}\|\widehat{p_\theta})+\hat{N}-N\log(\hat{N})$$

in which N represents an actual number of objects in the scene, N^ represents a detected number of objects in the scene, $p_{em}$ represents an empirical distribution of objects in a state-space of the objects, and $\widehat{p_\theta}$ represents a detected distribution of the objects in the scene.

Example 79a may include the method of example 78a, $p_{em}$ is defined according to:

$$p_{em} = \frac{1}{N}\sum \delta_{x_i}$$

in which N represents the actual number of objects in the scene and δ is representative of a Kronecker delta function.

Example 80a may include the method of any of examples 69a-79a, further including identifying one or more pre-defined parameters; generating the scene including the one or more objects based on the pre-defined parameters; receiving the updated transmit waveform, modelling a channel of communication to transmit wireless signals using the scene and the updated transmit waveform; determining one or more object scattering parameters using the scene and the updated transmit waveform; and simulating a radar pipeline using the modelled channel and the one or more object scattering parameters, the second dataset including information representative of the simulation of the radar pipeline.

Example 81a may include the method of any of examples 69a-80a, wherein the one or more object parameters include a first set of object parameters and the error value includes a first error value, the method further including determining a second set of one or more object parameters of the one or more objects using the machine learning algorithm including the one or more adjusted weighted values, the second dataset, and the updated transmit waveform; determining a second error value of the machine learning algorithm using the cost function, the second set of one or more object parameters, and the one or more ground truth object parameters; and determining whether the second error value is greater than, less than, or equal to the first error value, wherein responsive to the second error value being less than the first error value, the method further includes determining that the accuracy of the determination of object parameters of the one or more objects is improved; and responsive to the second error value being greater than or equal to the first error value, the method further includes adjusting one or more adjusted weighted values of the plurality of adjusted weighted values and to adjust the adjusted transmit waveform based on a difference between the second error value and the first error value to reduce the error value.

Example 82a may include the method of any of example 69a-81a further including receiving and storing the updated transmit waveform; and providing the updated transmit waveform to a radar processor to transmit as wireless signals.

Example 83a may include the method of any of examples 69a-82a, further including parameterizing the transmit waveform.

Example 84a may include the method of example 83a, wherein parameterizing the transmit waveform includes parameterizing the transmit waveform as a vector of complex samples in a frequency domain or a time domain; and adjusting the transmit waveform includes adjusting each sample of the transmit waveform.

Example 85a may include the method of example 83a, wherein parameterizing the transmit waveform includes parameterizing the transmit waveform as a plurality of samples using a wavelet function; and adjusting the transmit waveform includes adjusting each sample of the transmit waveform.

Example 86a may include the method of example 83a, wherein parameterizing the transmit waveform includes parameterizing the transmit waveform as a plurality of samples using probability distribution; and adjusting the transmit waveform includes adjusting each sample of the transmit waveform.

Example 87a may include the method of any of examples 69a-86a, further including receiving a noise vector including a plurality of variables representative of the transmit waveform; and determining an adjustment of the noise vector to cause the transmit waveform to be adjusted, and wherein adjusting the transmit waveform includes adjusting the transmit waveform based on the determined adjustment of the noise vector.

Example 1b may include a radar processing device including one or more neural network processing units including a first neural network stage configured to generate, for each radar measurement frame of a sequence of radar measurement frames, one or more feature maps of radar reception data and a segmentation of the radar reception data, wherein the feature maps contain feature map information and a second neural network stage configured to generate, for a segment, for each radar measurement frame of the sequence of radar measurement frames, information of an object from the feature information contained in the feature maps for the segment and, if the radar measurement frame follows an earlier radar measurement frame in the sequence of radar measurement frames, from the feature information contained by the feature maps for the segment to the second neural network stage of the one or more earlier radar measurement frames.

Example 2b may include the radar processing device of Example 1*b,* wherein the one ore more neural network processing units further include an input stage configured to generate from radar measurement data, for each radar measurement frame of the sequence of radar measurement frames, the radar reception data including, for each combination of a position of a plurality of positions in three-dimensional space and a radial velocity of a plurality of radial velocities a value which, as a function of its magnitude, indicates the detection of a presence of an object at the position having the radial velocity, and configured to provide, for each radar measurement frame, the radar reception data to the first neural network stage.

Example 3b may include the radar processing device of Example 1b or 2b, wherein the first neural network stage is configured to supply, for each radar measurement frame and for each segment of the plurality of segments, the feature map information contained by the feature maps for the segment to the second neural network stage.

Example 4b may include the radar processing device of any one of Examples 1b-3b, wherein each segment includes a plurality of combinations of a position of the plurality of positions in three-dimensional space and a radial velocity of the plurality of radial velocities.

Example 5b may include the radar processing device of any one of Examples 1b-4b, wherein each segment includes combinations of a position and a radial velocity, wherein the values of the combinations of the segment indicate the detection of the presence of the same object.

Example 6b may include the radar processing device of any one of Examples 1b-5b, wherein the information of the object is at least one of an object classification result for the object for which detection of presence is indicated in the segment, a refined determination which combinations of a position and a radial velocity indicate the detection of the object, an information of movement speed of the object and an information of movement orientation of the object.

Example 7b may include the radar processing device of any one of Examples 1b-6b, wherein the first neural network stage is configured to further supply, for each radar measurement frame and for each segment of the plurality of segments, the part of the radar reception data belonging to the segment to the second neural network stage.

Example 8b may include the radar processing device of any one of Examples 1b-7b, wherein the first neural network stage includes at least one of a plurality of convolutional layers, fully connected layers, recurrent neural network layers, long short-term memory neural network layers, transformer network layers, or attention-based network layers.

Example 9b may include the radar processing device of any one of Examples 1b-8b, wherein the radar reception data includes 4D voxel data or sequential 4D voxel data.

Example 10b may include the radar processing device of any one of Examples 1b-9b, wherein the radar reception data includes a value for each combination of a range bin of a plurality of range bin, an azimuth bin of a plurality of azimuth bins, an elevation bin of a plurality of elevation bins, and a radial velocity bin of a plurality of radial velocity bins, wherein the value, as a function of its magnitude, indicates the detection of a presence of an object at the position given by the range bin, the azimuth bin and the elevation bin having the radial velocity given by the radial velocity bin.

Example 11b may include the radar processing device of any one of Examples 1b-9b, wherein the radar reception data includes a value for each combination of a cartesian x coordinate bin of a plurality of a cartesian x coordinate bins, a cartesian y coordinate bin of a plurality of cartesian y coordinate bins, a cartesian z coordinate bin of a plurality of cartesian z coordinate bins, and a radial velocity bin of a plurality of radial velocity bins, wherein the value, as a function of its magnitude, indicates the detection of a presence of an object at the position given by the x coordinate bin, the y coordinate bin and the z coordinate bin having the radial velocity given by the radial velocity bin.

Example 12b may include the radar processing device of any one of Examples 1b-11b, wherein the value is a complex value whose absolute value indicates the detection of a presence of an object at the position having the radial velocity.

Example 13b may include the radar processing device of any one of Examples 1b-12b, wherein the first neural network stage is configured to output, for each segment, a bounding box for the object for which detection of presence is indicated in the segment.

Example 14b may include the radar processing device of any one of Examples 1b-13b, wherein the object classification result includes at least one of an activity classification result for the object or an object classification result for the object.

Example 15b may include the radar processing device of Example 14b, wherein the object is a pedestrian and the object classification result is the result of an activity of the pedestrian.

Example 16b may include the radar processing device of any one of Examples 1b-15b, wherein the sequence of radar measurement frames includes a multiplicity of radar measurement frames.

Example 17b may include the radar processing device of any one of Examples 1b-16b, including a vehicle controller configured to control a vehicle based on the output of the second neural network stage.

Example 18b may include the radar processing device of any one of Examples 1b-17b, wherein the second neural network stage includes at least one of a recurrent neural network, a long short-term memory neural network, a transformer network, a convolutional network or an attention-based network.

Example 19b may include the radar processing device of any one of Examples 1b-18b, wherein the second neural network stage is configured to generate, for each radar measurement frame, if the radar measurement frame follows an earlier radar measurement frame in the sequence of radar measurement frames, the information of the object from the information of the object it has generated for the one or more earlier radar measurement frames.

Example 20b may include a method for determining information of an object including generating, by a first neural network stage, for each radar measurement frame of a sequence of radar measurement frames, one or more feature maps of the radar reception data and a segmentation of the radar reception data, wherein the feature maps contain feature map information; and generating, by a second neural network stage, for each radar measurement frame of the sequence of radar measurement frames, information of an object from the feature information contained in the feature maps for the segment and, if the radar measurement frame follows an earlier radar measurement frame in the sequence of radar measurement frames, from the feature information contained by the feature maps for the segment to the second neural network stage of the one or more earlier radar measurement frames.

Example 21b may include the method of Example 20b, further including generating from radar measurement data, for each radar measurement frame of the sequence of radar measurement frames, the radar reception data including, for each combination of a position of a plurality of positions in three-dimensional space and a radial velocity of a plurality of radial velocities a value which, as a function of its magnitude, indicates the detection of a presence of an object at the position having the radial velocity, and providing, for each radar measurement frame, the radar reception data to the first neural network stage.

Example 22b may include the method of Example 20b, further including supplying, by the first neural network stage, for each radar measurement frame and for each segment of the plurality of segments, the feature map information contained by the feature maps for the segment to the second neural network stage.

Example 23b may include the method of Example 20b, wherein each segment includes a plurality of combinations of a position of the plurality of positions in three-dimensional space and a radial velocity of the plurality of radial velocities.

Example 24b may include the method of Example 20*b* or 23b, wherein each segment includes combinations of a position and a radial velocity, wherein the values of the combinations of the segment indicate the detection of the presence of the same object.

Example 25b may include the method of any one of Examples 20b-24b, wherein the information of the object is at least one of an object classification result for the object for which detection of presence is indicated in the segment, a refined determination which combinations of a position and a radial velocity indicate the detection of the object, an information of movement speed of the object and an information of movement orientation of the object.

Example 26b may include the method of any one of Examples 20b-25b, wherein the first neural network stage further supplies, for each radar measurement frame and for each segment of the plurality of segments, the part of the radar reception data belonging to the segment to the second neural network stage.

Example 27b may include the method of any one of Examples 20b-26b, wherein the first neural network stage carries out data processing by a plurality of convolutional layers.

Example 28b may include the method of any one of Examples 20b-27b, wherein the radar reception data is 4D voxel data.

Example 29b may include the method of any one of Examples 20b-28b, wherein the radar reception data includes a value for each combination of a range bin of a plurality of range bin, an azimuth bin of a plurality of azimuth bins, an elevation bin of a plurality of elevation bins, and a radial velocity bin of a plurality of radial velocity bins, wherein the value, as a function of its magnitude, indicates the detection of a presence of an object at the position given by the range bin, the azimuth bin and the elevation bin having the radial velocity given by the radial velocity bin.

Example 30*b* may include the method of any one of Examples 28b, wherein the radar reception data includes a value for each combination of a cartesian x coordinate bin of a plurality of a cartesian x coordinate bins, a cartesian y coordinate bin of a plurality of cartesian y coordinate bins, a cartesian z coordinate bin of a plurality of cartesian z coordinate bins, and a radial velocity bin of a plurality of radial velocity bins, wherein the value, as a function of its magnitude, indicates the detection of a presence of an object at the position given by the x coordinate bin, the y coordinate bin and the z coordinate bin having the radial velocity given by the radial velocity bin.

Example 31b may include the method of any one of Examples 20b-30b, wherein the value is a complex value whose absolute value indicates the detection of a presence of an object at the position having the radial velocity.

Example 32b may include the method of any one of Examples 20b-31b, wherein the first neural network stage outputs, for each segment, a bounding box for the object for which detection of presence is indicated in the segment.

Example 33b may include the method of any one of Examples 20b-32b, wherein the object classification result includes at least one of an activity classification result for the object or an object classification result for the object.

Example 34b may include the method of Example 33b, wherein the object is a pedestrian and the object classification result is the result of an activity of the pedestrian.

Example 35b may include the method of any one of Examples 20b-34b, wherein the sequence of radar measurement frames includes a multiplicity of radar measurement frames.

Example 36b may include the method of any one of Examples 20b-35b, including controlling a vehicle based on the output of the second neural network stage.

Example 37b may include the method of any one of Examples 20b-36b, wherein the second neural network stage includes at least one of a recurrent neural network, a long short-term memory neural network and a transformer network.

Example 38b may include the method of any one of Examples 20b-37b, wherein the second neural network stage generates, for each radar measurement frame, if the radar measurement frame follows an earlier radar measurement frame in the sequence of radar measurement frames, the information of the object from the information of the object it has generated for the one or more earlier radar measurement frames.

Example 1c may include a radar processing device including: one or more processors configured to determine, using a neural network, from a first range-Doppler map, a second range-Doppler map, wherein the second range-Doppler map includes a higher resolution than the first range-Doppler map and determine, from the second range-Doppler map, an angle of arrival map specifying spatial information of one or more objects.

Example 2c may include the radar processing device of Example 1c, wherein the first range-Doppler map and the second range-Doppler map each include a value whose magnitude indicates detection of the presence of an object for each combination of a range bin and a radial velocity bin.

Example 3c may include the radar processing device of Example 1c or 2c, including an input interface configured to receive digital radar reception data, wherein the one or more processors are configured to determine the first range-Doppler map from the digital radar reception data.

Example 4c may include the radar processing device of Example 3c, wherein the digital reception data includes radar reception samples for a plurality of antennas.

Example 5c may include the radar processing device of Example 4c, wherein the radar reception samples include IQ samples.

Example 6c may include the radar processing device of any one of Examples 1c-5c, wherein the neural network includes at least one of a plurality of convolutional layers, fully connected layers, recurrent neural network layers, long short-term memory neural network layers, transformer network layers, or attention-based network layers.

Example 7c may include the radar processing device of any one of Examples 1c-6c, wherein the neural network includes an encoding part followed by a decoding part.

Example 8c may include the radar processing device of any one of Examples 1c-7c, wherein the neural network has a U-Net architecture.

Example 9c may include a method for processing radar reception data including: determining, using a neural network, from a first range-Doppler map, a second range-Doppler map, wherein the second range-Doppler map includes a higher resolution than the first range-Doppler map and determining, from the second range-Doppler map, an angle of arrival map specifying spatial information of one or more objects.

Example 10c may include the method of Example 9c, wherein the first range-Doppler map and the second range-Doppler map each include a value whose magnitude indicates detection of the presence of an object for each combination of a range bin and a radial velocity bin.

Example 11c may include the method of Example 9c or 10c, including receiving digital radar reception data and determining the first range-Doppler map from the digital radar reception data.

Example 12c may include the method of Example 11c, wherein the digital reception data includes radar reception samples for a plurality of antennas.

Example 13c may include the method of Example 12c, wherein the radar reception samples include IQ samples.

Example 14c may include the method of any one of Examples 9c-13c, wherein the neural network includes at least one of a plurality of convolutional layers, fully connected layers, recurrent neural network layers, long short-term memory neural network layers, transformer network layers, or attention-based network layers.

Example 15c may include the method of any one of Examples 9c-14c, wherein the neural network includes an encoding part followed by a decoding part.

Example 16c may include the method of any one of Examples 9c-15c, wherein the neural network has a U-Net architecture.

Example 17c may include a radar processing device including: one or more processors configured to determine, using a neural network, from a first angle of arrival map, a second angle of arrival map specifying spatial information of one or more objects; wherein the second angle of arrival map includes a higher resolution than the first angle of arrival map.

Example 18c may include the radar processing device of Example 17c, wherein the first angle of arrival map and the second angle of arrival map each include a value whose magnitude indicates detection of the presence of an object for each spatial location of a plurality of spatial locations.

Example 19c may include the radar processing device of Example 18c, wherein each spatial location is a combination of at least two angular bins, a combination of an azimuth bin and an elevation bin, a combination of at least two cartesian coordinate bins or a combination of at least one angle bin and a range bin.

Example 20c may include the radar processing device of any one of Examples 18c-19c, wherein the first angle of arrival map and the second angle of arrival map each include a value whose magnitude indicates detection of the presence of an object for each combination of a spatial location of the plurality of spatial locations and a radial velocity bin of a plurality of radial velocity bins.

Example 21c may include the radar processing device of any one of Examples 17c-20c, including an input interface configured to receive digital radar reception data, wherein the one or more processors are configured to determine the first angle of arrival map from the digital radar reception data.

Example 22c may include the radar processing device of Example 21c, wherein the digital reception data includes radar reception samples for a plurality of antennas.

Example 23c may include the radar processing device of Example 22c, wherein the radar reception samples include IQ samples.

Example 24c may include the radar processing device of any one of Examples 17c-23c, wherein the neural network includes at least one of a plurality of convolutional layers, fully connected layers, recurrent neural network layers, long short-term memory neural network layers, transformer network layers, or attention-based network layers.

Example 25c may include the radar processing device of any one of Examples 17c-24c, wherein the neural network includes an encoding part followed by a decoding part.

Example 26c may include the radar processing device of any one of Examples 17c-25c, wherein the neural network has a U-Net architecture.

Example 27c may include the radar processing device of any one of Examples 17c-26c, wherein the one or more processors are configured to determine, using the neural network, at least one of a segmentation of the second angle of arrival map, bounding boxes of the one or more objects or classifications of the one or more objects.

Example 28c may include the radar processing device of any one of Examples 17c-27c, wherein the one or more processors are configured to determine, using another neural network, from a first range-Doppler map, a second range-Doppler map, wherein the second range-Doppler map has a higher resolution than the first range-Doppler map and to determine, from the second range-Doppler map, the first angle of arrival map.

Example 29c may include the radar processing device of Example 28c, including an input interface configured to receive digital radar reception data, wherein the one or more processors are configured to determine the first range-Doppler map from the digital radar reception data.

Example 30c may include the radar processing device of Example 28c or 29c, wherein the one or more processors are configured to determine, using the neural network, at least one of a segmentation of the second angle of arrival map, bounding boxes of the one or more objects or classifications of the one or more objects from the second range-Doppler map.

Example 31c may include a method for processing radar reception data including: determining, using a neural network, from a first angle of arrival map, a second angle of arrival map specifying spatial information of one or more objects; wherein the second angle of arrival map includes a higher resolution than the first angle of arrival map.

Example 32c may include the method of Example 31c, wherein the first angle of arrival map and the second angle of arrival map each include a value whose magnitude indicates detection of the presence of an object for each spatial location of a plurality of spatial locations.

Example 33c may include the method of Example 32c, wherein each spatial location is a combination of at least two angular bins, a combination of an azimuth bin and an elevation bin, a combination of at least two cartesian coordinate bins or a combination of at least one angle bin and a range bin.

Example 34c may include the method of Example 33c, wherein the first angle of arrival map and the second angle of arrival map each include a value whose magnitude indicates detection of the presence of an object for each combination of a spatial location of the plurality of spatial locations and a radial velocity bin of a plurality of radial velocity bins.

Example 35c may include the method of any one of Examples 31c-34c, including receiving digital radar reception data and determining the first angle of arrival map from the digital radar reception data.

Example 36c may include the method of Example 35c, wherein the digital reception data includes radar reception samples for a plurality of antennas.

Example 37c may include the method of Example 36c, wherein the radar reception samples include IQ samples.

Example 38c may include the method of any one of Examples 31c-37c, wherein the neural network includes at least one of a plurality of convolutional layers, fully connected layers, recurrent neural network layers, long short-term memory neural network layers, transformer network layers, or attention-based network layers.

Example 39c may include the method of any one of Examples 31c-38c, wherein the neural network includes an encoding part followed by a decoding part.

Example 40c may include the method of any one of Examples 31c-39c, wherein the neural network has a U-Net architecture.

Example 41c may include the method of any one of Examples 31c-40c, including determining, using the neural network, at least one of a segmentation of the second angle of arrival map, bounding boxes of the one or more objects or classifications of the one or more objects.

Example 42c may include the method of any one of Examples 31c-41c, including determining, using another neural network, from a first range-Doppler map, a second range-Doppler map, wherein the second range-Doppler map has a higher resolution than the first range-Doppler map and determining, from the second range-Doppler map, the first angle of arrival map.

Example 43c may include the method of Example 42c, including receiving digital radar reception data and determining the first range-Doppler map from the digital radar reception data.

Example 44c may include the method of Example 42c or 43c, including determining, using the neural network, at least one of a segmentation of the second angle of arrival map, bounding boxes of the one or more objects or classifications of the one or more objects from the second range-Doppler map.

Example 45c may include a neural network training device including one or more processors configured to train a neural network to determine, from a first range-Doppler map, a second range-Doppler map, wherein the second range-Doppler map includes a higher resolution than the first range-Doppler map.

Example 46c may include the neural network training device of Example 45c, wherein the one or more processors are configured to train the neural network by supervised learning.

Example 47c may include a method for training a neural network including: training a neural network to determine, from a first range-Doppler map, a second range-Doppler map, wherein the second range-Doppler map includes a higher resolution than the first range-Doppler map.

Example 48c may include the method of Example 47c, including training the neural network by supervised learning.

Example 49c may include a neural network training device including one or more processors configured to train a neural network to determine, from a first angle of arrival map, a second angle of arrival map, wherein the second angle of arrival map includes a higher resolution than the first angle of arrival map.

Example 50c may include the neural network training device of Example 49c, wherein the one or more processors are configured to train the neural network by supervised learning, self-supervised learning or by unsupervised learning.

Example 51c may include the neural network training device of Example 49c or 50c, wherein the one or more processors are configured to, for each set of digital reception training data of a plurality of sets of digital reception training data, determine a first angle of arrival map; determine a second angle of arrival map from the first angle of arrival map using the neural network, wherein the second angle of arrival map includes a higher resolution than the first angle of arrival map; reconstruct digital reception data from the second angle of arrival map; determine a loss between the digital reception training data and the reconstructed digital reception data and adjust the neural network based on the loss.

Example 52c may include the neural network training device of Example 51c, wherein the one or more processors are configured to adjust the neural network to reduce the loss.

Example 53c may include the neural network training device of Example 51c or 52c, wherein the one or more processors are configured to adjust the neural network to have a lower loss between the digital reception training data and the reconstructed digital reception data when re-determining the second angle of arrival map for the set of digital reception training data.

Example 54c may include a method for training a neural network including training a neural network to determine, from a first angle of arrival map, a second angle of arrival map, wherein the second angle of arrival map includes a higher resolution than the first angle of arrival map.

Example 55c may include the method of Example 54c, including training the neural network by supervised learning, self-supervised learning or by unsupervised learning.

Example 56c may include the method of Example 54c or 55c, including, for each set of digital reception training data of a plurality of sets of digital reception training data, determining a first angle of arrival map; determining a second angle of arrival map from the first angle of arrival map using the neural network, wherein the second angle of arrival map includes a higher resolution than the first angle of arrival map; reconstructing digital reception data from the second angle of arrival map; determining a loss between the digital reception training data and the reconstructed digital reception data and adjusting the neural network based on the loss.

Example 57c may include the method of Example 56c, including adjusting the neural network to reduce the loss.

Example 58c may include the method of Example 56c or 57c, wherein the one or more processors are configured to adjust the neural network to have a lower loss between the digital reception training data and the reconstructed digital reception data when re-determining the second angle of arrival map for the set of digital reception training data.

Example 1d may include a radar system including: a temperature sensor configured to measure a temperature of the radar system and one or more processors configured to select a portion of radar reception data values for further processing based on a thermal noise threshold based on a measured temperature.

Example 2d may include the radar system of Example 1d, wherein the one or more processors are configured to determine the thermal noise threshold from a thermal noise variance.

Example 3d may include the radar system of Example 2d, wherein the one or more processors are configured to determine the thermal noise variance from the measured temperature.

Example 4d may include the radar system of Example 3d, wherein the one or more processors are configured to determine the thermal noise variance from the measured temperature and from at least one of resistance and capacitance information of circuitry of the radar system.

Example 5d may include the radar system of Example 4d, including a radar sensor configured to provide the radar measurement data wherein the one or more processors are configured to receive the radar measurement data and wherein the circuitry includes at least one of antenna circuitry, mixing circuitry analog-to-digital conversion circuitry of the radar sensor.

Example 6d may include the radar system of Example 4d or 5d, wherein the circuitry includes circuitry of the one or more processors.

Example 7d may include the radar system any one of Examples 1d-6d, wherein the one or more processors are configured to determine radar reception data from radar measurement data, wherein the radar reception data includes the radar reception data values.

Example 8d may include the radar system any one of Examples 1d-7d, wherein the one or more processors are configured select the radar reception data values which are above the thermal noise threshold Example 9d may include the radar system any one of Examples 1d-8d, wherein the further processing includes performing radar detection.

Example 10d may include the radar system any one of Examples 1d-9d, wherein the radar reception data values are IQ values.

Example 11d may include the radar system any one of Examples 1d-10d, wherein the one or more processors are configured to generate a list of radar reception data values and remove entries from the list which are below the thermal noise threshold.

Example 12d may include the radar system any one of Examples 1d-11d, wherein the one or more processors are configured to generate radar reception data values from radar measurement data for each frame of a sequence of frames and wherein the one or more processors are configured to store the radar reception data for a frame by storing a difference between the radar reception data for the frame and a frame preceding the frame in the sequence of frames.

Example 13d may include the radar system of Example 12d, wherein the one or more processors are configured to, for each frame of the sequence of frames, generate a list of radar reception data values and remove entries from the list which are below the thermal noise threshold and wherein the difference between the radar reception data for the frame and the frame preceding the frame in the sequence of frames is a difference between entries of corresponding entries of the lists with the entries from the lists which are below the thermal noise threshold having been removed.

Example 14d may include a method for processing radar reception data including: measuring a temperature of a radar system and selecting a portion of radar reception data values for further processing based on a thermal noise threshold based on the measured temperature.

Example 15d may include the method of Example 14d, wherein the one or more processors are configured to determine the thermal noise threshold from a thermal noise variance.

Example 16d may include the method of Example 15d, including determining the thermal noise variance from the measured temperature.

Example 17d may include the method of Example 16d, including determining the thermal noise variance from the measured temperature and from at least one of resistance and capacitance information of circuitry of the radar system.

Example 18d may include the method of Example 17d, including a radar sensor providing the radar measurement data and the circuitry including at least one of antenna circuitry, mixing circuitry analog-to-digital conversion circuitry of the radar sensor.

Example 19d may include the method of Example 17d or 18d, wherein the circuitry at least partially performs the method.

Example 20d may include the method of any one of Examples 14d-19d, including determining radar reception data from radar measurement data, wherein the radar reception data includes the radar reception data values.

Example 21d may include the method of any one of Examples 14d-20d, including selecting the radar reception data values which are above the thermal noise threshold Example 22d may include the method of any one of Examples 14d-21d, wherein the further processing includes performing radar detection.

Example 23d may include the method of any one of Examples 14d-22d, wherein the radar reception data values are IQ values.

Example 24d may include the method of any one of Examples 14d-23d, including generating a list of radar reception data values and removing entries from the list which are below the thermal noise threshold.

Example 25d may include the method of any one of Examples 14d-24d, including generating radar reception data values from radar measurement data for each frame of a sequence of frames and storing the radar reception data for a frame by storing a difference between the radar reception data for the frame and a frame preceding the frame in the sequence of frames.

Example 26d may include the method of Example 25d, including, for each frame of the sequence of frames, generating a list of radar reception data values and removing entries from the list which are below the thermal noise threshold and wherein the difference between the radar reception data for the frame and the frame preceding the frame in the sequence of frames is a difference between entries of corresponding entries of the lists with the entries from the lists which are below the thermal noise threshold having been removed.

Example 27d may include a radar system including a temperature sensor configured to measure a temperature of the radar system; one or more processors configured to receive an indication of the measured temperature; determine radar reception data including radar reception data values from radar measurement data; determine a thermal noise threshold from the measured temperature; determine a measure according to a predefined evaluation metric of each radar reception data value and discard radar reception data values from the radar reception data whose measures are below the determined thermal noise threshold.

Example 28d may include the radar system of Example 27d, wherein the one or more processors are configured to perform object detection based on the radar reception data values remaining after discarding the radar reception data values whose measures are below the determined thermal noise threshold.

Example 29d may include the radar system of Example 27d or 28d, wherein the one or more processors are configured to determine the thermal noise threshold from a thermal noise variance.

Example 30d may include the radar system any one of Examples 29d, wherein the one or more processors are configured to determine the thermal noise variance from the measured temperature.

Example 31d may include the radar system any one of Examples 27d-30d, wherein the one or more processors are configured to determine the thermal noise variance from the measured temperature and from at least one of resistance and capacitance information of circuitry of the radar system.

Example 32d may include the radar system of Example 31d, including a radar sensor configured to provide the radar measurement data wherein the one or more processors are configured to receive the radar measurement data and wherein the circuitry includes at least one of antenna circuitry, mixing circuitry analog-to-digital conversion circuitry of the radar sensor.

Example 33d may include the radar system of Example 31d or 32d, wherein the circuitry includes circuitry of the one or more processors.

Example 34d may include the radar system any one of Examples 27d-33d, wherein the one or more processors are configured keep radar reception data values which are above the determined thermal noise threshold and are configured to perform radar detection based on the radar reception data values which are above the determined thermal noise threshold.

Example 35d may include the radar system any one of Examples 27d-34d, wherein the radar reception data values are IQ values.

Example 36d may include the radar system any one of Examples 27d-35d, wherein the one or more processors are configured to generate a list of radar reception data values and remove entries from the list which are below the determined thermal noise threshold.

Example 37d may include the radar system any one of Examples 27d-36d, wherein the one or more processors are configured to generate radar reception data values from radar measurement data for each frame of a sequence of frames and wherein the one or more processors are configured to store the radar reception data for a frame by storing a difference between the radar reception data for the frame and a frame preceding the frame in the sequence of frames.

Example 38d may include the radar system of Example 37d, wherein the one or more processors are configured to, for each frame of the sequence of frames, generate a list of radar reception data values and remove entries from the list which are below the determined thermal noise threshold and wherein the difference between the radar reception data for the frame and the frame preceding the frame in the sequence of frames is a difference between entries of corresponding entries of the lists with the entries from the lists which are below the determined thermal noise threshold having been removed.

Example 39d may include a method for processing radar reception data including: determining radar reception data including radar reception data values from radar measurement data; measuring a temperature of a radar system; determining a thermal noise threshold from the measured temperature; determining a measure according to a predefined evaluation metric of each radar reception data value and discarding radar reception data values from the radar reception data whose measures are below the determined thermal noise threshold.

Example 40d may include the method of Example 39d, including performing object detection based on the radar reception data values remaining after discarding the radar reception data values whose measures are below the determined thermal noise threshold.

Example 41d may include the method of Example 39d or 40d, including determining the thermal noise threshold from a thermal noise variance.

Example 42d may include the method of any one of Examples 39d-41d, including determining the thermal noise variance from the measured temperature.

Example 43d may include the method of any one of Examples 39d-42d, including determining the thermal noise variance from the measured temperature and from at least one of resistance and capacitance information of circuitry of the radar system.

Example 44d may include the method of Example 43d, including a radar sensor providing the radar measurement data and wherein the circuitry includes at least one of antenna circuitry, mixing circuitry analog-to-digital conversion circuitry of the radar sensor.

Example 45d may include the method of Example 43d or 44d, wherein the circuitry at least partially performs the method.

Example 46d may include the method of any one of Examples 39d-45d, including keeping radar reception data values which are above the determined thermal noise threshold and performing radar detection based on the radar reception data values which are above the determined thermal noise threshold.

Example 47d may include the method of any one of Examples 39d-46d, wherein the radar reception data values are IQ values.

Example 48d may include the method of any one of Examples 39d-47d, including generating a list of radar reception data values and removing entries from the list which are below the determined thermal noise threshold.

Example 49d may include the method of any one of Examples 39d-48d, including generating radar reception data values from radar measurement data for each frame of a sequence of frames and storing the radar reception data for a frame by storing a difference between the radar reception data for the frame and a frame preceding the frame in the sequence of frames.

Example 50d may include the method of Example 49d, including, for each frame of the sequence of frames, generating a list of radar reception data values and removing entries from the list which are below the determined thermal noise threshold and wherein the difference between the radar reception data for the frame and the frame preceding the frame in the sequence of frames is a difference between entries of corresponding entries of the lists with the entries from the lists which are below the determined thermal noise threshold having been removed.

Example 1e may include a radar processing device including: a memory; and one or more processors configured to determine radar reception data values for locations in a multi-dimensional space from radar measurement data; represent the radar reception data values in a tree data structure by generating nodes for sub-spaces of the multi-dimensional space and attaching, to each node, generated for a respective sub-space, radar reception data values determined for locations of the sub-space in a data structure attached to the node.

Example 2e may include the radar processing device of Example le, wherein the data structure is a sub-tree whose root node is the node or wherein the node is a leaf node of the tree structure and the data structure is a list of one or more locations attached to the leaf node.

Example 3e may include the radar processing device of Example 1e or 2e, wherein the one or more processors are configured to generate, for a node of the tree structure which has one or more child nodes, an information element which indicates the sub-spaces for which the one or more processors generate the child nodes of the node.

Example 4e may include the radar processing device of any one of Examples 1e-3e, wherein the one or more processors are configured to generate child nodes for sub-spaces which include at least one location including a radar reception data value which fulfils a predetermined evaluation criterion.

Example 5e may include the radar processing device of any one of Examples 1e-4e, wherein the multi-dimensional space is 4D space.

Example 6e may include the radar processing device of any one of Examples 1e-5e, wherein the multi-dimensional space includes two or more spatial dimensions and one radial velocity dimension.

Example 7e may include the radar processing device of any one of Examples 1e-6e, wherein the spatial dimensions are spherical or cartesian coordinate dimensions.

Example 8e may include the radar processing device of any one of Examples 1e-7e, wherein each radar reception value is a complex value.

Example 9e may include the radar processing device of any one of Examples 1e-8e, wherein each radar reception value is a pair of an I value and a Q value.

Example 10e may include the radar processing device of any one of Examples 1e-9e, wherein the one or more processors are configured to determine the radar reception data values by selecting the radar reception values from a candidate radar reception value set, wherein the one or more processors are configured to select radar reception values which have a measure, according to a predefined evaluation metric, which lies above a predefined threshold.

Example 11e may include a method for representing radar reception data including: determining radar reception data values for locations in a multi-dimensional space from radar measurement data and representing the radar reception data values in a tree data structure by generating nodes for sub-spaces of the multi-dimensional space and attaching, to each node, generated for a respective sub-space, radar reception data values determined for locations of the sub-space in a data structure attached to the node.

Example 12e may include the method of Example 11e, wherein the data structure is a sub-tree whose root node is the node or wherein the node is a leaf node of the tree structure and the data structure is a list of one or more locations attached to the leaf node.

Example 13e may include the method of Example 11e or 12e, including generating, for a node of the tree structure which has one or more child nodes, an information element which indicates the sub-spaces for which the one or more processors generate the child nodes of the node.

Example 14e may include the method of any one of Examples 11e-13e, including generating child nodes for sub-spaces which include at least one location including a radar reception data value which fulfils a predetermined evaluation criterion.

Example 15e may include the method of any one of Examples 11e-14e, wherein the multi-dimensional space is 4D space.

Example 16e may include the method of any one of Examples 11e-15e, wherein the multi-dimensional space includes two or more spatial dimensions and one radial velocity dimension.

Example 17e may include the method of any one of Examples 11e-16e, wherein the spatial dimensions are spherical or cartesian coordinate dimensions.

Example 18e may include the method of any one of Examples 11e-17e, wherein each radar reception value is a complex value.

Example 19e may include the method of any one of Examples 11e-18e, wherein each radar reception value is a pair of an I value and a Q value.

Example 20e may include the method of any one of Examples 11e-19e, including determining the radar reception data values by selecting the radar reception values from a candidate radar reception value set, including selecting radar reception values which have a measure, according to a predefined evaluation metric, which lies above a predefined threshold.

Example 21e may include a radar processing device including: one or more processors configured to: determine radar reception data values from radar measurement data and an association of each reception data value with a location in a multi-dimensional space; determine a splitting of the multi-dimensional space into a plurality of sub-spaces, wherein each sub-space includes a plurality of locations in the multi-dimensional space and for each sub-space of the plurality of sub-spaces check whether the sub-space includes at least one location with which a radar reception data value of the radar reception data values is associated and, responsive to the sub-space including at least one location with which a radar reception data value of the radar reception data values is associated, generate a data structure for storing the reception data values associated with the plurality of locations which the sub-space includes.

Example 22e may include the radar processing device of Example 21e, wherein the one or more processors are configured to, if the sub-space does not include at least one location with which a radar reception data value of the radar reception data values is associated, omit generating a data structure for storing the reception data values associated with locations of the sub-space.

Example 23e may include the radar processing device of Example 21e or 22e, wherein generating the data structure for the sub-space includes determining a splitting of the sub-space into a plurality of further sub-spaces, wherein each further sub-space includes a plurality of locations in the sub-space and for each further sub-space of the further plurality of further sub-spaces checking whether the further sub-space includes at least one location with which a radar reception data value of the radar reception data values is associated and, if the further sub-space includes at least one location with which a radar reception data value of the radar reception data values is associated, generating a sub-data structure for storing the reception data values associated with the plurality of locations which the further sub-space includes.

Example 24e may include the radar processing device of any one of Examples 21e-23e, wherein the one or more processors are configured to, if the further sub-space does not include at least one location with which a radar reception data value of the radar reception data values is associated, omit generating a data structure for storing the reception data values associated with locations of the further sub-space.

Example 25e may include the radar processing device of any one of Examples 21e-24e, wherein generating the data structure for the sub-space includes iteratively splitting the sub-space into a plurality of sub-spaces of the sub-space, wherein each sub-space of the sub-space includes one or more locations in the sub-space, by starting with an initial splitting of the sub-space into sub-spaces of the sub-space and continuing to split sub-spaces of the sub-space into smaller sub-spaces of the sub-space by splitting each sub-space of the sub-space which includes at least one location with which a radar reception data value of the radar reception data values is associated into smaller sub-space of the sub-space, wherein, when a sub-pace of the sub-space is split into smaller sub-spaces of the sub-space, the smaller sub-space of the sub-space replace the sub-space of the of the sub-space in the plurality of sub-spaces of the sub-space.

Example 26e may include the radar processing device of Example 25e, wherein the one or more processors are configured to stop splitting the sub-spaces of the sub-space when the sub-spaces of the sub-space have reached a predetermined minimum size.

Example 27e may include the radar processing device of any one of Examples 21e-26e, wherein the one or more processors are configured to generate a tree-based radar reception data representation by generating a root tree node for the multi-dimensional space and by generating an intermediate tree node for each sub-space which is split into sub-spaces in the iterative splitting of the multi-dimensional space.

Example 28e may include the radar processing device of Example 27e, wherein the one or more processors are configured to generate the tree-based radar reception data representation by generating a leaf tree node for each sub-space of the multi-dimensional space occurring in the iterative splitting of the multi-dimensional space but not being split into sub-spaces.

Example 29e may include the radar processing device of Example 28e, Wherein the one or more processors are configured to generate radar reception data values from radar measurement data for each frame of a sequence of frames and wherein the one or more processors are configured to store the radar reception data for a frame by storing a difference between the radar reception data for the frame to a frame preceding the frame in the sequence of frames.

Example 30e may include the radar processing device of any one of Examples 21e-29e, wherein the one or more processors are configured to, for each frame of the sequence of frames, generate a tree-based radar reception data representation by, for each sub-space which includes at least one location with which a radar reception data value of the radar reception data values is associated, attaching the data structure generated for the sub-space to the node and wherein the difference between the radar reception data for the frame and the frame preceding the frame in the sequence of frames is a difference between entries of corresponding entries of the tree-based radar reception data representations.

Example 31e may include the radar processing device of any one of Examples 21e-30e, wherein the multi-dimensional space includes a multiplicity of locations, wherein each location corresponds to a geographical location and a radial velocity and wherein the radar reception value associated with a location indicates, in dependence of its magnitude, the detection of the presence of an object having the geographical location and the radial velocity.

Example 32e may include the radar processing device of any one of Examples 21e-31e, wherein the multi-dimensional space is 4D space.

Example 33e may include the radar processing device of any one of Examples 21e-32e, wherein the multi-dimensional space includes two or more spatial dimensions and one radial velocity dimension.

Example 34e may include the radar processing device of any one of Examples 21e-33e, wherein the spatial dimensions are spherical or cartesian coordinate dimensions.

Example 35e may include the radar processing device of any one of Examples 21e-34e, wherein each radar reception value is a complex value.

Example 36e may include the radar processing device of any one of Examples 21e-35e, wherein each radar reception value is a pair of an I value and a Q value.

Example 37e may include the radar processing device of any one of Examples 21e-36e, wherein the one or more processors are configured to determine the radar reception data values for locations in the multi-dimensional space from radar measurement data.

Example 38e may include the radar processing device of any one of Examples 21e-37e, wherein the one or more processors are configured to determine the radar reception data values by selecting the radar reception values from a candidate radar reception value set, wherein the one or more processors are configured to select radar reception values which have a measure, according to a predefined evaluation metric, which lies above a predefined threshold.

Example 39e may include a method for storing radar reception data including: determining radar reception data values from radar measurement data and an association of each reception data value with a location in a multi-dimensional space; determining a splitting of the multi-dimensional space into a plurality of sub-spaces, wherein each sub-space includes a plurality of locations in the multi-dimensional space; and checking, for each sub-space of the plurality of sub-spaces, whether the sub-space includes at least one location with which a radar reception data value of the radar reception data values is associated and, responsive to the sub-space including at least one location with which a radar reception data value of the radar reception data values is associated, generate a data structure for storing the reception data values associated with the plurality of locations which the sub-space includes.

Example 40e may include the method of Example 39e, including, if the sub-space does not include at least one location with which a radar reception data value of the radar reception data values is associated, omitting generating a data structure for storing the reception data values associated with locations of the sub-space.

Example 41e may include the method of Example 39e or 40e, wherein generating the data structure for the sub-space includes determining a splitting of the sub-space into a plurality of further sub-spaces, wherein each further sub-space includes a plurality of locations in the sub-space and for each further sub-space of the further plurality of further sub-spaces check whether the further sub-space includes at least one location with which a radar reception data value of the radar reception data values is associated and, if the further sub-space includes at least one location with which a radar reception data value of the radar reception data values is associated, generate a sub-data structure for storing the reception data values associated with the plurality of locations which the further sub-space includes.

Example 42e may include the method of any one of Examples 39e-41e, including, if the further sub-space does not include at least one location with which a radar reception data value of the radar reception data values is associated, omitting generating a data structure for storing the reception data values associated with locations of the further sub-space.

Example 43e may include the method of any one of Examples 39e-42e, wherein generating the data structure for the sub-space includes iteratively splitting the sub-space into a plurality of sub-spaces of the sub-space, wherein each sub-space of the sub-space includes one or more locations in the sub-space, by starting with an initial splitting of the sub-space into sub-spaces of the sub-space and continuing to split sub-spaces of the sub-space into smaller sub-spaces of the sub-space by splitting each sub-space of the sub-space which includes at least one location with which a radar reception data value of the radar reception data values is associated into smaller sub-space of the sub-space, wherein, when a sub-pace of the sub-space is split into smaller sub-spaces of the sub-space, the smaller sub-space of the sub-space replace the sub-space of the of the sub-space in the plurality of sub-spaces of the sub-space.

Example 44e may include the method of Example 43e, including stopping splitting the sub-spaces of the sub-space when the sub-spaces of the sub-space have reached a predetermined minimum size.

Example 45e may include the method of any one of Examples 39e-44e, including generating a tree-based radar reception data representation by generating a root tree node for the multi-dimensional space and by generating an intermediate tree node for each sub-space which is split into sub-spaces in the iterative splitting of the multi-dimensional space.

Example 46e may include the method of Example 45e, including generating the tree-based radar reception data representation by generating a leaf tree node for each sub-space of the multi-dimensional space occurring in the iterative splitting of the multi-dimensional space but not being split into sub-spaces.

Example 47e may include the method of Example 46e, including generating radar reception data values from radar measurement data for each frame of a sequence of frames and storing the radar reception data for a frame by storing a difference between the radar reception data for the frame to a frame preceding the frame in the sequence of frames.

Example 48e may include the method of any one of Examples 39e-47e, including, for each frame of the sequence of frames, generating a tree-based radar reception data representation by, for each sub-space which includes at least one location with which a radar reception data value of the radar reception data values is associated, attaching the data structure generated for the sub-space to the node and wherein the difference between the radar reception data for the frame and the frame preceding the frame in the sequence of frames is a difference between entries of corresponding entries of the tree-based radar reception data representations.

Example 49e may include the method of any one of Examples 39e-48e, wherein the multi-dimensional space includes a multiplicity of locations, wherein each location corresponds to a geographical location and a radial velocity and wherein the radar reception value associated with a location indicates, in dependence of its magnitude, the detection of the presence of an object having the geographical location and the radial velocity.

Example 50e may include the method of any one of Examples 39e-49e, wherein the multi-dimensional space is 4D space.

Example 51e may include the method of any one of Examples 39e-50e, wherein the multi-dimensional space includes two or more spatial dimensions and one radial velocity dimension.

Example 52e may include the method of any one of Examples 39e-51e, wherein the spatial dimensions are spherical or cartesian coordinate dimensions.

Example 53e may include the method of any one of Examples 39e-52e, wherein each radar reception value is a complex value.

Example 54e may include the method of any one of Examples 39e-53e, wherein each radar reception value is a pair of an I value and a Q value.

Example 55e may include the method of any one of Examples 39e-54e, including determining the radar reception data values for locations in the multi-dimensional space from radar measurement data.

Example 56e may include the method of any one of Examples 39e-55e, including determining the radar reception data values by selecting the radar reception values from a candidate radar reception value set, including selecting radar reception values which have a measure, according to a predefined evaluation metric, which lies above a predefined threshold.

Example if may include a radar processing device including one or more processors configured to determine radar reception data including radar reception data values from radar measurement data; determine which radar reception data values of the radar reception data values satisfy a predefined evaluation criterion; arrange the radar reception data values of the radar reception data values which satisfy the predefined evaluation criterion into a data structure for sparse data and process the data structure for sparse data by means of a neural network.

Example 2f may include the radar processing device of Example 1f, wherein the predefined evaluation criterion is a predefined power criterion.

Example 3f may include the radar processing device of Example 1f or 2f, wherein a radar reception value fulfils the predefined evaluation criterion if the radar reception value has a measure, according to a predefined evaluation metric, which lies above a predefined threshold.

Example 4f may include the radar processing device of Example 3f, wherein the threshold is a thermal noise threshold.

Example 5f may include the radar processing device of any one of Examples 1f-4f, wherein the one or more processors are configured to store the data structure for sparse data in a memory.

Example 6f may include the radar processing device of any one of Examples 1f-5f, wherein the data structure is tree-based or list based.

Example 7f may include the radar processing device of any one of Examples 1f-6f, wherein the one or more processors include an acceleration circuit for creation of the data structure.

Example 8f may include the radar processing device of Example 7f, wherein the acceleration circuit is configured to implement a lookup to determine the location of a radar reception data value in the data structure.

Example 9f may include the radar processing device of Example 8f, wherein the one or more processors are configured to determine the radar reception data values and an association of each reception data value with a location in a multi-dimensional space and wherein the acceleration circuit is configured to implement the lookup to determine the location of a radar reception data value in the data structure from coordinates of the radar reception data value in the multi-dimensional space.

Example 10f may include the radar processing device of any one of Examples 1f-9f, wherein the one or more processors are configured to implement the neural network.

Example 11f may include the radar processing device of any one of Examples 1f-10f, wherein the neural network includes at least one of a plurality of convolutional layers, fully connected layers, recurrent neural network layers, long short-term memory neural network layers, transformer network layers, or attention based network layers.

Example 12f may include the radar processing device of any one of Examples 1f-11f, wherein the one or more processors include a pre-processor configured to determine the radar reception data from the radar measurement data, determine which radar reception data values of the radar reception data values satisfy the predefined evaluation criterion and arrange the radar reception data values of the radar reception data values which satisfy the predefined evaluation criterion into the data structure for sparse data and include a neural network processor configured to process the data structure for sparse data by means of a neural network.

Example 13f may include the radar processing device of any one of Examples 1f-12f, wherein the one or more processors are configured to generate a processing result by processing the data structure for sparse data by means of the neural network, wherein the processing results includes at least one of one or more feature maps, one or more bounding boxes or a segmentation of the radar reception data values.

Example 14f may include the radar processing device of any one of Examples 1f-13f, wherein the one or more processors are configured to generate radar reception data values from radar measurement data for each frame of a sequence of frames and wherein the one or more processors are configured to arrange, for each frame, the radar reception data values of the radar reception data values which satisfy the predefined evaluation criterion into a respective data structure for sparse data; and process the data structure for sparse data by means of a neural network to generate a processing result of the frame and are further configured to perform object tracking based on the processing results of multiple frames.

Example 15f may include the radar processing device of Example 14f, wherein the processor is configured to process the data structures for sparse data for the sequence of frames by a sequence of neural network processing for 5D perception.

Example 16f may include the radar processing device of any one of Examples 1f to 15f, including a memory and the one or more processors including at least one of a metadata processor configured to process radar metadata stored in the memory, a compression engine configured to compress data to be stored in the memory or a decompression engine configured to decompress compressed data stored in the memory.

Example 17f may include the radar processing device of any one of Examples 1f-16f, wherein the one or more processors are configured to determine the radar reception data values by means of an association of each reception data value with a location in a multi-dimensional space specified in polar coordinates and are configured to convert the polar coordinates into cartesian coordinates for generation of the data structure.

Example 18f may include a method for processing radar reception data including: determining radar reception data including radar reception data values from radar measurement data; determining which radar reception data values of the radar reception data values satisfy a predefined evaluation criterion; arranging the radar reception data values of the radar reception data values which satisfy the predefined evaluation criterion into a data structure for sparse data and processing the data structure for sparse data by means of a neural network.

Example 19f may include the method of Example 18f, wherein the predefined evaluation criterion is a predefined power criterion.

Example 20f may include the method of Example 18f or 19f, wherein a radar reception value fulfils the predefined evaluation criterion if the radar reception value has a measure, according to a predefined evaluation metric, which lies above a predefined threshold.

Example 21f may include the method of Example 20f, wherein the threshold is a thermal noise threshold.

Example 22f may include the method of any one of Examples 18f-21f, including storing the data structure for sparse data in a memory.

Example 23f may include the method of any one of Examples 18f-22f, wherein the data structure is tree-based or list based.

Example 24f may include the method of any one of Examples 18f-23f, including creating the data structure by means of an acceleration circuit.

Example 25f may include the method of Example 24f, wherein the acceleration circuit implements a lookup to determine the location of a radar reception data value in the data structure.

Example 26f may include the method of Example 25f, including determining the radar reception data values and an association of each reception data value with a location in a multi-dimensional space and wherein the acceleration circuit implements the lookup to determine the location of a radar reception data value in the data structure from coordinates of the radar reception data value in the multi-dimensional space.

Example 27f may include the method of any one of Examples 18f-26f, performed by means of a neural network.

Example 28f may include the method of any one of Examples 18f-27f, wherein the neural network includes at least one of a plurality of convolutional layers, fully connected layers, recurrent neural network layers, long short-term memory neural network layers, transformer network layers, or attention-based network layers.

Example 29f may include the method of any one of Examples 18f-28f, wherein a pre-processor determines the radar reception data from the radar measurement data, determines which radar reception data values of the radar reception data values satisfy the predefined evaluation criterion and arranges the radar reception data values of the radar reception data values which satisfy the predefined evaluation criterion into the data structure for sparse data and a neural network processor processes the data structure for sparse data by means of a neural network.

Example 30f may include the method of any one of Examples 18f-29f, including generating a processing result by processing the data structure for sparse data by means of the neural network, wherein the processing results includes at least one of one or more feature maps, one or more bounding boxes or a segmentation of the radar reception data values.

Example 31f may include the method of any one of Examples 18f-30f, including generating radar reception data values from radar measurement data for each frame of a sequence of frames and including arranging, for each frame, the radar reception data values of the radar reception data values which satisfy the predefined evaluation criterion into a respective data structure for sparse data and processing the data structure for sparse data by means of a neural network to generate a processing result of the frame and performing object tracking based on the processing results of multiple frames.

Example 32f may include the method of Example 31f, including processing the data structures for sparse data for the sequence of frames by a sequence of neural network processing for 5D perception.

Example 33f may include the method of any one of Examples 18f-32f, including at least one of processing radar metadata, compressing data to be stored in a memory or decompressing compressed data stored in a memory.

Example 34f may include the method of any one of Examples 18f-33f, including determining the radar reception data values by means of an association of each reception data value with a location in a multi-dimensional space specified in polar coordinates and converting the polar coordinates into cartesian coordinates for generation of the data structure.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radar system comprising:

a temperature sensor configured to measure a temperature of the radar system; and a processor configured to select a portion of radar reception data values for further processing based on a comparison of the radar reception data values with a thermal noise threshold corresponding to a measured temperature;

wherein the processor is configured to determine the thermal noise threshold from a thermal noise variance, and wherein the processor is configured to determine the thermal noise variance from the measured temperature.

2. The radar system of claim 1, wherein the processor is configured to determine radar reception data form radar measurement data, wherein the radar reception data comprises the radar reception data values.

3. The radar system of claim 1, wherein the processor is configured to select the radar reception data values which are above the thermal noise threshold.

4. The radar system of claim 1, wherein the further processing comprises performing radar detection.

5. The radar system of claim 1, wherein the radar reception data values are IQ values.

6. The radar system of claim 1, wherein the processor is configured to generate a list of radar reception data values and remove entries from the list which are below the thermal noise threshold.

7. The radar system of claim 1, wherein the processor is configured to generate radar reception data values from radar measurement data for each frame of a sequence of frames, and wherein the processor is configured to store the radar reception data for a frame by storing a difference between the radar reception data for the frame and a frame preceding the frame in the sequence of frames.

8. The radar system of claim 7, wherein the processor is configured to, for each frame of the sequence of frames, generate a list of radar reception data values and remove entries from the list which are below the thermal noise threshold and wherein the difference between the radar reception data for the frame and the frame preceding the frame in the sequence of frames is a difference between entries of corresponding entries of the lists with the entries from the lists which are below the thermal noise threshold having been removed.

9. A radar system comprising: a temperature sensor configured to measure a temperature of the radar system; and a processor configured to select a portion of radar reception data values for further processing based on a comparison of the radar reception data values with a thermal noise threshold corresponding to a measured temperature; wherein the processor is configured to determine the thermal noise threshold from a thermal noise variance, and wherein the processor is configured to determine the thermal noise variance from the measured temperature; and wherein the processor is configured to determine the thermal noise variance from the measured temperature and from the least one of resistance and capacitance information of circuitry of the radar system.

10. The radar system of claim 9, further comprising a radar sensor configured to provide the radar measurement data wherein the one or more processors are configured to receive the radar measurement data and wherein the circuitry comprises at least one of antenna circuitry, mixing circuitry analog-to-digital conversion circuitry of the radar sensor.

11. The radar system of claim 9, wherein the circuitry comprises circuitry of the one or more processors.

12. The radar system of claim 9, wherein the processor is configured to determine radar reception data from radar measurement data, wherein the radar reception data comprises the radar reception data values.

13. The radar system of claim 9, wherein the processor is configured to select the radar reception data values which are above the thermal noise threshold.

14. The radar system of claim 9, wherein the processor is configured to generate a list of radar reception data values and remove entries from the list which are below the thermal noise threshold.

15. The radar system of claim 9, wherein the processor is configured to generate radar reception data values from radar measurement data for each frame of a sequence of frames, and wherein the processor is configured to store the radar reception data for a frame by storing a difference between the radar reception data for the frame and a frame preceding the frame in the sequence of frames.

16. The radar system of claim 15, wherein the processor is configured to, for each frame of the sequence of frames, generate a list of radar reception data values and remove entries form the list which are below the thermal noise threshold and wherein the difference between the radar reception data for the frame and the frame preceding the frame in the sequence of frames is a difference between entries of corresponding entries of the lists with the entries from the lists which are below the thermal noise threshold having been removed.

17. A method for processing radar reception data comprising:

measuring a temperature of a radar system and selecting a portion of radar reception data values for further processing based on a thermal noise threshold based on the measured temperature;

wherein the thermal noise threshold is determined from a thermal noise variance.

18. The method of claim 17, further comprising determine radar reception data form radar measurement data, wherein the radar reception data comprises the radar reception data values.

19. A method for processing radar reception data comprising: measuring a temperature of a radar system and selecting a portion of radar reception data values for further processing based on a thermal noise threshold based on the measured temperature; wherein the processor is configured to determine the thermal noise threshold from a thermal noise variance, and wherein the processor is configured to determine the thermal noise variance from the measured temperature; wherein the thermal noise variance is determined from the measured temperature and from at least one of resistance and capacitance information of circuitry of the radar system.

20. The method of claim 19, wherein the further processing comprises performing radar detection.

* * * * *

UNITED STATES PATENT AND TRADEMARK OFFICE

CERTIFICATE OF CORRECTION

PATENT NO. : 12,140,696 B2
APPLICATION NO. : 17/375017
DATED : November 12, 2024
INVENTOR(S) : Chulong Chen et al.

It is certified that error appears in the above-identified patent and that said Letters Patent is hereby corrected as shown below:

In the Claims

In Claim 18, Column 88:
Line 57
Change "determine" to --determining--
Line 58
Change "form" to --from--

Signed and Sealed this
Tenth Day of December, 2024

Katherine Kelly Vidal

Katherine Kelly Vidal
*Director of the United States Patent and Trademark Office*